(12) United States Patent  
Wu

(10) Patent No.: US 9,361,464 B2  
(45) Date of Patent: Jun. 7, 2016

(54) VERSATILE LOG SYSTEM

(76) Inventor: Jianqing Wu, Beltsville, MD (US)

(*) Notice: Subject to any disclaimer, the term of this patent is extended or adjusted under 35 U.S.C. 154(b) by 454 days.

(21) Appl. No.: 13/455,086

(22) Filed: Apr. 24, 2012

(65) Prior Publication Data

US 2013/0283398 A1 Oct. 24, 2013

(51) Int. Cl.
  *H04L 29/06* (2006.01)
  *G06F 21/60* (2013.01)
  *G06F 21/55* (2013.01)

(52) U.S. Cl.
  CPC .............. *G06F 21/60* (2013.01); *G06F 21/552* (2013.01)

(58) Field of Classification Search
  CPC ................................ G06F 21/552; G06F 21/60
  USPC .......................................................... 726/28
  See application file for complete search history.

(56) References Cited

U.S. PATENT DOCUMENTS

| | | | | |
|---|---|---|---|---|
| 5,822,750 A * | 10/1998 | Jou et al. | | |
| 5,887,171 A * | 3/1999 | Tada et al. | ...................... | 719/317 |
| 7,127,670 B2 * | 10/2006 | Bendik | .......................... | 715/200 |
| 7,747,979 B2 * | 6/2010 | Sugiyama | ...................... | 717/100 |
| 7,788,120 B2 * | 8/2010 | Mathias et al. | .............. | 705/7.27 |
| 7,848,984 B1 * | 12/2010 | Robb | .......................... | 705/36 R |
| 7,890,872 B2 * | 2/2011 | Champlain et al. | ........... | 715/741 |
| 8,244,751 B2 * | 8/2012 | Wolge | ........................... | 707/751 |
| 8,271,451 B2 * | 9/2012 | Steffan | .............. | G06F 17/30011 707/654 |
| 8,832,126 B2 * | 9/2014 | Kumar | ................... | G06Q 10/10 705/311 |
| 2002/0048369 A1 * | 4/2002 | Ginter et al. | ................... | 380/277 |
| 2002/0052862 A1 * | 5/2002 | Scott et al. | ......................... | 707/1 |
| 2002/0073099 A1 * | 6/2002 | Gilbert et al. | ............. | 707/104.1 |
| 2002/0198858 A1 * | 12/2002 | Stanley et al. | .................. | 706/50 |
| 2003/0028495 A1 * | 2/2003 | Pallante | .......................... | 705/78 |
| 2004/0268254 A1 * | 12/2004 | Fujiwara | ........... | G06F 17/30011 715/255 |
| 2005/0004951 A1 * | 1/2005 | Ciaramitaro et al. | ...... | 707/104.1 |
| 2006/0012822 A1 * | 1/2006 | Matsumoto | .................. | 358/1.15 |
| 2007/0150299 A1 * | 6/2007 | Flory | ................................ | 705/1 |
| 2008/0010087 A1 * | 1/2008 | Daniel et al. | ..................... | 705/2 |
| 2009/0150168 A1 * | 6/2009 | Schmidt | ........................... | 705/1 |
| 2010/0245938 A1 * | 9/2010 | Coley | ............... | G06F 17/30011 358/474 |
| 2011/0184935 A1 * | 7/2011 | Marlin | ......................... | 707/719 |
| 2011/0320400 A1 * | 12/2011 | Namini | ........................ | 707/610 |
| 2011/0320494 A1 * | 12/2011 | Fisher | ................. | G06Q 50/184 707/780 |
| 2012/0143837 A1 * | 6/2012 | Roy-Faderman et al. | .... | 707/702 |
| 2013/0054636 A1 * | 2/2013 | Tang | ............................ | 707/769 |

OTHER PUBLICATIONS

Reach, C.S., 'Collaboration Tools for Lawyers', Chicago Bar Association, Aug. 17, 2012, entire document, http://www.chicagobar.org/AM/CLEMaterials/documents/C11212_collaboration-materialsforCBA.pdf.*

Perceptive Software/Lexmark International Technology S.A., 'Elements of Compliance—The Critical Role of Enterprise Content Management in Effective Regulatory Compliance', 2011, Perceptive Software, LLC, entire document, http://media.lexmark.com/www/doc/en_US/elements_of_compliance_sw_white_paper.pdf.*

* cited by examiner

*Primary Examiner* — Bradley Holder  
*Assistant Examiner* — Ronald Baum  
(74) *Attorney, Agent, or Firm* — Jianqing Wu

(57) ABSTRACT

A versatile log system is disclosed for producing logs for documents or other objects. The system allows authorized users to configure a log table and at least one coupled table, validate log entries for the log table, and validate data records for the coupled table. When the system is installed with investigative identity data search algorithm, identity data processing algorithm, interactive data entry features, and phrase construction feature, it can significantly improve production efficiency and data accuracy.

20 Claims, 34 Drawing Sheets

── 301

Name Search | Full Screen | Email | Setup Project | Setup Tables | Log out

| Internal Discussion Group | | | | 302 Manager: Man Fastman Date: 3/2/2009 |

[Search]

| Notes | Names | Privilege log | Doc-log | Hot Log | Discussion | Pad | Instructions |

Change Project Password

- Change Password
- Update Account Info
- Modify Project Setup
- View Project Members
- Assign New Members
- Update Shared Account
- Export Project Files
- Import Project Zip
- Reset Configuration Old Password [         ]          304
New Password [         ]
New Password [         ]

303

[Change] [Cancel]

FIG. 3A

Modify Project Setup

| Project Full Name | Project Green Forest | (1-50 letters) |
| Project Code | GP 1 | (3-10 letters) |
| Member Login Methods | Group and Personal ▼ | |
| Entry Validation Page | Via Tentative ▼ | 305 |
| Data Validation Method | Manager and Vote ▼ | |
| Required Votes No. | 3 | |
| Pad Max Record Size | 200 | |

Do you allow server's administrator to access your project data?

○ Yes   ● No

[Submit]

FIG. 3B

| View Project Members | | | | |
|---|---|---|---|---|
| Member No. | Member | Password | E-mail | Operations |
| 4 | 2person1 | 2person1 | gbp@test.com | View Modify Delete |
| 5 | 2person2 | 2person2 | | View Modify Delete |
| 6 | 2person3 | 2person3 | | View Modify Delete |

Assign Project Members

Enter member Log-in Name and Password

Login Name [        ] (1-20 letters)
Password  [        ] (6-20 letters)

[ Submit ] — 307

---

Or add Log in names and passwords for plural members

You may upload a text file ( e.g. name. txt ) containing name-password pairs ( e.g., johnsmith 10, pass8759; jonstone, pass7658 ) where the name password pairs are delimited by a carriage return or semicolon.

[                              ] [Browse]

[ Submit ] — 308

FIG. 3D

Update Project Shared Account

Manager Project Shared Account
Shared Log-in Name [myglg]   (1-20 letters)
Shared Password    [111111]  (6-20 letters)

[ Submit ] — 309

FIG. 3E

Export Project

Please Choose Export File Format

○ Human Friendly File          ○ Database Native File

[Export Whole Project]    Or Check Tables to Export

☐ Group Information
☐ Discussion
☐ Email
☐ Pad
☐ Notes Table
☐ Transaction Table
☐ Attorney Name Table
☐ Acronym Table          [Export]
☐ Privilege_Log Table

FIG. 3F

Import a Project Zip

1. Choose an Import Method:

○ Replace all existing tables by the tables in imported file.
    ● Import selected tables from your project file.

Select tables: [Select All]  Or Select tables below:

☐ Group information    ☐ Notes
    ☐ Discussion           ☐ Transaction Table
    ☐ E-mail               ☐ Names Table
    ☐ Owner Pad            ☐ Acronym
    ☐ Members Pad Determine the Effects on Existing Data:
    ● Import table structure and data.
    ○ Replace existing data by imported data.
    ○ Update data to the table (Keep existing data).

2. Select your project zip file and press import:

[_____] [Browse]

[Import]

FIG. 3G

| Table | Set up Tables | | | |
|---|---|---|---|---|
| Notes | Data Entry Layout | Modify Table History Table | Delete Table & Backup Data Upload Data | Advanced Setup |
| Transaction | Data Entry Layout | Modify Table History Table | Delete Table & Backup Data Upload Data | Advanced Setup |
| Names | Data Entry Layout | Modify Table History Table | Delete Table & Backup Data Upload Data | Advanced Setup |
| Privilege-Log | Data Entry Layout | Modify Table History Table | Delete Table & Backup Data Upload Data | Advanced Setup |
| Production-Log | Data Entry Layout | Modify Table History Table | Delete Table & Backup Data Upload Data | Advanced Setup |
| Hot-Log | Data Entry Layout | Modify Table History Table | Delete Table & Backup Data Upload Data | Advanced Setup |
| Pad | Modify | | | 501 |

Set up More Table

FIG. 4A

Create Database Table Structure

* Table Navigation: Names — 502
Table Name: Names
503

504

[Insert entry] [Delete entry]

Col 1 Field  First_Name   Type  VARCHAR   Length 30   Not NULL ☐  Unique ☐

Col 2 Field  Last_Name    Type  VARCHAR   Length 30   Not NULL ☐  Unique ☐

Col 3 Field  Firm         Type  VARCHAR   Length 100  Not NULL ☐  Unique ☐

Col 4 Field  Notes        Type  VARCHAR   Length 200  Not NULL ☐  Unique ☐

[Submit]

FIG. 4B

Structure of the Names Table

| | Field | Data Type | Null | Unique | Setup Data Source |
|---|---|---|---|---|---|
| ☐ | First_Name | VARCHAR | Yes | No 505 | Setup |
| ☐ | Last_Name | VARCHAR | Yes | No | Setup |
| ☐ | Firm | VARCHAR | Yes | No | Setup |
| ☐ | Notes | VARCHAR | Yes | No | Setup |

[Delete] [Add] [Modify]  ← 506

Modify Columns for Names

Col 1 Field [First_Name]   Type [VARCHAR]   Length [30]   Not NULL ☐   Unique ☐

[Submit]   507

Advance Setup--Change Navigation Name, Table Name, Access Rule, and Validation Route or Page, and Validation Method Setup for Table: Transaction

| | | |
|---|---|---|
| Navigation Name | Transaction | (Fewer than 20 letters) |
| Table Name | Transaction | (Fewer than 20 letters) |
| Data validation Page | Via combined Table ▼ | |
| Data Validation method | Manager and Vote ▼ | |
| | 3  (Votes, excluding owner) | |
| Data Access Rule | Private Edit ▼ | |

[Change]

FIG. 4E

Name Search | Full Screen | Email | Setup Project | Setup Tables | Log out

Internal Discussion Group

| Global Search | Manager: Man Lastname | Date: 3/2/2009 |

| Notes | Names | Privilege_log | Doc-log | Hot Log | Discussion | Pad | Instructions |

Back to Summary Page    Active Table    Archive Table

Active Table Notes   ←— 539

Rec. Id [ ] [ ] [Go] [All Date ▼] [ ] [ ] [Go] [All Fields ▼] [ ] [Go]

| | 1 | 2 | 3 | 4 | 5 | 6 | 7 | 8 |
|---|---|---|---|---|---|---|---|---|
| ☐ | Sys_record_id | Events | Date | Comment | Entry date | Confirm date | Initials | App |
| ☐ | 21 | First Amendment | | 540 | | | | |
| | 07/10/2010 | | | | | | | |
| | A first amendment was distributed on July 10, 2010. The major change was the privilege review standard. | | | | | | | |
| | 04/19/2011 09:03:37 | 04/19/2011 09:06:31 | | | MAN1 | VOTE | | |
| ☐ | 21 | First Amendment | | | | | | |
| | 07/10/2010 | | | | | | | |
| | The first review instruction was published on instruction page. You can identity this file by document ID0010.    — 541 | | | | | | | |
| | 04/18/2011 20:48:26 | 04/18/2011 21:38:36 | | | MAN1 | VOTE-R | | |

Archive: [Selected Records] [Displayed Records] [Found Records] [Whole DB Table]

FIG. 4G

Instructions for Project Members

A. Procedural Guidelines
   1. Project Guideline    Update ←——— 542
   2. Reimbursement Policy    Update B. Substantive Guidelines
   1. Responsiveness Review    Update
   2. Privilege Review    Update
   3. Case Background    Update
   4. Model Coding Samples    Update C. Reviewers Tools
   1. Log in
   2. Payment Histories
   3. Computation Tools
   4. Performance analysis

FIG. 4H

Upload data to the Transaction table

| Fields in the Table: | | | | Fields in the File: |
|---|---|---|---|---|
| Sys_record_id | Sys_record_id | Clear | Add | Sys_record_id |
| Sys_user_id | Sys_user_id | Clear | Add | Sys_user_id |
| Sys_status | Sys_status | Clear | Add | Sys_status |
| Entry_date | Entry_date | Clear | Add | Entry_date |
| Confirm_date | Confirm_date | Clear | Add | Confirm_date |
| IP | IP | Clear | Add | IP |
| Initials | Initials | Clear | Add | Initials |
| App | App | Clear | Add | App |
| Transaction_name | Acronym | Clear | Add | Acronym |
| Date | Date | Clear | Add | Date |
| Comment | Comment | Clear | Add | Comment |

[Sequence Placement] [Field Name Match]  ☐ Select/deselect all

—548  —550

549 — [Submit]  [Clear All]  —551

FIG. 4K

| Transaction: Enter the size for each field and select the alignment for each line (Step 3) |
|---|
| If a line contains several fields, the total size should be less 100 characters. |

Line 1: Transaction_name [____] —628    ● Left  ○ Center  ○ Right —629
        Date             [____]

- - - - - - - - - - - - - - - - - - - - - - - - - - - - - - - - - - - - - - - - - -

Line 2:  Comment  [____]   ● Left   ○ Center   ○ Right

[Back]  [Next]

FIG. 4O

| Layout Detail of the Transaction Table |
|---|

| Personal Display Setup | Group Display Setup |
|---|---|
| Font Size :14 px | Font Size : 14 px |
| Line 1: Transaction_name, 60 / Date, 10 — left | Line 1: Transaction_name. 40 / Date, 10 — left |
| Line 2: Comment,180 — left | Line 2: Comment,80 — left |
| Line 3: Sys_record_id, 10 / Entry_date, 10 / Confirm_date, 10 / Initials, 5 / App, 10 — left | Reset |

630, 631

Reset    [Close]

FIG. 4P

| | (Another example of layout) | | | | | | | | | | | |
|---|---|---|---|---|---|---|---|---|---|---|---|---|
| ☐ | 1 | 2 | 3 | 4 | 5 | 6 | 7 | 8 | 9 | 10 | 11 | 12 |
| | Email | FirstName | MI | LastName | Com | Date | Type | Comment | Entry_date | Confirm_date | Initials | App |
| 1 | test185@test.com | | | | | | | | | | | |
| 2 | Jere | | | | | | | | | | | |
| Current Vote: 1 | | | | | | | | | | | | |
| 4 | Buchanan | | | | | | | | | | | |
| 5 | Green & White, LLP | | | | | | | | | | | |
| 6 | 11/10/2008 | | | | | | | | | | | |
| 7 | Partner | | | | | | | | | | | |
| 8 | For special use | | | | | | | | | | | |
| 9 | 04/22/2011 14:21:19 | 10 | | 11 MAN1 | 12 | | | | | | | |

Validated Table  Tentative Records  Combined Table  Edit Table  Look-up Table

All Records in Changes (240 Records)

Change Layout

[Enter] [Delete] [Vote] [Revoke] [Edit]  [_____Search]

| ☐ | 1 | 2 | 3 | 4 | 5 | 6 |
|---|---|---|---|---|---|---|
| | Sys record id | Entry date | Initials | Events | Date | Comment |
| ☐ | 1  110 | 2  05/30/20 | 3  MAN 1 | 4  others | 5  04/02/20 | 6  From other |
| ☐ | 1  174 | 2  05/30/20 | 3  MAN 1 | | | |
| ☐ | 1  175 | 2  05/30/20 | 3  MAN 1 | The page at http://localhost:9080 says: | | |
| ☐ | 1  176 | 2  05/30/20 | 3  MAN 1 | | | |
| ☐ | 1  177 | 2  05/30/20 | 3  MAN 1 | Are you sure you want vote? | | |
| X | 1  178 | 2  05/30/20 | 3  MAN 1 | | | 732 |
| X | 1  179 | 2  05/30/20 | 3  MAN 1 | [Cancel] [OK] | | |
| X | 1  180 | 2  05/30/20 | 3  MAN 1 | | | |
| X | 1  181 | 2  05/30/20 | 3  MAN 1 | 4  Meeting | 5  05/29/20 | 6  First Record |
| ☐ | 1  182 | 2  05/30/20 | 3  MAN 1 | 4  Call | 5  05/29/20 | 6  A first Amend |
| ☐ | 1  183 | 2  05/30/20 | 3  MAN 1 | 4  Sales | 5  05/29/20 | 6  First Review |

FIG. 5F

Interactive Search and Data Feed t

[Shrink Font] [Enlarge Font]

Sorted by: Alphabetic

TED-(TED spread) US T-bond / euro dollar spread strategy
TGE- Tokyo Grain Exchange (Japan)
TIBOR- Tokyo inter-bank offered rate (Japan)
TIFFE- Tokyo international Financial Futures Exchanges (Japan)

LSE
LTOM  - London Traded Option Market ( UK, now part if LIFFE )
PHOT  - Phidelphia Board of Trade ( US )
PHLX  - Philiaadelphia Stock Exchange 733, 734, 735

[Save]

Privilege Log Form

Show all data source: Delete, Back Space or Insert. Select a data piece:Ctrl+(0-9)
Move to next page in selection pane: Alt+(-1*)

- Sender (<50)
- Recipient (<200)
- CC_recipient (<200)
- Other_recipient (<100)
- Date (01/01/2009)
- Type (<200)
- Privilege_basis (<200)
- Description (<50): Letter prepared by counsel 736 → A: Letter     B: prepared by counsel
     C: t           D:
737

738 →
0  Taylor
1  Tritten
2  Uayer

Comment (<500)

[Submit]  [View Table]

FIG. 5H

Add Records To the Changes Table

Select Tables: Chan|Tran|Atto|Acro| Priv|Prodl [ Tabs ]
Server Response: Record 211 was entered at 05/30/2011 16:27:05 ⟵ 739

Date format: MM-DD-YYYY

| | |
|---|---|
| Events (< 80) | Second-record |
| Date | 05/30/2011 |
| Comment (<300) | This is a second record. |

[Submit] [Close]   [Refresh Table/Close Pop-up]

Edit Records for the Change Table

Instructions: Date format: MM-DD-YYYY
Record to Be Edited Next:
212, 211
⟵ 740
The Record (No. 213) Is Under Edit, Now

| | |
|---|---|
| Events (<80) | Record Creation |
| Date | 01-01-2009 |
| Comment (<300) | The record come from different source. |

[Save Record]   [Close]

FIG. 5J

Search Names in the Names Table

Enter names in the Following Box: — 800

```
From:  John Smith
Sent:  Novermber 14, 2006;
To:    Dean Smith; Snoon L. Steal; Matalish, Store; Job; black;
       ABC; X. T.; X. Y. Z.; notation99@test.com;
       "uknowntwo@test.com";
       "uknownthree@test.com"; David.Bidlow@test.com;
       David.T.Seth@test.com; David Franklin
```

⦿ Default Search View Setup   ◯ Current Search Setup View
[ Search ]   ← 801

Setup for Default Search

1. Delimit for Separating Names:
   ◯ Comma   ⦿ Semicolon   ◯ Carriage Return 2. Define Search Ranges:
   Mark words  [ From; To; ]  (Separated by Semicolon)
   Ignored words [            ]  (Separated by Semicolon)

3. Marks for Ignored ranges: Add a Range  Remove a Range
   [ Sent ]  [          ]

4. Select Match/Search Methods:
   ☐ Basic and reliable matches set by system ☐ Match both names, email address or acronym
   ☐ Match initial & last names (J. Smith to Jon Smith)
   ☐ Match key initials with full names (J.S. with Jon Smith)
   ☐ Find derived initials in comments (J.S. or Jo Shy with j.s., J.M.S., JMS.)
   ☐ Regard small key (jo, job) as initials and find it in names & comments
   ☐ Match single key with first & last name (jack with Jack Smith or John Jack)
   ☐ Match single with a word in firm names (black with White & Black)
   ☐ Match last name only (for Jo Smith, find Ted Smith and Jack Smith)
   ☐ Match first name only (for Jo Smith, find Woods and Jo Black)

5. Select Entity Type to Show:
   ☒ Law firm   ☐ Client   ☐ Partner   ☐ Other Parties 6. Select Display Order:
   ◯ Name->Firm->Email   ◯ Email->Name->Firm   ◯ Firm->Name->Email
   ◯ Name->Email->Firm   ◯ Email->Firm->Name   ◯ Firm->Email->Name

[ Save ]  [ Cancel ]  [ Revert to Default ]

FIG. 6B

Names not found

| Source | | | Found Name Entries | | | | |
|---|---|---|---|---|---|---|---|
| colspan Name Search Results — Ordered by Name->firm->Email | | | | | | | |
| Name | Field | No | Name | Firm | Data | Comments | Email |
| John Smith | From | 1 | Fleming | Stone LLP | 11-10-08 | JS is a worker | Test3@test.com |
| Dean Smith | To | 1 | Smith, Dean | Greens, PC | 11-01-08 | For test use | Test1122@test.com |
| David Franklin <df123456@test.com> | To | 15 | Farrell, Jack | Duncans & Woods,LLP | 11-01-08 | His boss Is d.f. | Test932@test.com |
| | | | Franklin, David | Franklin & Black | 11-01-08 | For test use | Test981@test.com |
| "Dave Farr" <david.far@test.com> | To | 16 | Farrell, Jack | Duncans & Woods, LLP | 11-01-08 | His boss Is d.f. | Test932@test.com |
| ABC | To | 6 | Anderson Charlotte | Johnson Law, LLC | 11-10-08 | Data for test use only | |
| | | | Vinson. Kristina | Part of ABC firm | 11-01-08 | For test use | Test1202@test.com |
| X.Y.Z. | To | 8 | Bumpus, Laura | Snow & Ice PC | 11-01-08 | She married to X.Y.Z. | Test1126@test.com |
| | | | Zedon, Xerron | Private Firm | 11-01-08 | | Test1196@test.com |

| | Search Results | |
|---|---|---|
| colspan Show Unmatched Names \| Hide Names \| Show Matched Names \| Hide Names | | |
| Field | No | Names |
| To | 2 | Snoon L. Steal |
| | 3 | Matalish, Store |
| | 4 | Job |
| | 5 | black |
| | 6 | ABC |
| | 7 | X.T |
| | 8 | X.Y.Z. |
| | 9 | notation99@test.com |
| | 10 | "uknowntwo@test.com" |
| | 11 | "uknownthree@test.com" |
| | 12 | David.Biglow@test.com |
| | 13 | David.T.Seth@test.com |
| | 14 | Sneal,David@test.com |
| | 17 | "Dulles,Steven M."<dullles.steven@test.com> |
| | 18 | "Darlene Homes" "specialchars@test.com" |
| | 19 | "Darlene Homes"<Notknown@test.com> |
| | 20 | "Dolly Dole"<notknown@test.com> |

| Process Names | Normal View |
|---|---|

Names in Group A:            Back          860

From: Jack Smith; Le Strong; Dick; ABC; Job; X.Y.Z.; Jack;
        Lisa Black; Greg M. Howa;test@test.com
Sent: Novermber 14, 2008
To:    Dean Smith; L. Stone; Gorer.Blue@test.com; xyz;
        David Franklin; G.M.Homes; North; Mary Allen Stone;

Names in Group B:                      861

From: John Smith
Sent: Novermber 14, 2008
To:    Dean Smith; Star L. Steal; Marty, Store; xyz; X.T.;
        X.Y.Z.; natation11@test.com; "nv9900@test.comy ◉ Default Search View Setup    ○ Current Search Setup View

[Submit]

Name Processing Result

Enter Names in Group B:

From: John Smith;
Sent: Novermber 14, 2008
To:    Dean Smith; Star L, Steal; Marty, Store; xyz; X.T.; X.Y.Z.;
        natation11@test.com; ""; "notion009@test.com";
        David.Biglow@test.com; David.T.Seth@test.com;t

[Clear Group A] [Clear Group B] [Clear All] [Submit] ← 862

Sorted Names Output:      863

Ordered By: | first name in alphabetic order ▼ |

864
Sorted Names ifrom Group A:
---Select an order---
first name in alphabetic order
first name in inverse alphabe order ABC; Bernstein; David Franklin, Esq,;
Franklin, Esq,; David Seth; Dean Smith;
Blue; G.M. Homes, Esq.*; Gorger Blue;
M. Howa, Esq.*; Jack, Esq; Jack Smith;
Job; Joe; John Smith, Esq.*; L. Steal; L
Strong; Lily Smith; Lisa Black; Esq.; Mary Stone; North last name in alphabetic
last name in inverse alphabetic order Show names in table format Sorted Names from Group B:    865

| From: | John Smith, Esq.* |
|---|---|
| To: | Darlene Homes; Darlene Homes; Dave Farr; David Biglow; David Franklin; Esq.; David T.Seth; Dean Smith; Dolly Doles; natation11@test.com notion009@test.com; nv9900@tset.com; Sneal,; Star L. Steal; Steven M. Dulles; Store Marty; X.T.; X.y>z.; xyz |

Show names in table format

FIG. 6H

| To | Darlene Homes; Darlene Homes; Dave Farr; David Biglow; David Franklin; Esq.; David T.Seth; Dean Smith; Dolly Doles; natation11@test.com notion009@test.com; nv9900@tset.com; Sneal,; Star L. Steal; Steven M. Dulles; Store Marty; X.T.; X.y.z.; xyz |
|---|---|

Hidden names in table format

| ☐ | Sorted Name From Group B |
|---|---|
| ☐ | John Smith, Esq.* |
|   | (Some entries are omitted) |
| ☐ | X.T. |
| ☐ | X.Y.Z. |
| ☐ | xyz |

[Delete selected names]  [Add new names]

FIG. 6I

Back

Enter Names in Group A:

From: Jack Smith; le Storng; Dick; ABC; Job; X.Y.Z.; Jack; Lis Black; Greg M. Howa; test2@test.com To: Dean Smith; L, Steal; Gorger.Blue@test.com; xyz; David Franklin; G. M. Homes; Spade, North; Mary Allen Stone;

Enter Names in Group B:

From: John Smith;
Sent: Novermber 14, 2008
To: Dean Smith; Star L, Steal; Marty Store; xyz; X.T.; X.Y.Z.; natation11@test.com; "nv9900@test.com"; "notion009@test.com";David.Biglow@test.com; David.T.Seth@test.com;         —866

[Clear Group A]  [Clear Group B]  [Clear All]  [Submit]

FIG. 6J

VERSATILE LOG SYSTEM

FIELD OF THE INVENTION

The present invention relates to information management system generally, and to the log production technology in particular.

BACKGROUND OF THE INVENTION

In litigation, a party may have an obligation to produce certain categories of documents in response to a subpoena or document request. The producing party produces documents together with a document production log and a privilege log. A production log contains among others brief description about each produced document, a privilege log contains among others a brief description of each document withhold. The party may also create a hot document log that contains a brief description of each important document. Document logs are similar to production logs used in manufacture and service industries. One example is a production log, which contains date, location, personal, equipment and notes. While logs may contain different substances and are used in different fields, they all share five common features: reviewing documents or objects, collecting data, entering data into the log, validating data, and editing log entries. When a log contains millions of entries, its production costs are often prohibitory and data accuracy is hard to control. Any improvements in any of those aspects can improve accuracy and reduce production costs.

Logs are widely used in legal fields. The producing party generally has the right to withhold the documents that are protected under various privilege doctrines. When the producing party is a large organization, the party might have millions of documents, a considerable number of which might have been toughed by in-house attorneys and outside attorneys. The task of processing a large log is labor-intensive. Moreover, it is often very difficult to determine privileged documents because it is difficult to determine whether any of senders and recipients is attorneys. Many documents may have no proper authors. It is important to build a complete list of attorney names and firm names. This is often an impossible task. There are several reasons for this. Companies do not keep track of their in-house counsel names for this purpose while its own staff is routinely changed. Moreover, companies also hire different outside law firms at different times. They do not keep track law firms and outside attorneys. Finally, company's management team may be changed in as short as one or two years. The legal staff that knows company litigation histories may be changed routinely. Thus, identification of in-house counsel and outside counsel is not always feasible.

In a typical document review, one critical task is to build a comprehensive list of attorney names to assist the reviewers in determining privileged documents. Law firms have used several methods to achieve this. They might ask all reviewers to keep a note of the attorney names whenever they encounter from reviewing documents and provide this note to the management staff on a periodical basis so that the manager can add newly discovered attorney names to the growing list. The manager then distributes the updated name list to all reviewers periodically. A problem with this method is that the initial list is very incomplete and updating to the list is untimely. Thus, it increases the risk that some reviewers may be unable to identify certain privileged documents as a result of incomplete and outdated attorney name list.

Many attempts have been made to improve the name list. Law firms may get a comprehensive name list by using a prior document review in another matter for the same party. If the client has never produced documents from the document pool before or has never been involved in any litigation, the only possible way of building the list is to use a task-force team to hunt for attorney names and build a name list. This will increase additional costs.

Another improvement is to use the search capacity for the document review platform to mark up potentially privileged documents. Many document review platform vendors have developed sophisticated technology for identifying potentially privileged documents. Documents are marked as potentially privileged if they contain search terms that consist of not only attorney names but also other words and phrases. For example, the search terms may include a list of terms such as "legal team" "legal advice", "liability", "remedy," and "settlement". The number of the potential terms can be very large. The search terms may also include transaction-specific terms. If a company has done a prior criminal investigation in code names, the search terms should include those code names. The long search terms are used in conjunction of different search logics. The review platform highlights those terms in the documents, and marks them as potentially privileged in the document log or privilege log. A common problem is that an excessively large number of non-privileged documents are marked as potentially privileged with a large number of highlighted terms in the documents, and still miss critical documents. For example, if a search term happens to appear in a certain type of documents, the system will get all those documents. The system might get all documents from Lawson because one search term is "law." When the search terms contain hundreds of words and phrases, it may get most of the documents for various unexpected reasons. Such a method can be used to help reviewers confirm privileged documents and, with less confidence, exclude non-privileged documents. Whether the reviewers can treat unmarked documents as non-privileged depend upon the scope of search terms, the search algorithm, the authors' ways of expression, and the type and nature of documents.

In a typical privilege review, one main task is to produce a privilege log, which contains basic information about the document. Privilege review is often combined with responsiveness review. Since a review system has the basic information such as authors, document title, dates, and recipients, it can readily produce most of data fields for the privilege log. The only things to be filled are privilege basis and a description of the document. The privilege basis field may be filled with the options of attorney-client privilege, work product, joint-defense privilege, and supervisory privilege. Filling the description field is the most difficult task in privilege review. If it contains too much detail, it would allow the opposing party to get some privileged information. If it contains too little information, the opposing party may be unable to determine whether the document is in fact privileged. In practice, the level of disclosure in description depends upon the nature of cases and opposing parties. For highly contested cases such as class actions, a detailed description is required to avoid court challenges. In contrast, for cases like mergers and government investigations, a brief description by using a few simple language patterns will be sufficient.

In the last two decades, little improvement has made to increase the efficiency and performance. Any improvement must not restrain the judgment of litigation attorneys. This invention is intended to provide an improved log production environment without affecting the attorneys judgment. The method and system can substantially improve data consistency and reduce the production costs.

SUMMARY OF THE INVENTION

The present invention is a system, which provides an environment for production of production log, privilege log, hot document log, or other logs. It provides rich tools and features for changing data entry environments, sharing and validating data, and protecting data.

The present invention is primarily a log production system, which can be used to host a plurality of logs. To create plural log projects, the administrator of the server uses administrator's tools to assign plural manager's accounts to plural project managers. The system has tools for deleting and modifying projects. The assigned manager can configure plural database data tables, and set up coupled data tables. A coupled table is a table that contains data, which are used in the log table. The data are referred to as relevant data or coupling data. The number of records in the coupled field of the coupled table will increase so that the data will aid the reviewers in producing the log. The coupled table may be the table itself.

The log system is implemented with an investigative identity data search algorithm ("IIDS"), identity data processing algorithm ("IDP"), configurable interactive search and data feeding function, and composite phrase construction feature. The system allows privileged user to set up a names table in support of those features. The system allows for conducting name searches in a names table, identifying attorney names in the source names, and marking the identified attorney names with a unique mark such as "Esq" or a star. It also provides a method for uploading attorney names in the name database, updating static useful data, and other useful information in real time. By using such a system, the user can also get names data by copy and paste method into the name processing input boxes for search and processing. The name processing algorithm allows users to process name data in the steps of (a) opening a page containing two input boxes and plural configuration settings, (b) defining the configuration settings including data ranges, output order, and output format, (c) providing a list of names in the first box and a list of names in the second box, (d) submitting the page to the server for processing, and (e) displaying processed name data in two output boxes in selected output order and format without duplicates between the two output boxes.

The present invention is also a system and method for creating an interactive data entry form with the steps of (a) creating a database table containing a destination field, (b) setting up a data source which may be plural words and phrases ("static data source") or one or more fields of one or more database tables and associating the destination field with the data source, and (c) in generating an interactive form page, it contains necessary script for conducting interactive search and data feed with proper parameters. The present invention further comprises methods for constructing phrases by combining user-selected data pieces in plural component boxes or by combining user-selected data pieces from a single data construction input box to form a phrase. Therefore, the user can reduce keystrokes in entering data.

The reviewers enter data such as general subject matter or specific subject matter on a document table. This data are saved in the relevant field of the production log, hot document log or privilege document log. Such data are then used to generate a description automatically by one of the construction methods according to a language pattern. By using the method, the value for the description field may be generated automatically.

The present invention is also a system and method for efficiently sharing information for creating logs between plural project members. Each of the data records in any of the tables may be validated by different validation methods, by different users, managers or different users, through different pages or routes, and under different rules. The system allows project members or project users to validate information such as names, transactions, events, and client-specific matters to ensure that critical data are accurate and current. The method comprises: (a) adding a data record into a table as a tentative record, (b) validating the record in a combined table or the tentative table of the table by the manager or members' vote, (c) changing the status of the record, (d) moving the data record from the tentative table or the combined table to the validated table, and (e) retrieving the data record by any of the project members for share.

Information stored on this system may be shared by using a simple search method, interactive data retrieving method, investigative identity data search algorithm, identity data processing algorithm, and global search method. As a result, the records created by a member can be found and shared by the rest of the members without the risk of introducing incorrect information into the system. This validation processes are essential to the maintenance of the security and integrity of critical information.

The system may be configured with one manager's account, which is used by a user to set up a project and configure data tables. The user can delete the project, change the project, and reconfigure the project. It may be configured to host plural log projects that run independently. The data tables on the log production system and supporting tools are highly configurable and will not affect the judgment of litigation attorneys. The system can be configured for any kinds of cases. In configuring a data table, the system has server tools, which allow the user to select a data validation route, choose data validation methods, and setup data source for any data input box for any of the tables. Data may be validated on a tentative page or a combined page by manager's data validation method or members voting method. In setting up a data source for a data entry box in the data entry form or Table Edit table, the user may create a static data source or assign one or more the data fields of one or more data tables for the data entry box.

The system of the present invention contains integrated tools for resetting all project storage facilities. Project storage facilities can be reset instantly (a) resetting the project to the system's default settings; (b) deleting all project data without toughing the structures of all tables; (c) overwriting all table structures by uploading a configuration file which containing tables structures and table definitions; and (d) overwriting specified tables by uploading a configuration file. The system of the present invention contains tools for exporting project data and importing existing a project file. The project data from a project can be exported for backup. By importing a project file into the server under manager's account, the system is able to render the project precisely in the same way as the system did before the project file was created. The system allows each of the users to set up a display method for the each of the tables. Thus, the member has the option to use his personal display layout, the group's display layout, and the system default display layout. One of the display methods provides a stagger view that can eliminate the need for using scrolling bars in viewing and editing data records.

The method may be integrated with any document review platform or other information management system in various ways. When it is integrated with a document review platform, the data in the document log can be used in the privilege log. In addition, the system offers great flexibility of sharing name data and document log data with other systems. Thus, the method can be used in the information system with which the invented method and system cannot be integrated. In addition, the data entries for documents may be exported from the review platform and imported into this system. Conversely, the log table and name table may be exported from this system and imported into other document review systems. The data from the tables on this system may also be imported into Excel.

The system of present invention is a general log production system, which offers the flexibility to link a data input box for any field of a table to any data source. The data source may be a fixed number of data pieces or any one or more fields of one or more database tables. The data source for the sender field of a document log may be the first name field and the last name field of a names table. The data source may be even the destination field to which data are entered. By using this self-feedback arrangement, previously entered data can be shared in data entry. After a reviewer A resolves a name identity and enters it into the names table, reviewer A can use it again later. Reviewer B can also retrieve it and use it. Any data in any table can be used by the same reviewer at two different stages, shared by different reviewers in building the same table, and shared by different reviewers in building different tables. The configuring feature further increases the value of the system.

BRIEF DESCRIPTION OF DRAWINGS

FIG. 3A shows the menu under the "Setup Project" page.

FIG. 3B shows the page for changing project setup.

FIG. 3C shows the page for viewing all members under a project.

FIG. 3D shows the page for assigning member accounts by direct input and by file upload.

FIG. 3E shows the page for changing project shared account and shared password.

FIG. 3F shows the page for exporting and downloading a project.

FIG. 3G shows the page for uploading and importing a project file.

FIG. 4A shows the page for setting up functions for data tables.

FIG. 4B shows the page for creating a data table.

FIG. 4C shows the structure of a table where the user can modify, add, and delete columns.

FIG. 4D shows the page for modifying a column in a data table.

FIG. 4E shows the page for changing navigation name, table name, data validation route or page, data validation methods, and data access rule for a data table.

FIG. 4G shows the page for archiving data for a data table by four different selection criteria.

FIGS. 4H-4I show the pages for setting up project guidelines.

FIG. 4K shows the page for uploading data from a text file into a data table.

FIGS. 4M-4P show the steps for setting up of a layout by a privileged user (the page for member is substantially same except it does not have the Block 620).

FIG. 5E shows another example of display layout for the names table where current vote information is shown in an info tip for the record.

FIG. 5F shows a combined table, where partial columns are displayed, validated records are marked in the background color around the check boxes, and the user is about to vote for data records 178, 179, 180 and 181.

FIG. 5G shows the interactive search and data-feeding function on a server pad.

FIG. 5H shows a log form where the description field is setup with a phrase construction field which consists of the component boxes A, B, C, and D and where the component box C is set up with an interactive search and data feeding function.

FIG. 5I shows the page for adding data record to the changes table.

FIG. 5J shows the page for editing a plurality of data records at a time without the need for closing and reopening the edit page.

FIG. 6A shows the page for conducting investigative identity data search ("name search").

FIG. 6B shows the setup page for default name search or current name search.

FIG. 6C shows search result from submitting the name search page showed in FIG. 6A.

FIG. 6D shows search result for unmatched names that were from an address field "to" in FIG. 6A.

FIG. 6G shows a page for conducting name search, name sorting, and duplicate-elimination for two lists of name data.

FIG. 6H shows sorted names with the found names marked by "Esq*" for Group A, a plurality of input boxes containing names for Group B, and two input boxes for taking name data for a repeating search (the top input box for Group A is not shown).

FIG. 6I shows a list of names in a table view, which has been opened by clicking "Show Names in Table Format" in FIG. 6H.

FIG. 6J shows the page for accepting new name data for repeating search.

DETAILED DESCRIPTION OF PREFERRED EMBODIMENT

The hardware in support of the present invention is described as follows.

A. The Hardware Structures

Figure 1:
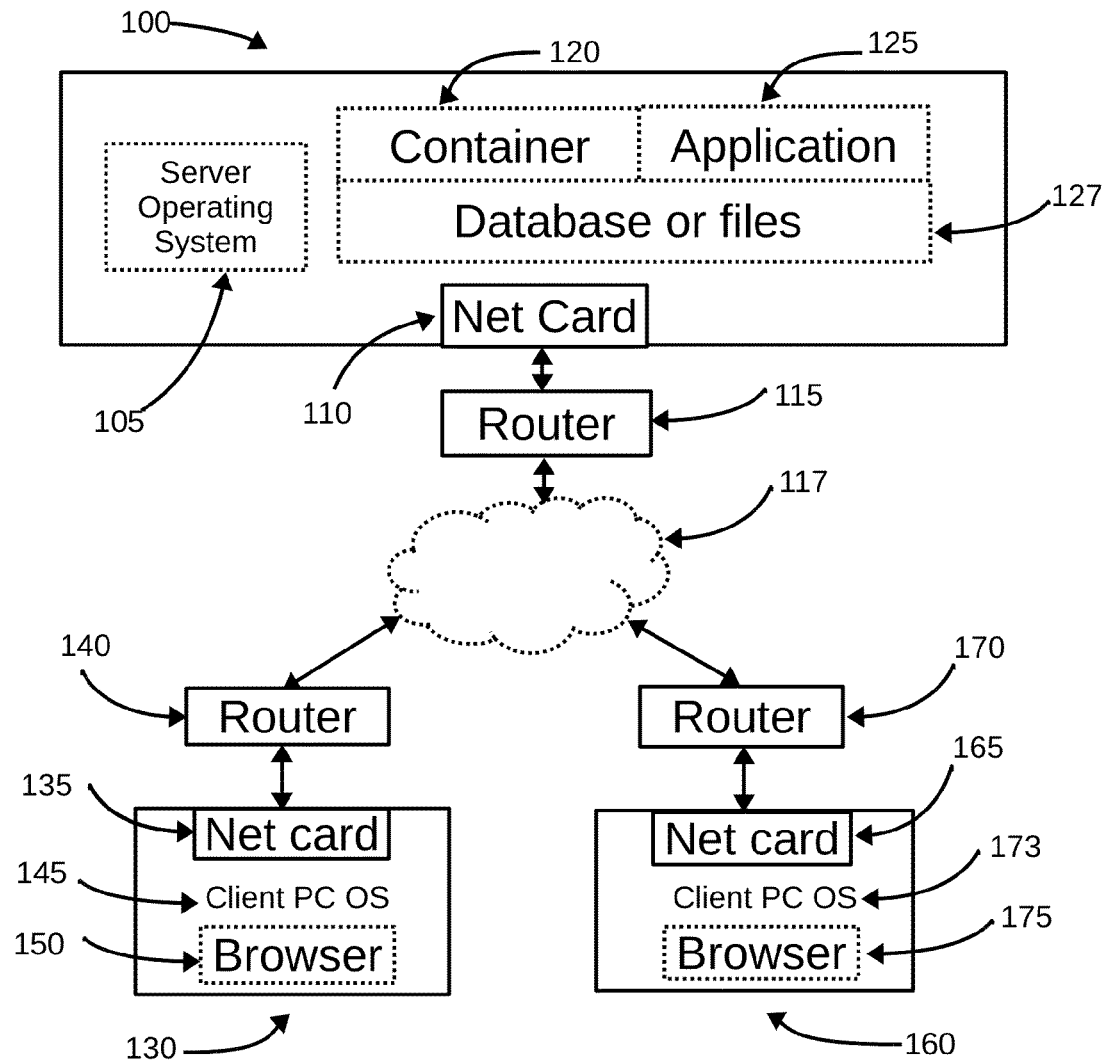
FIG. 1 is a schematic diagram showing the hardware and required components.

The system (FIG. 1) comprises a server 100 and client computers 130 and 160, all of them are connected in a network so that they are able to exchange data using common data transmitting protocol such as TCP.

The server 100 is running an operating system 105 and is fully functional, has a network interface 110, and is connected to the Internet 117 through a router 115. In one of the embodiments, the server is an Intel D945PNS motherboard with a Pentium D 840 processor operating by Fedora Core 7. Although the system came with a package of Java tool, a Java Development Kit (JDK version 1.5.06) is installed for compiling Java class files. In the ext folder inside the lib folder of the Java Runtime Environment (/usr/share/jdk/jre/lib/ext), activation.jar and mail.jar are placed. To handle file uploading, a package known jspsmartupload (or equivalents), which includes several class files, is used. The server is installed with Apache Tomcat 5.5.15 and MYSQL 5.0.27 that come with the system. The versions of Java components and versions of all required jar files should meet the requirements of the Tomcat application.

The server is installed with a relational database system for storing files. To allow Tomcat's Java class component to access the MYSQL database, mysql-connector-java.jar is placed inside the lib folder under the common folder of the Tomcat installation folder. If speed and productivity is not an issue, it can be dispensed with. For example, Perl database may be used as an alternative. Application data may be stored in files and inside folders with proper permissions.

All server program files of the present invention are placed in one single application folder containing various sub-folders. The application source files developed for this invention include JSP pages, Java class files, and JavaScript files, and other support files. Each of the Java class files is compiled to form a class file first before it is placed into the class folder under WEB-INF. Within the class folder, there are plural folders, each of which contains compiled Java files. In such a system, the JSP files often provide direct interfaces with the user. The components that are used repeatedly in the back-end are compiled as Java class files. Under this working system, a web page running on browser can access the database on the server through the JSP pages or Java class Java Bean or Java Servlets. The application folder also includes a lib folder that may contain jar files. The Java class files are compiled using Javac from Java Development Kit (1.5.06), whose jre/lib/ext contains necessary API jar files.

The client computer 130 is also operated by its own operating system, has a network interface 135, and is connected to the Internet 117 through an interface 140. The client computer 130 runs a browser or a similar HTML rendering application so that it is able to browse standard web pages rendered by the server 100. Optionally, a second computer 160, which is also operated by its own operating system, has a network interface 165, and is connected to the Internet 117 through its router 170. Naturally, additional client computers are necessary for additional users. In this system, each of the client computers is able to access the server using WWW protocol and access the web pages sent by the server according to any of current standard HTTP protocols (1.0, 1.1, and 1.2).

To provide the full disclosure, the table structures of a complete database in one version of the preferred embodiment is disclosed and discussed in relevant sections. This database does not show any data tables since they can be created and deleted anytime. The example table structures are disclosed to show the concept of the invention. Different table data structures can be created with correspondent changes to the navigation bar.

B. Different Roles of User Accounts and Data Validation Framework

A typical home page contains today's date, project code, and user name. In the center is also the full name of the project such as "Oak Privilege Task." The project information is saved in a groups table: create table groups(group_id int nullauto_increment primary key, group_code varchar(10), group_name varchar(50), login_method ENUM ('G','P','A'), allow_admin_access ENUM('Y','N') default 'Y', board_status ENUM('T','F') default 'T', pad_record_size int NOT NULL default '500', reg_date timestamp NOT NULL default CURRENT_TIMESTAMP, logindate timestamp NOT NULL default '0000-00-00 00:00:00').

Figure 2:
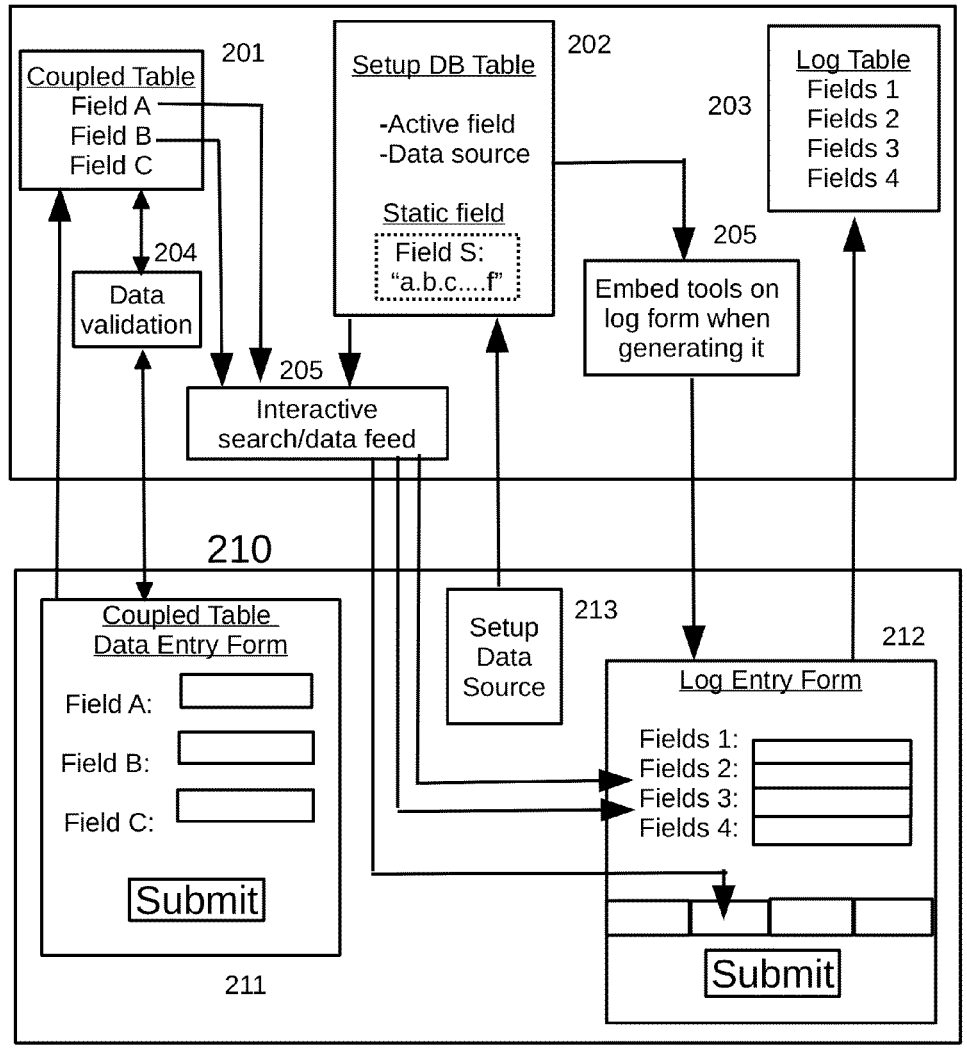
FIG. 2 shows the relationship between a coupled table and a log table.

The log system of the present invention is achieved by using a coupled table (FIG. 2). FIG. 2 shows that the log system is configured for producing a log 203 by using the coupled table 201. The user can add data to the coupled table at Block 211. The coupled table 201 contains at least one column of data, which help the user determine if a log entry should be made in Block 212. Thus, the more data the user has entered in the coupled table, the more useful the coupled table would be. When the couple table 201 contains a large amount of data, the system uses interactive search feature 205 to retrieve only information in responsive to key. For this log system to be useful, the system also provides a map (the setup table 202) to establish the relationship between the log table 203 and the coupled table 201, and the tool 213 for setting up such a relationship. By using this setup table 202, the system embeds necessary script at Block 205 in support of interactive search.

For a log system, the coupled table is a names table containing attorney names. In a production log concerning document significant levels, the coupled table might be a table containing hot issues. In antitrust litigation, the hot issues might include destroying competitor's ads, threatening competitors sales staff, destroying sale racks, engaging price wars, and making anti-competitive statements. The number of hot issues from transactions, price lists, promotional activities, employees' activities, and statements may be so large that it requires a coupled table. Product recalling log is another example. After a company has distributed millions of products, it then found that one or more components falling in certain serial numbers are defective. The company may need to build a recall log. The company checks each product and compares found component serial number with the serial number of defective components to determine if a product record should be created for recall.

In a log production system, it is desirable to have flexible quality-controlling process. Classic quality controlling process is based upon the concept that data validity can only be determined by skilled humans. Although many quality controlling concepts are known, their applications are inefficient. Therefore, this invention provides a standardized framework for data quality control. One prerequisite is of course that the log production system is implemented with at least two tiers of user accounts: accounts for privileged users or managers, and accounts for project members. When the multiple-tier-account system is implemented with data ownership, data quality marking, different web views, and all web-embedded validation tools in conjunction of required server programs, it provides the best data quality assurance environment. The data validation environment is same for all log tables and coupled tables.

First, all data records are classified as tentative records and validated records. Tentative records are the records that are proposed but their validity has not been confirmed. Validated records are the records that have been validated by users. The status of each records are stored in the table: create table records_circumstance(board_id int, record_id int, usr_id int, vote_status ENUM('0','1','2','9','10') default '0', [0 for not do anything, 1 for vote, 2 for cancel, 9 for validated by manager, 10 for validated by vote] vote_date varchar(100), revoke_date varchar(100), access_date varchar (100)). The general rule is that any member can propose a tentative record that can be deleted by the member if Access Right is set as private edit or by any other member if Access Right is set to public edit. After a data record is validated, only authorized users can delete or edit it. The general users cannot delete or edit it. The data validation status may include N types such as tentative, first validated, second validated, special-validated, and finally validated. Data validation status may be designed as $(T, V1, V2, V3, V4, \ldots, Vn$ or $0, 1, 2, 3, 4, 5, \ldots, n)$. Only one character storage size of the type variable is needed and the designations of types are arbitrary.

When a data table such as a production log table or name table is displayed in a web page, the web page has a view-selecting tool bar or menu, which allows the user to select different views: Validated Table, Tentative Table, Combined Table, Edit Table, and Look-up Table (Block 701 in FIG. 5A). A tentative table shows only newly admitted data records, which can be deleted by the user. A validated table contains only validated data, which cannot be deleted by the owner. The combined table contains both validated and tentative records just like a conventional table except that two types of data are marked differently with different embedded scripts. If validation statuses of data records are assigned with multiple views, a view page or table, whether it is generated by a fixed button or by a quick search method, should be available for retrieving desirable data records. While those views are referred to as tables, views, or web tables, the data on different views actually come from the same database table. Each of the view tables shown in FIGS. 5A, 5D, 5F has a table name, a title, a search input box at the top, a table body, and a plurality of action buttons above the table body or below the table body. The number of data fields and their data types of a data table depend on table structure. Although all views are not required in all cases, their utilities vary.

Edit table view (FIG. 5D) is a web table that allows users to globally edit records according to different rules. For only two validation statuses, it shows only tentative records, the validated records, and both tentative records and validated records. If the data validation statuses have N values, the data records may be marked with a unique color for each validation status. By proper modifications, the Edit Table may support data records from two statuses to several statuses. By changing validation setup, the users can validate data records from status one to status two. After one validation is finished, the user can change the validation setup to allow the users to validate the data from status two to status three. This successive validation scheme may be useful in a highly complicated litigation environment, where multiple matters, multiple parties, multiple law firms, and multiple agencies are involved. In such cases, the client may share certain common data such name data, privilege log, production log, and hot document log, but must determine if certain adjustments are made in light of their objectives and strategies.

The log production system provides a convenient and reliable way of validating data. Validation route (also "validation page") determines where data are validated. If a data table is setup with a tentative table as a data validation route, the tentative table shows only the tentative data records while the validated table shows only the validated data records. It is on the tentative page, tentative records are viewed and validated by a privileged user or a group of users. If a data table is configured with a combined table as a data validation route, all validated and tentative data records show up in the combined table while the validated table shows only validated data records. Each of the tentative records has a check box and has plural operation buttons including "Validate" and "Vote" at the top or bottom of the table so that the privileged users can view and validate data records by direct validation or casting a vote. A validation page is created for right users who have right to validate data records.

Figure 4F:
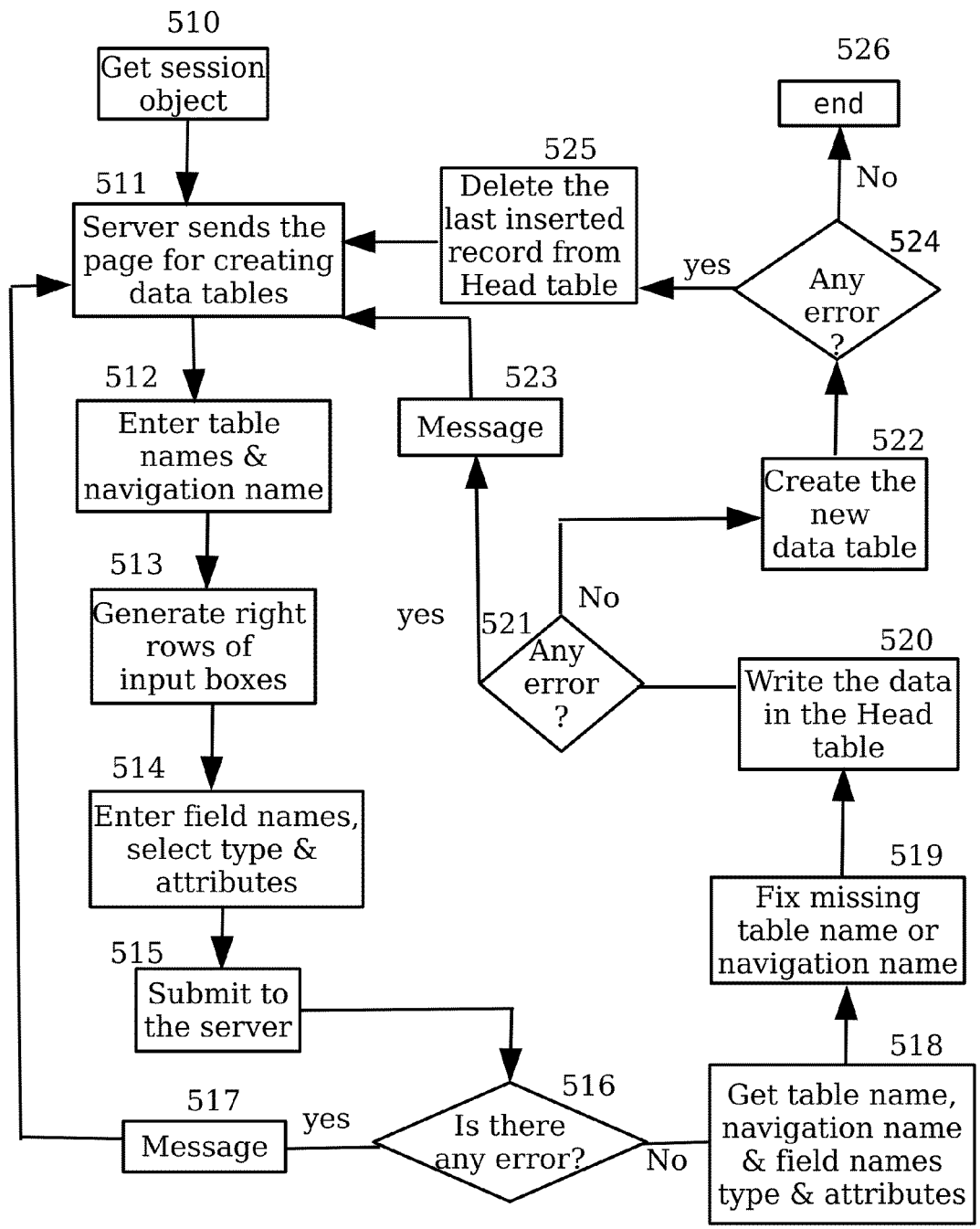
FIG. 4F shows the process of creating data tables from a web page.
Figure 4I:
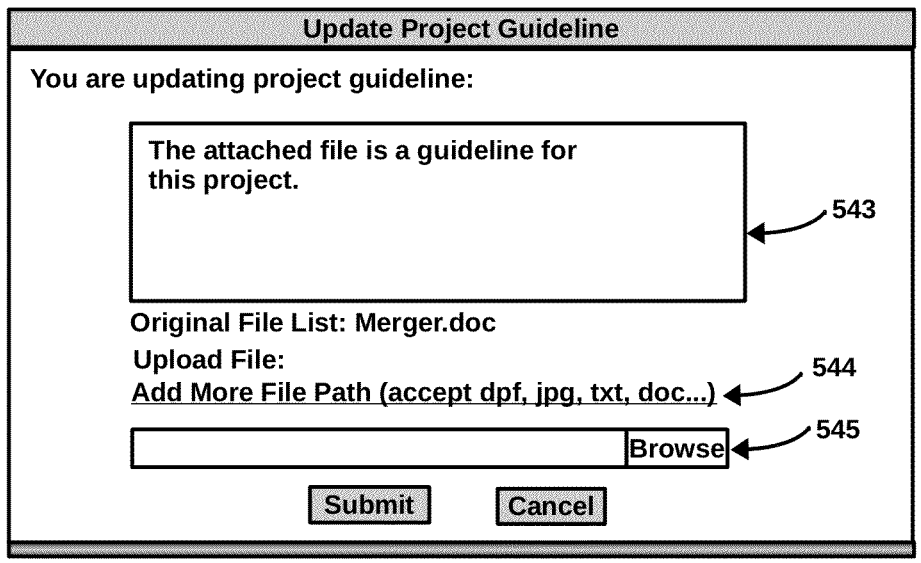
Figures 5A, 5B:
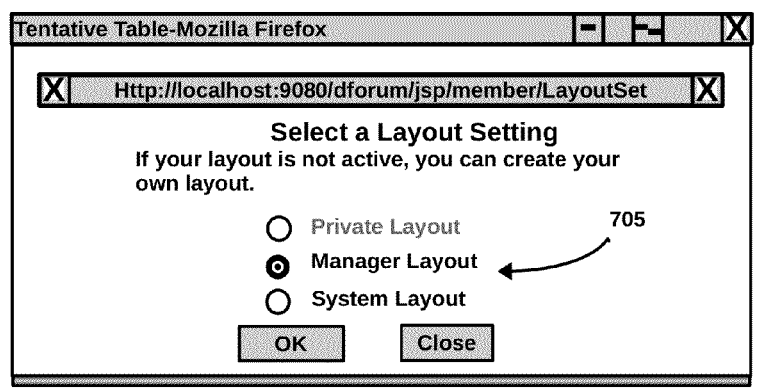
FIG. 5A shows the Tentative table of the names table where the operational functions include "Enter," "Delete," "Vote," "Revoke," and "Edit."
FIG. 5B shows the pop-up page for selecting a display layout for a data table view.

Each of the views for each configured table has search and sorting functions (FIGS. 4G, 5A, 5F). Each of the column names in the column header is also a link for sorting data records. By clicking a column name such as "Events", "Date" or "Comment" in the transaction table (FIG. 5F), the browser sends a sorting request to the server, and the server retrieves the data by using the same search method, sorts retrieved records by using the column, constructs the same web page, places those data records on the web page, and sends the page to show the same page.

Figures 5C, 5D:
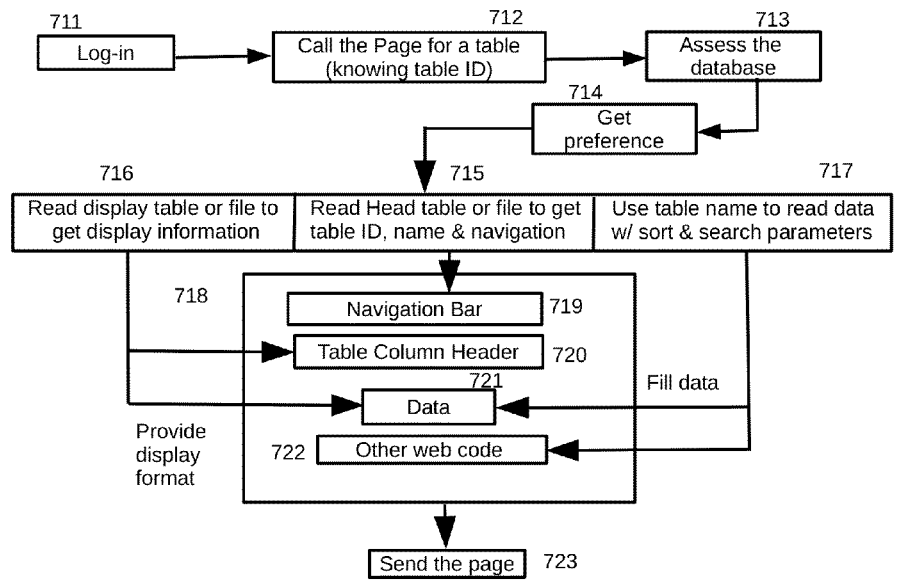
FIG. 5C shows the process of building a web page by using the information from display setup table, the head table, and a configurable data table.
FIG. 5D shows a Edit Table page for editing a plurality of data records in a table format.
Figures 5K, 5L:
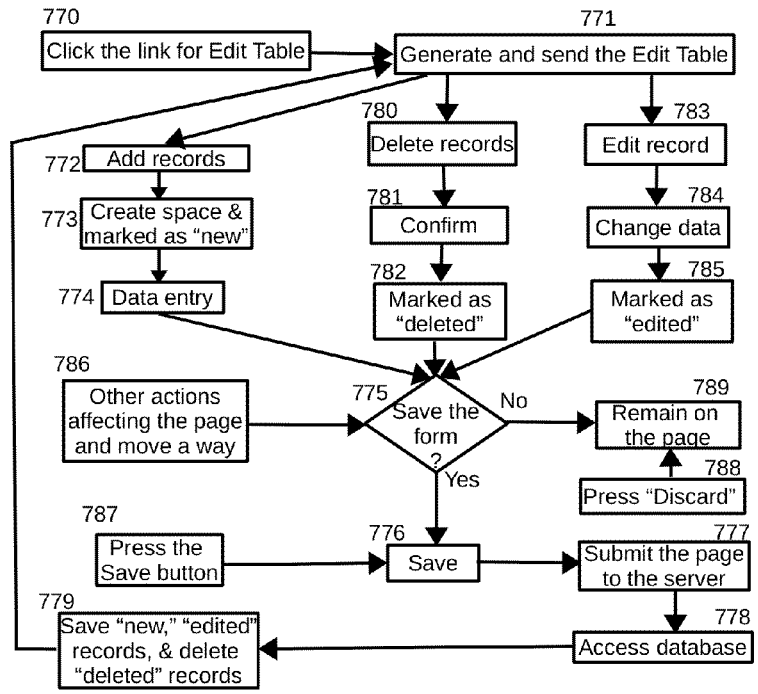
FIG. 5K shows how the server keep track of changes in response to user actions for the Edit Table page.
FIG. 5L shows the search result from conducting a global search, which searches the key in all data tables, discussion table, and personal server pad table, and displays the result according to user-selected choices.

A global search function is placed in the table header region above the main navigation bar of every view page of each data table (FIG. 4G). When a search key is typed in this box and the page is submitted, the server searches through all configured tables, personal server pad table, email, and discussion board, and retrieves all records matching the search key. A search result from a global search is shown in FIG. 5L. Plural search keys separated by space are treated independently, although different search logic may be added. Retrieved data records are arranged, according to the tables that have matched records. On the result page, the user can change the sort order by selecting a table at Block 790 to be shown first. In addition, the user can select sorting key at Block 791 from the columns of the selected table. If the records from the discussion board are displayed first, the available ordering criteria are ID, email, phone, issue, IP, post date, search key, and content.

All pages have a page-navigating bar ("page navigation controller"). It has an input box to enter a page number for the server to find and a drop-down box for changing the number of records per page. The look looks like "Page 1 of 2, Go to page [ ] [GO]: Records per page [5] per page: Next Last." Where [ ] denotes an input box, and [Go] means a button. The user can go to any page by typing a number in the input box and then clicks the "Go" button. The drop-down box right after "Records per page" allows the user to change number of records per page. The default numbers may be 5, 15, 40, 60, and 100. The last two words are links that allow the user to go to next page or the last page. The page-navigating bar may be in any of those well-known types used in the Internet.

The number and function buttons (e.g., 703 in FIG. 5A) on a view page depends on the validation method for the table, and the account under which the page is opened. If a data table is set up with manager validation, the validated view under the manager account has "Enter", "Delete" and "Edit." The tentative or combined page under manager account also has a "Validate" button and optional "Validate All" button. The tentative page or combined page under a member account will have "Edit," "Delete," "Enter," "Vote," and "Revoke." In this case, the "Vote" and "Revoke" allow the members to vote for selected records or retract a vote.

TABLE 1

Functional Keys on Different Pages in a Preferred Embodiment

| User | Validation Method | Table Views | Functions/Buttons |
|---|---|---|---|
| Manager | Manager | Validated | Edit, Delete, Enter, Remand |
| Manager | Manager | Tentative/Combined | Edit, Delete, Enter, Validate, Validate all |
| Manager | Vote | Validated | Edit, Delete, Enter, Remand |
| Manager | Vote | Tentative/Combined | Edit, Delete, Enter, Vote, Revoke |
| Manager | Manager/Vote | Validated | Edit, Delete, Enter, Remand |
| Manager | Manager/Vote | Tentative/Combined | Edit, Delete, Enter, Validate, Validate all, Vote, Revoke |
| Member | Manager | Validated | (None) |
| Member | Manager | Tentative/Combined | Edit, Delete, Enter |
| Member | Vote | Validated | (None) |
| Member | Vote | Tentative/Combined | Edit, Delete, Enter, Vote, Revoke |
| Member | Manager/Vote | Validated | (None) |
| Member | Manager/Vote | Tentative/Combined | Edit, Delete, Enter, Vote, Revoke |

The users ability to edit and delete records depends upon data access rule. If the table is setup with private edit, the member can delete only his own records. Public edit allows the member to edit and delete records of other users. The function buttons on the managers validation page consists of "Enter," "Delete," "Edit," and "Validate." The manager uses the "Validate" button to validate data records. The manager is allowed to delete and edit data records on the validation page while the members right to delete and edit data records is limited by the data access rule.

If a data table is set up with members' voting validation method, the bottom buttons on the member's validation page includes "Enter", "Delete", "Edit", "Vote" and "Revoke." The Edit button allows the member to edit records according to data access rule (this button is not shown in all drawings). The member can cast a vote for any tentative record and the manager may cast votes like any users. The buttons are placed on the tentative table or the combined table, depending upon the data validation route that the table uses.

If the table is setup with both manager's validation and members voting validation, all six buttons "Enter" "Delete," "Edit," "Validate," "Vote" and "Revoke" are placed on the managers validation page. The manager can validate data by both validating data records and voting on data records. Five buttons "Enter," "Delete," "Edit," "Vote" and "Revoke" are placed on the members tentative table page or combined table page, depending upon the validation route used for the table. The manager is allowed to delete and edit data records on the validation page while the member's right may be limited by the data access rule.

Despite the complex of the buttons, all tables must allow the user, both manager or members, to enter and edit data records; the manager is allowed to delete any records on both validated table and validation page, but each of the members is allowed to delete his own tentative records if data access rule is set for private edit or delete any of the tentative records if data access rule is set for public edit; the manager uses the Validate button on the validation page to validate data records while each of the members uses the Vote and Revoke on the validation page to cast vote or retract vote; and all validation buttons are placed on validation page where data are validated.

The validated table is intended to show only validated records. Therefore, members are not allowed to delete or edit any validated records. The action buttons on the managers Validated page allow the manager to change and delete any of the validated records. Managers, by using the "Remand" button, can remand validated records to a tentative table and combined table with the initials in the App field deleted. However, there may be a need for editing validated records globally. For example, the manager may need members to rework on all data records. One way the manager can do is to change the statuses of data records so that they are routed back to the validation table where the members can edit. If rework is to be done by all members, the manage may change the validation status to tentative status, and change the data access rule to pubic edit. After the users edit data records, the data records are then validated and routed back to the validated table. If the data records are assigned with a plurality of validation statuses, the manager can change the validation status by incremental validation, and set up public edit for the table. The validation routing scheme and validation methods can work together to meet a variety of needs. Additional buttons may be added for validating the entire database table by a single click and for remanding validated records by user selection, display scope, search scope, and whole table.

C. Set Up Project Functions by Privileged User

The user, who has a manager account, can log in the server by using assigned log-in name and password. Upon logging in, the user is prompted to provide some basic information such as his last and first name, his initials, address and contact for identification purpose. After the password is reset, the user is allowed to access all functions and features of the system within the scope of the project and configure the project, data tables, and all related functions.

The user can set up a project using the page similar to FIG. 3B. The user is first prompted to provide only limited information. On the "Create Project" page, the user is prompted to enter data or select values for project or group full name, project code, shared log in name, shared password, log-in methods, and global default data validation route. Default data validation route is project-wise default value, which can be changed for each of the tables under specific table. On the manager home page (FIG. 3A), there are nine left-side menu:

(1) Change Manager's Password (FIG. 3A), (2) Update Manager's account Information, (3) Modify Project Setup (FIG. 3B), (4) View Project Members (FIG. 3C), (5) Assign Project Members (FIG. 3D), (6) Update Shared Accounts (FIG. 3E), (7) Export Project Files (FIG. 3F), (8) Import Project Zip (FIG. 3G), and Reset Configuration (FIG. 3K) In performing functions 1-3, the server retrieves setting records for edits, and the user then submits updated setting data, and the server gets the submitted data and updates the related database table. The "Assign Project Members" function allows the user to upload a text file containing delimited member names and passwords (FIG. 3D). The server uploads the file, reads data from the file, and splits them into name-password pairs. It then writes the data into the projectmember table for the project.

The system has tools that allow the user to export the whole project or part of the project in either database native format or a human-friendly format (FIG. 3F). The user can select a whole project by clicking "Export Whole Project" button or select tables to export. To export the whole project, the server exports all data and table structures from all dedicated data tables and pad tables, exports data from shared tables such as email, discussion, pad, and instructions, and exports data from system tables. To export partial project, the user selects any of the tables to export. When this method is used, the server exports data and structure from selected data tables and selected pad tables, export data from selected shared tables such as email, discussion, and instructions, and extracts necessary data from system tables. The server saves all files in a temporary folder with different sub folders. The whole folder is then encrypted, compressed, and zipped to form a project zip.

The user can select "Human Friendly File" or "Database Zip File" format for the files to be exported. When project data are in database dump file format, most of the files are human-friendly and can be read after they are decompressed and decrypted. However, all attachments from any table are saved in one single file, and such attachments cannot be opened outside the system. Therefore, it is impossible to access attachments off the system. When "Database Zip File" is selected, the server exports data by using database application's dump tools whenever possible. It exports data from selected data tables to one single file, extracts data from each selected shared table and writes the data in a file, and data from selected attachments table and saves the data in one single file. The server saves all files in a folder with proper sub-folders. The whole folder is then encrypted, compressed, and zipped to form a project zip. If project files are so formed, their portability is also limited. The project file can be uploaded to the server conveniently. After the project file is uploaded, decrypted, and decompressed, it generates all individual files for all tables. The files are imported back to respective data base table on the system.

"Human-friendly format" can keep attachments in their native formats. In creating a Human-friendly project file, project data are retrieved from selected database tables, and placed in a folder for being zipped up. The data include basic information ("group properties") such as owner identity, project name, project password, member list, member accounts, member passwords, and table structure of configured tables. The server writes the data in delimited text files. If a table contains an attachment files in native format (such as Word, Excel, and Wave files), the attachment files are extracted and saved in a proper folder. Email messages may be saved as one or plural text files, and the message bodies of the discussion board are saved as one or more text files. The program also extracts attachments from discussion attachment table, and saves them in a sub-folder. It extracts email attachments and saves them in another sub-folder. Each of the attachments may be renamed by a unique name that might be the message ID appended with a unique string or its posting-date and time so that no name conflicts exist. The folder is then encrypted, compressed, and zipped up to a project zip file. This human-friendly file can be opened and viewed without the support of the database application.

Figure 3H:
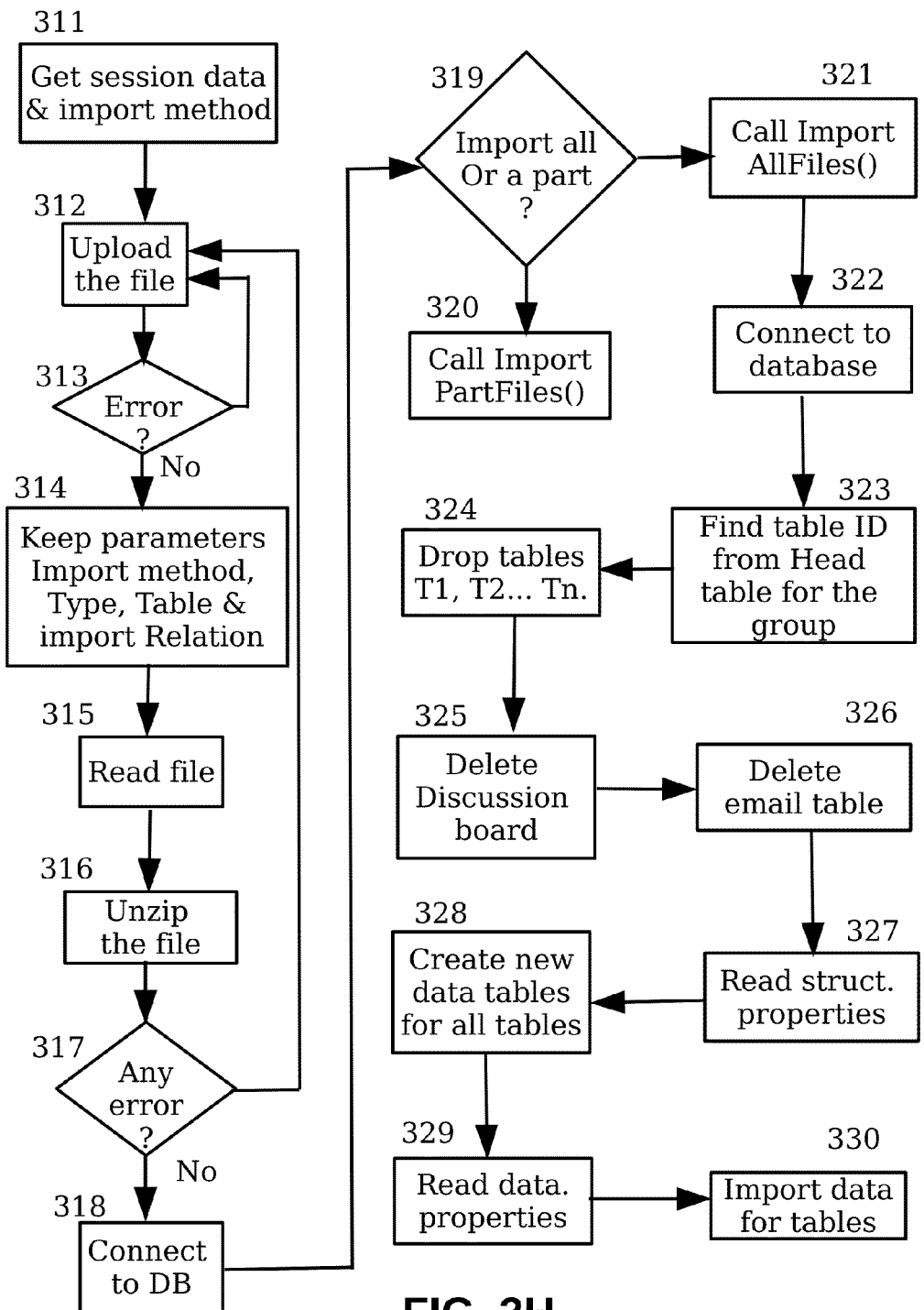
FIG. 3H shows the process of importing project data by uploading a project zip file.
Figure 3I:
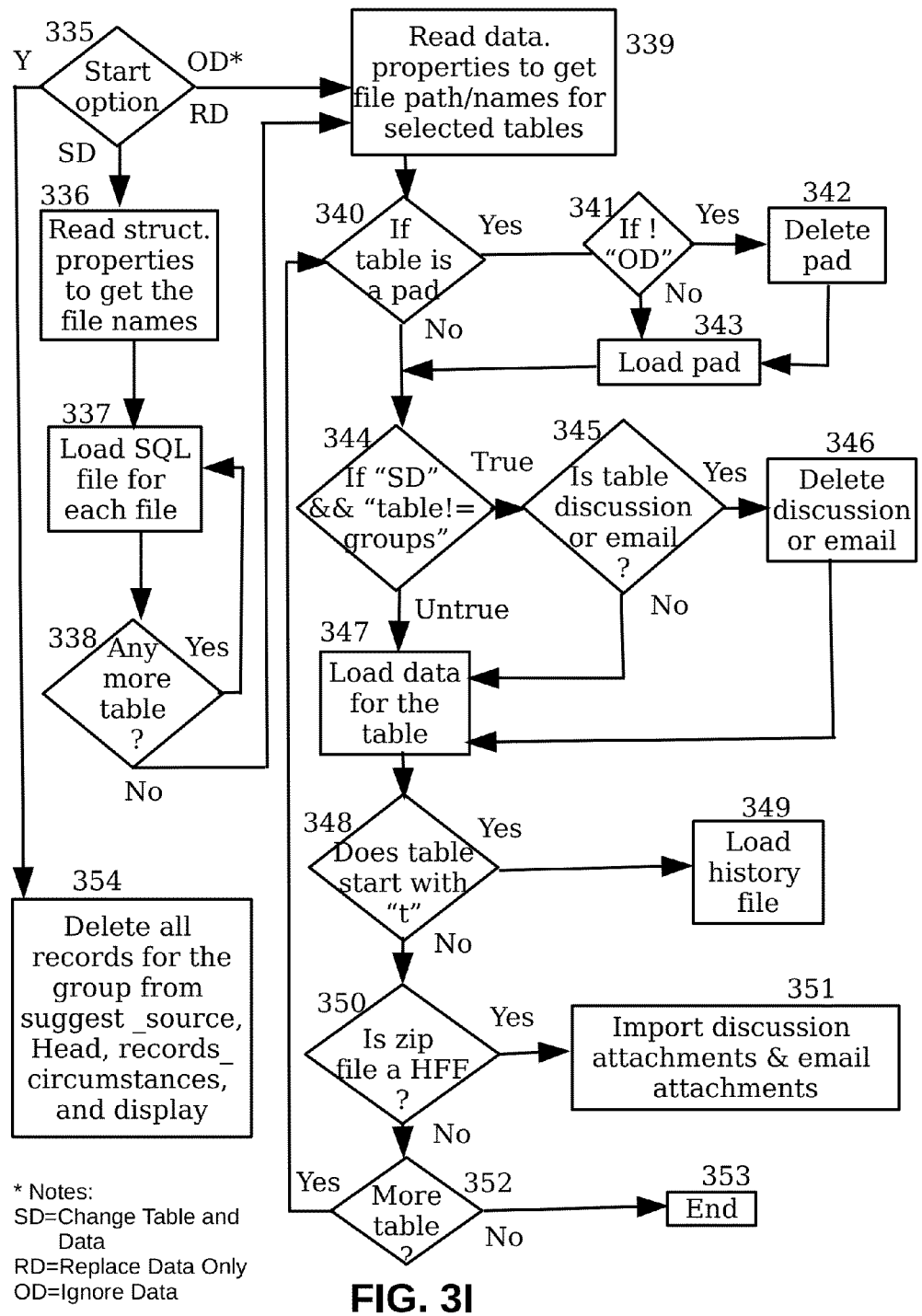
FIG. 3I shows the process of importing partial project from by uploading a project zip file.
Figure 3J:
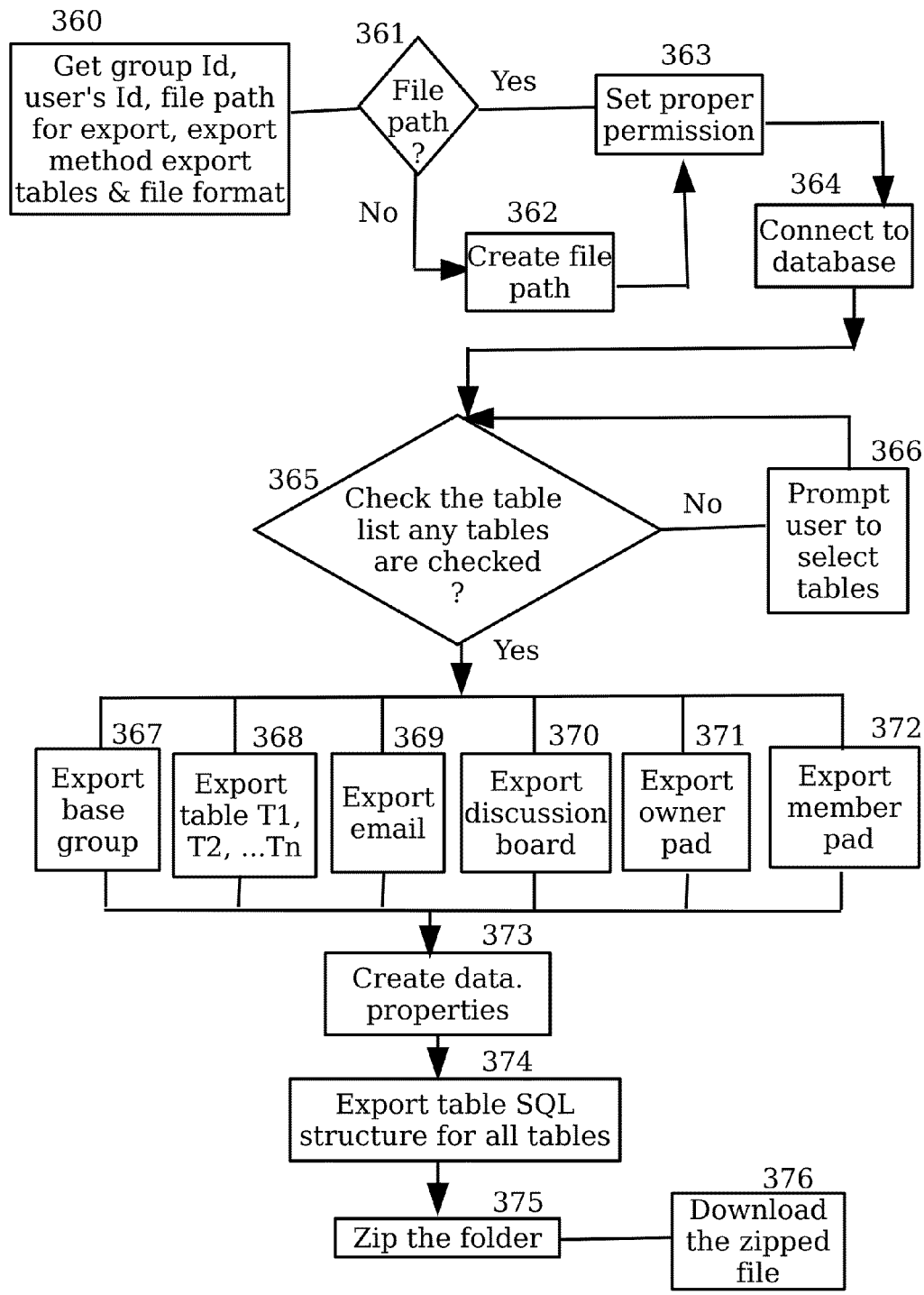
FIG. 3J shows the process of exporting a whole project.

FIG. 3J shows the process of exporting a project. When the user submits the import page, the server gets group ID, user ID, file path, export method, selected table names, and file format at Step 360. The server checks the file path at Step 361, if the file path is valid, the server sets writable permission at Step 363. If the file path does not exist, the server creates a file path at Step 362 and sets writable permission at Step 363. The server connects to the database at Step 364. It then determines which of the tables have been selected for export at Step 365. If the user has selected no table, the server prompts the user to select tables again at Step 366. Otherwise, the server checks each of the tables, exports only those tables that have been selected at Step 365. The server exports the groups table if the groups table is selected at Step 367. The server exports each of the selected data tables at Step 368. The server exports the email table if it has been selected at Step 369, exports the discussion tables if it is selected at Step 370, exports the owner pad table if it is selected at Step 371, and exports members' pads if they are selected at Step 372. Each time when the server exports data from a table, it also adds a record to a properties object by using "properties.setProperty (tablename, tablefile)." When the data of all tables have been exported, the server stores the properties in a file stream by using properties.store(outstream, "set") to create a data.properties file at Step 373. The server exports the table structure of the selected data tables to a file in struct_folder by using statement like "mysqldump -h hostname, -u username -p password -d database ti>struct_folder/tn.txt". In the process of exporting table structures, the server also creates a properties.setProperty (tableanme, tablefile) object. When all structures of all tables are exported, the server saves the object data in the file struct.properties in a properties folder before the file was closed at Step 374. The server then zips up the whole folder at Step 375, and downloads the zip file to the client computer at Step 376. The data.properties file is a map showing the relationship between the table names and data files, while the struct.properties file is a map showing the relationship between table names and table structures in SQL statements.

The project zip file can be imported back to the log system (FIG. 3G). The system allows the user to (1) replace all existing tables and data by tables and data from the imported file or (2) import selected files from the imported file. When the second method is selected, the user can further choose to (a) import table structure and data, (b) replace existing data in the table by imported data, and (c) update data in the table (i.e., keep original data records, overwrite old records by updated or modified records, and add new data records to the table). A project zip file can be uploaded into a manager account for rendering. The files can be imported back to overwrite existing tables. However, any other information stored in program property files should be taken care of separately.

FIG. 3H shows the process for importing a project file. The user gets session identity and initiates the process of uploading project at Step 311. At this step, the user selects an import method from two options: import a whole project and import selected tables. If the user selects the option of importing part project, the user selects tables and has an option of cleaning relation tables (importRelation="Y" or "N"). The user causes the server to upload the file to the server at Step 312. If the server encounters error, it sends an error page. If it runs into no error at Step 313, the server gets the users values for import method, import type, tables, and importRelation at Step 314, reads the file at Step 315, and unzips, decompresses, and decrypts the file at Step 316. If the server encounters error at Step 317, it sends the upload page with an error message at Step 312; or otherwise, the server connects to the database application at Step 318. At Step 319, the server determines whether it imports a whole project or part of a project. If the import method is for part of a project, it calls ImportPartFiles( ) at Step 320 (FIG. 3I). If the import method is for a whole project, the server calls ImportAllFiles( ) at Step 321. The server sets auto-commit to false at Step 322, finds all table IDS for the group in the Head table at Step 323, constructs table names by using prefix "t" and respective table IDs for all data tables and drop each of the tables at Step 324. Optionally, this step deletes all history tables by executing a similar command. The server deletes data from the discussion and email tables at Steps 325 and 326. The server reads struct.properties to get the paths and file names of all files containing the table structures of all data tables to be imported at Step 327, and loads by using a database command each of those files into the database, thereby creating new data tables at Step 328. The server then reads data.properties to get the paths and file names of all files containing the data of the tables to be imported at Step 329, and loads the data from the files into the database at Step 330. In addition, since pads tables are not listed in the Head table, the server cleans it if it exists in the system. If the import file is in human friendly format, the process also includes a call to load the discussion attachments and email attachments and inserts each of them into discussion attachment and email attachment. The server knows the locations of all individual files within zip folder by reading struct.properties and data.properties.

To import selected tables, the user has three import methods to choose: import table structure and data (ImportMethod="SD"), replace existing data (ImportMethod="RD"), and add data (ImportMethod="OD"). In addition, the user can indicate the need for cleaning entries in all related tables (importRelation="Y" or "N"). When the page is submitted, the program calls ImportPartFiles( ). FIG. 3I shows the steps of importing part of a project. If the user has chosen to import both table structure and data ("SD"), the server reads struct.properties file to get file paths and file names for the data tables to be imported at Step 336. The server then loads each of the files by using the database command, thereby creating each of the data tables at Step 337. In this step, the server skips the table if its name does not start with "t" and finds the file name for each of the tables selected by the user. If the user selects a table, but the server would not find the file containing table structures, the server skips this table. For each of the data tables for which a proper table structure is provided, the server imports it by using a MYSQL command. "mysql -h serverhost -u username -p password database<dirpath/filename" The server repeats this process at Step 338 until all selected tables are created. The server then reads data.properties file to get the file path and file name for data for all tables (including email, pad, discussion, and other tables) at Step 339. The server then goes through all tables from Step 340 to 352. If the table is a pad table at Step 340, and if the import method is overwriting data, it deletes the pad data at Step 342 and loads pad data at Step 343. If the table is not a group table and the import method is to import table structure and data at Step 344, it proceeds to check it the table is a discussion and email table. It the table is an email and discussion table, it deletes the data for the group at Step 346. If the table is other table at Step 344, it directly proceeds to load data at Step 347. If the table is one starting with "t" at Step 348, the server also loads history data at Step 349. The server determines from the name of the properties files (data.properties v. data_f.properties) whether the exported file is a native database file or a human friendly file at Step 350. If it is a native file, it ends here. If the file is a human friendly file at Step 350, and, if the table is discussion or email table, the server imports email attachments or discussion attachments at Step 351. The server determines it has more tables to be imported at Step 353. If it has no more tables, it ends at Step 353 or goes back to Step 340.

A project zip file may be loaded on the system from server terminal by using a server program. A command may be like "pimport project-file-path." The program in response prompts for a project password. Upon receiving the password, the program decrypts the project file, reads data from resulted files, and writes data into relevant database tables.

Figures 3K, 3L:
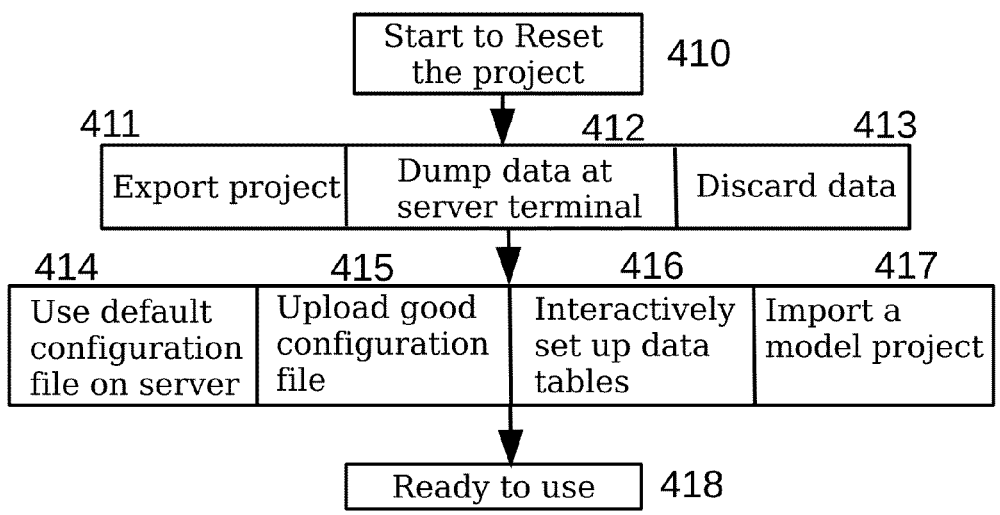
FIG. 3K shows the page for resetting all data tables for a project.
FIG. 3L shows all methods for modifying, deleting and adding data tables.

A configuration file can be used to instantly reset the table structures under the project scope (FIG. 3K). The user can invoke this function by using "Reset Configuration." The configuration file must be tested in advance before it is used or tested in a spare system. It contains table number, table structure definitions, optional navigation names, and optional table names. This configuration file is preferably in text format although it may be in any other suitable formats (additional tool may be used to create a file that cannot be read by humans). The purpose is for the program to create data tables in the system instantly anytime within a project life cycle. The data structure for any of the data tables may be: "Table_Id; navigation_name; table_name; table_structure; feature" A plurality of entries may be used. The statements may be: "Table_Id; table_name; table_structure; feature)", "Table_Id; navigation_name; table_structure; feature", "Table_Id; group_Id; navigation_name; table_name; table_structure; feature." Other scheme for a configuration file is "navigation_1; navigation_2; navigation_N;" "table_name_1; table_name_2; table_name_N" "table_structure_1; table_structure_2; table_structure_N", and optional "feature_1; feature_2; feature_N." This scheme may be simplified by omitting the statement for table names and table names are created using a string such as "table" or "t" affixed with a unique index so they look like Table1, Table2, . . . and TableN. The same scheme may be simplified by omitting navigation names. In this case, navigation names are created using a string such as "Table" or "Board" or a user-provided string affixed with an index number. Group ID is optional because the file belongs to the group for which the manager uploads the file. Table_id is useful but can be omitted by using its appearance order. Table ID or indexed table names (i.e., t1, t2 . . . tn) may be used so that the configuration file supports the methods of the properties class. If a feature is not defined, the system uses default values and the user can set up the feature later. The table structures discussed above may follow the following formats: "field_1 varchar(50), field_2 varchar(20), Date date, Type tinyint" or "field_1 text 50, field_2 file 50000, finish-date date, count int, amount float." The second line is table structure in lay language. The scheme may be in any form, but it is translated into a SQL statement for creating a table. One example configuration file contains the following data structure:

```
# Sample format: t(0,1,2...n)=navigation; table_name; table structure
t0=Change; Change; Events varchar(30),Date date,Comment varchar(300)
t1=Transaction; Transaction; Transaction_name varchar(100),Date
date,Comment varchar(1000)
t2=Names; Names; Email varchar(50),Firstname varchar(20),MI
varchar(20),Lastname varchar(20),Company varchar(100),Date date,Type
tinyint,Comment varchar(500)
t3=Acronym; Acronym; Acronym varchar(20),Full_name
varchar(200),Comment varchar(500)
```

The instructions for each table follows the format: t(0, 1, 2 . . . n)=navigation_name; table_name; table structure. The configuration file contains statements for creating four tables (Change, Transaction, Names and Acronym). The statements for one table is in one line, or terminated with a unique character or a combination of characters so the program that processes it can split up them accordingly. The statements of defining table structures are similar to SQL statements. If they are in a plain language, they must be translated into SQL statements. The table name and navigation name for one table may be the same. This configuration file format supports the common methods of the properties class.

On the page for uploading configuration file (FIG. 3K), the user has the options to (1) restore all project settings to system default, (2) delete all project data from all tables including email and the discussion board under the project, (3) reset selected tables by a configuration file, and (4) reset all tables by a configuration file. Option (1) is for resetting project settings to particular table structures by using a configuration file that has been placed in a specific folder. The default table structures can be changed by changing this file. Option (2) is for deleting the data from all data tables and all other shared tables under the project. The data from selected tables will be deleted without toughing table structures. This function is similar to initializing data objects. The option (3) is used to selectively reset the table structures. By using this option, only selected tables are overwritten by the table structures in the configuration file. In operation, the user selects an option and clicks the OK button. The system first uploads the configuration file to the server, saves the file in a temporary folder, and reads the information about table names, navigation names, and table structures, and overwrites selected existing tables with the table structures having the same name. The configuration file may contain N blocks of definitions for data tables. If the first and fourth tables are marked for being reset, and the server finds identical tables for those two entries, the server purges the first and fourth tables and recreates table by writing table structures using the statements in the configuration file. If identical name tables do not exist on the configuration file, or the number of definition blocks is insufficient, the system responds with an error message and will not touch existing tables. An alternative match method would be that the existing tables are replaced by the tables in a sequential order. The first block data is for the first selected table, and the second block data is for the second selected table. This would allow the user to change table names. The user can preserve existing tables by not selecting the tables. If the number of tables on the configuration file is fewer than the number that the user has entered, the system returns a warning, and rewrites the tables with the available tables in the configuration file.

Option (4) is used to reset the entire table structures under the scope of project by uploading a configuration file. In operation, the user browses the client computer to find the file path of the configuration file. Upon submission, the server uploads the file, saves it in a temporary folder, reads instructions (table names, navigation name, and table structure definitions) from the file, drops all data tables, deletes project data from shared tables such as email, discussion and personal pad, uses the navigation name and table name in the head table, and creates data tables using the table structure definitions. If the number of data blocks containing table names and table structures is fewer than existing tables, the system will create only tables with available table structures. All existing tables are purged from the system and all data are deleted. This function allows the system to change over data table structures instantly. It will not affect the table structures under another project and will not affect shared tables and system tables.

Figure 3M:
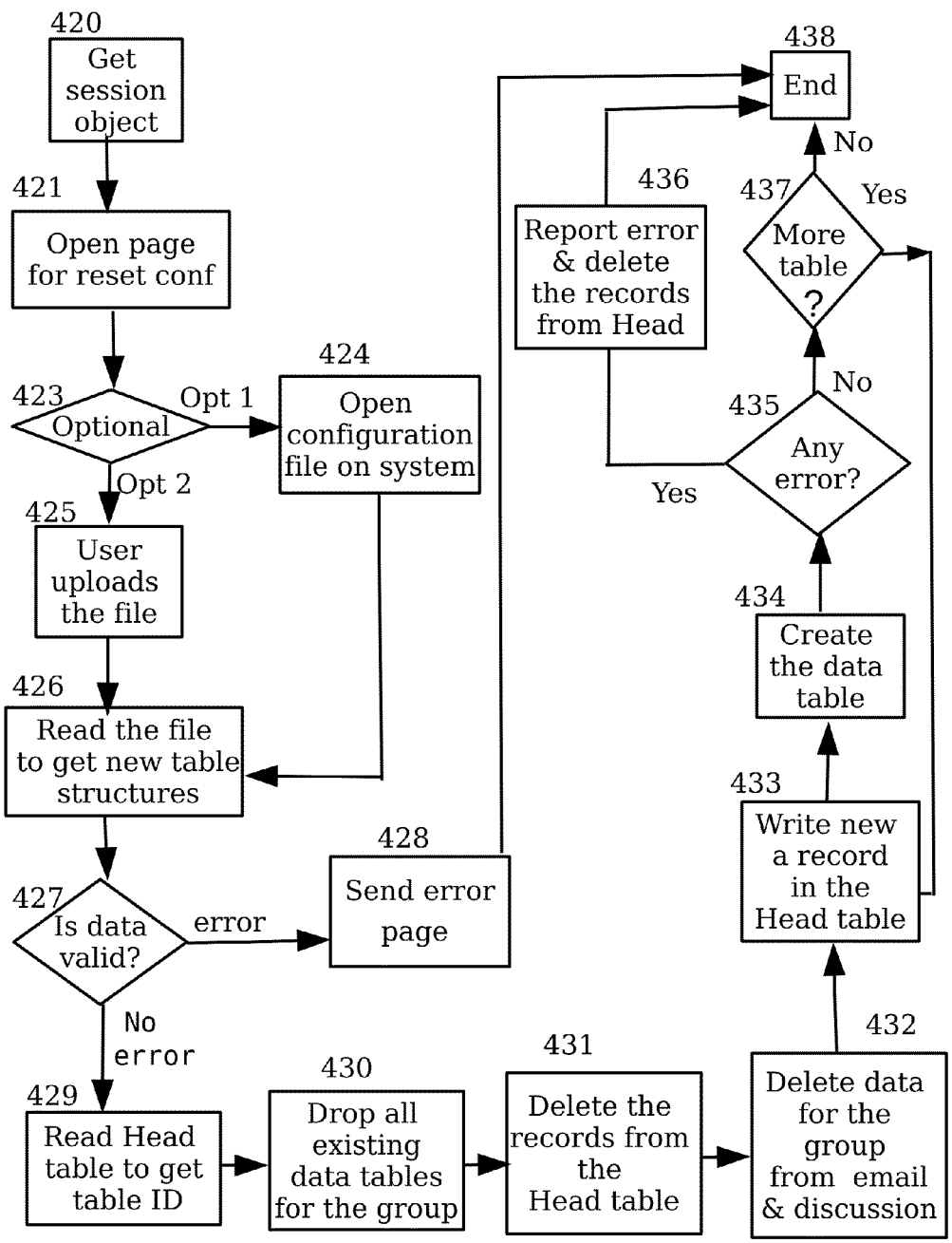
FIG. 3M shows the process of resetting data tables by using a default configuration file or by uploading a configuration file.

FIG. 3L shows the reset cycle from start at Step 410 to a ready state at Step 418. The system may treat data by exporting project at Step 411, dump data at terminal at Step 412 and discard data at Step 413. It can reset data tables by default configuration file at Step 414, uploading configuration file at Step 415, interactive setup at Step 416, and importing a model project file at Step 417. FIG. 3M shows the process for resetting data tables. The user gets session object at Step 420 and opens the page for resetting system configuration at Step 421. The system presents two options: uploading a configuration file and using a default configuration on the system at Step 423. If the user chooses default configuration at Step 424, the server reads the default configuration file at Step 426. Otherwise, the user uploads a configuration file at Step 425. At Step 426, the server reads the file to get new table structures, table names, and navigation names. If the file can't be opened or no data in the file, the server sends an error reporting page at Step 428, and ends the operation at Step 438. If the server finds no error at Step 427, it reads the Head table to get all records for the project at Step 429, drops all existing data tables by using the table ID and prefix "t" at Step 430, deletes records for the project from the Head table at Step 431, and deletes data from the discussion and email tables at Step 432. The server uses the table structure to write records in the Head table in one record a time at Step 433, and creates a new data table at Step 434. If there is error in creating data table, the server sets error variable with a message at 436, and ends at Step 438. If no error was encountered at Step 435, the server checks whether it has more table to be created at Step 437. If more table is to be created, the server goes back to Step 433, otherwise, it goes to the end at Step 438.

A variety of configuration files are designed for site uses. Generally, similar cases require similar data tables and data structures while different cases require different tables and different table structures. Therefore, different configuration files may be customized for different types of cases such as foreign corrupt practice investigation, securities class actions, patent litigation, and cooperate mergers. Before any of such operations, the server sends a message to prompt the user to save existing project data by using the export function. If there is a need to change the system back to the old system's table structures, the user can upload the project zip file.

D. Set up Data Tables and Related Functions

On the manager's home page FIG. 3A, the user can invoke "Setup Tables" which is shown in FIG. 4A. The "Setup Tables" page contains a list of functions: "Data Entry," "Modify Table," "Delete Table and Backup Data," "Advanced Setup," "Layout," "History Table," and "Upload Data." If the project has been set up with Notes, Names, Privilege-Log, Doc-Log, and Hot-Log, the "Setup Tables" page has five lines of links, each for one data table. The data tables and correspondent navigation bars can be changed instantly. Each of the navigation buttons except the "Discussion" and "Pad" buttons are associated with a data table ("configurable table"). Each of those tables may be modified or deleted by using those links from a client computer. When a data table is deleted, the original name on the navigation bar is replaced with nothing or notation "Table#," which will return a warning message if the user clicks it. The user in manager role can use any of the configured data tables, discussion board, and server pad as any user does.

The default configuration data may be saved in property files, a default configuration file, or even directly written in the program. The default tables can be created at the time of creating the project. All data tables and all related functions are fully functional after a project is created. The user can modify any of the default tables by using the functions under "Modify Tables." The link for the Pad allows the user to change the record size of data records. The email and discussion tables are not configurable.

All data tables are tracked by a database table: Create table Head (board_id int auto_increment primary key, group_id int, navigation varchar(15), board_name varchar(20), board_status ENUM('T','F') default 'T', has_records ENUM('Y','N') default 'N', validation_method ENUM('0', '1','2') default '0', votes int, access_rule ENUM('0','1') default '0' create_date timestamp NOT NULL default CURRENT_TIMESTAMP). Board_status denotes validation route: T for tentative table, and F for combined table; Validation_method signals validation method: 0 for manager validation, 1 for validation by vote, and 2 for both manager validation and members voting validation. "Data_access rule determines if data can be edited by other users: 0 for private edit and 1 for public edit. The numeric values for validation status are arbitrary and different values can be used to achieve the same results.

The setup table page (FIG. 4A) contains all menus for setting up and changing data tables. The "Data Entry" link is for invoking a page for adding records, which is similar to the page in FIG. 5I. The page for typical name table includes the fields: email address, first name, middle initial, last name, company, dates, type, and comment. "Date" means the date of the document; "type" indicates whether a person is a party's attorney, opposing attorney, clients employee, or other third party; and "comment" is used to store important information concerning the record. "Comment" may include person nickname, initials, or other notations. At the bottom, there are two buttons: "Submit Record" and "View the Table." If the user clicks "View the Table," the server sends the page for showing the tentative records if the table is set up with a tentative table as validation route, or a combined table if the table is set up with a combined table as validation route. The data entry pages for other data tables are similar to this page except that they may have different field numbers, field types, and field names.

To create a table, the user clicks the "Setup more Table" at bottom or "Setup Table" which appears after a configured table has been deleted (FIG. 4A). The process of creating a data table is shown in FIG. 4F. The server sends the page at Step 511 (FIG. 4B). The page contains an input box for table's navigation name, one input box for table name, and two buttons: "Insert Entry" and "Delete Entry." Below these two buttons, the page has by default one row of data input boxes for accepting the definitions of the first column of the table. By clicking the "Insert entry" button once, it generates one row of input boxes. The user can delete the last row by clicking the "Delete Entry" once. The user enters table name and navigation name at Step 512, generates a right rows of input boxes at Step 513, and enters field name and select values for type, length, null, and uniqueness for each column at Step 514. The navigation name is used in the navigation bar and the table name is used as the displayed title of the web page. The table name should be one single string without any space. Some words and phrases that have been used by the system cannot be used as table name. The field name should contain no space and special characters. The type of the field can be selected in the drop-down menu, and available choices include integer, tiny integer, char, varchar, double, year, date, time, and date and time. A check box for "Not null" is checked if the field cannot be null. A check box for uniqueness should be checked if the value in a field is unique. The page is submitted to the server at Step 515. If there is error at Step 516, it generates an error message at Step 517 and sends the setup page at Step 511. If there is no error at Step 516, the server gets all data at Step 518, fixes missing table name or navigation name at Step 519, and writes a record in the Head table in Step 520. If there is an error in creating the record at Step 521, the server creates an error message at Step 523 and sends the setup page at Step 511. If there is no error in creating the data record at Step 521, the server creates a data table at Step 522. If the server detects an error in creating the data table at Step 524, the server deletes the created record from the Head table at Step 525 and sends the setup page at Step 511. If the server finds no error in creating the data table at Step 524, it ends at Step 526. If the operation is successful, the server shows the "Setup Tables" page with the newly created table in it.

The structure of any of the data tables can be modified by using the "Modify Tables" link. By clicking this link, the server generates a page titled "Table Structure of Names" (FIG. 4C). The full structure of the names table could have eight rows of data corresponding to eight fields: email address, first name, middle initial, last name, firm or company, dates, type, and comments, but the page shows only four columns. Each row contains field name, type, null flag, and uniqueness flag. There is a check box in front of each row and there are three buttons at the bottom: "Delete," "Add," and "Modify." If the user selects a column (e.g., Last_Name) and clicks the Modify button, the server sends a page titled "Modify Columns for Names" for editing the field in FIG. 4D. This input row is substantially same as the input row used in table of creating new table except that all input fields are filled with original values. Upon edit and submission, the server updates the table structure to reflect modifications. To add a new field, the user clicks the Add button, and the server sends a page titled "Add Columns for Names Table." This page looks like the page in FIG. 4D except that it has the buttons "Insert row" and "Delete row" for adding or removing plural input rows. After the field names are provided and their types and flags are set, the page is submitted to the server. If the new fields are added successfully, the server responds with the same page titled "Structure of Names Table" except that it has newly inserted fields at the end of the table. If the user deletes a field from the table, the field and all of the data in this field will be deleted. After the user is reminded with the risk of losing data, the user confirms the deletion, and the field together with its data will be deleted. The page on FIG. 4C is updated, reflecting the deletion.

Figure 4J:
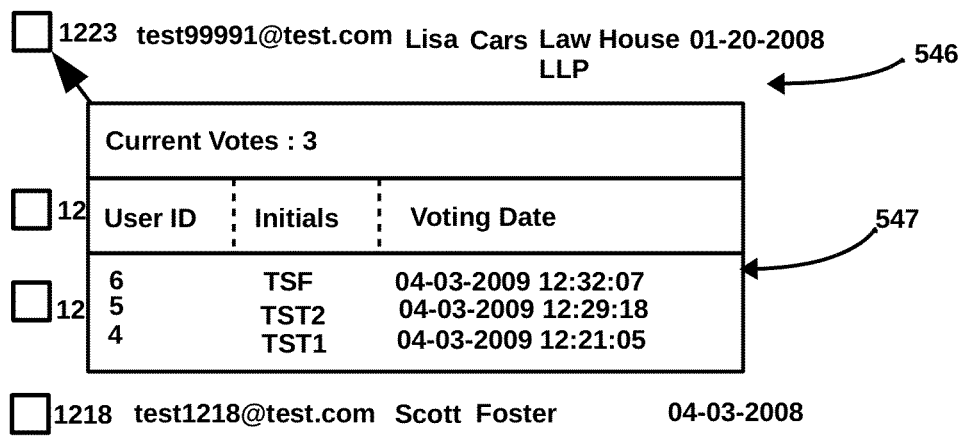
FIG. 4J shows the voting information for a data record in a view table of the names table, as viewed from the manager or a privileged user.
Figure 4L:
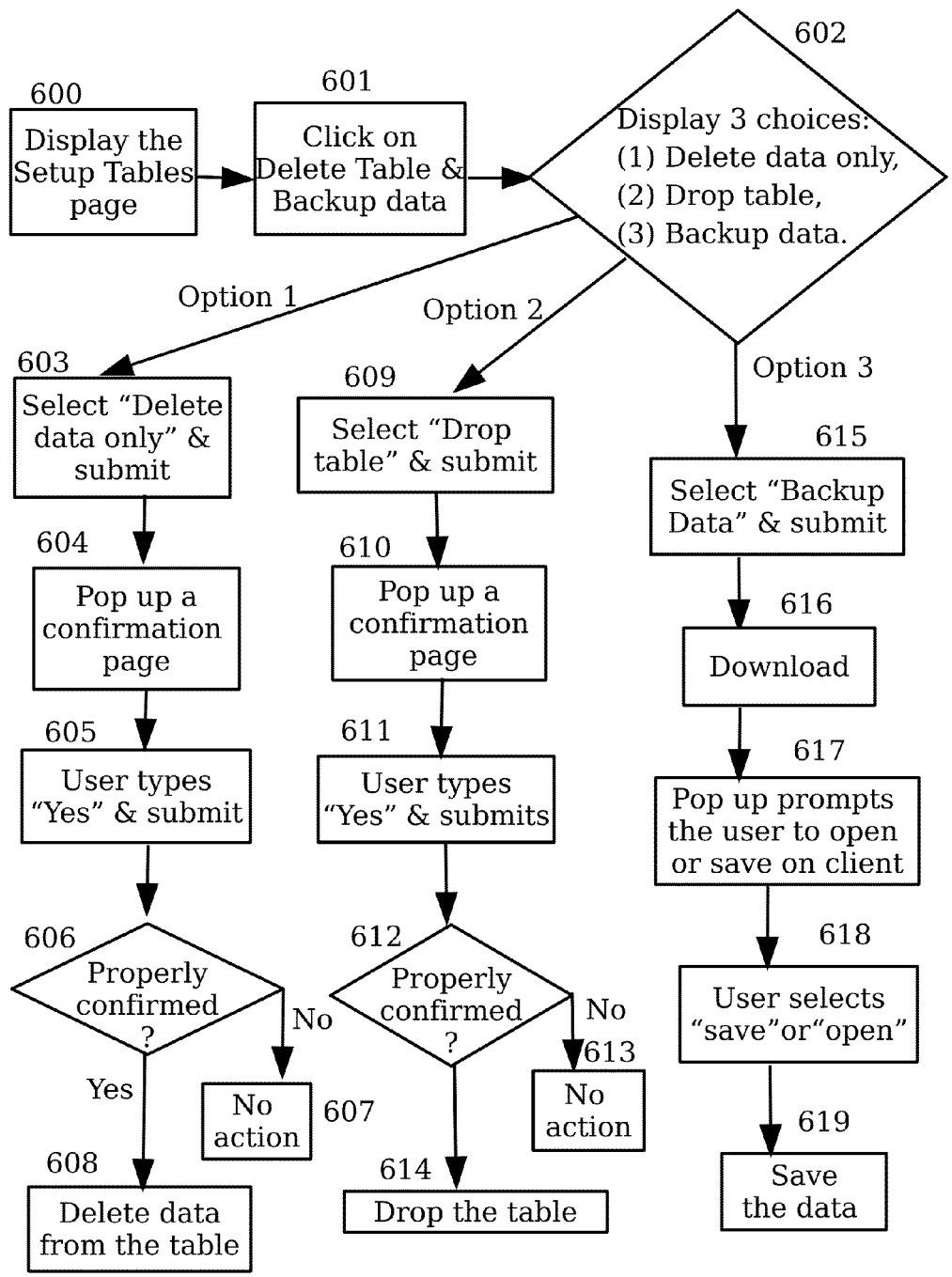
FIG. 4L shows the process of deleting data, dropping table, and backing up data for a data table.
Figure 4M:
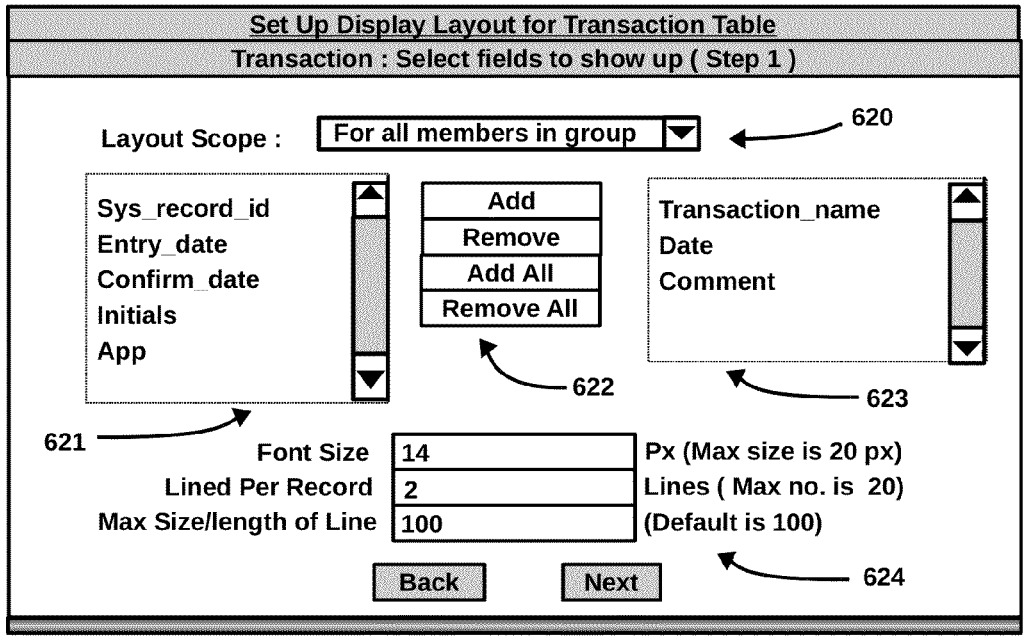
Figure 4N:
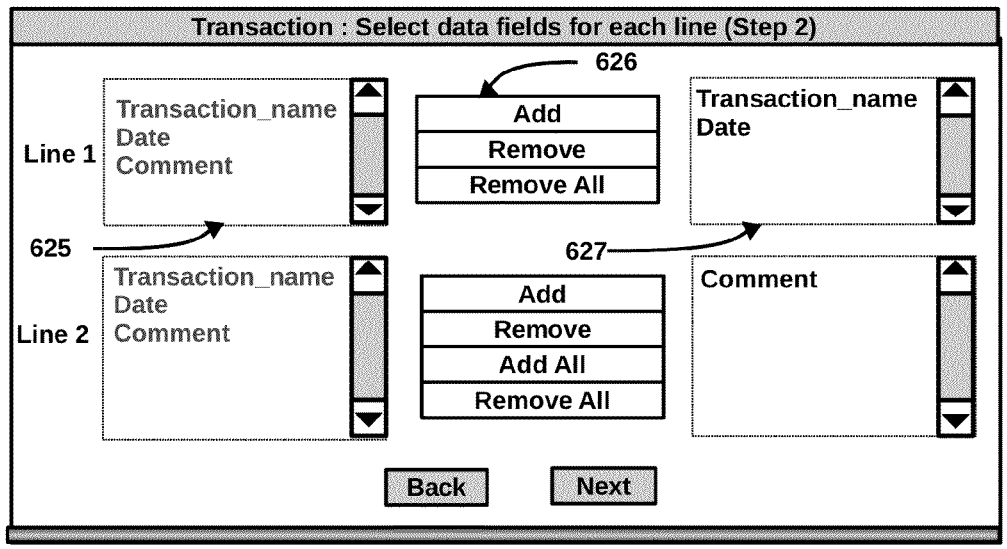

Any of the data tables can be deleted using the "Delete Table and Backup Data" link on FIG. 4A and process is shown in FIG. 4L. Upon clicking this link for the Acronym table, the server presents a page titled "You can delete the Acronym and/or backup the data for the table" followed by three choices: (1) Delete all data from the table; (2) Delete data and table structure; and (3) Backup its data only. The first option allows the user to delete data without affecting the table. The user selects his option at Step 603 and submits the form. The server generates a pop-up window at Step 604, and user types "yes" and submits it in Step 605. When the server properly confirmed the user's intention at Step 606, it deletes data from the table at Step 608. The second option allows the user to delete both data and table structure. The user selects this option at Step 609, the browser generates pop-up at Step 610, the user types in "yes" in Step 611, the server ascertains the confirmation at Step 612 and drops the table. After a table is deleted, a Setup link may be placed next to newly created "Table#" entry as an option. The user can recreate the same table or a different table by clicking the "Setup" link next to the table space or use the bottom link. The third option allows the user to back up data by dumping the data to a file and downloading the file. The user selects the backup data option at Step 615, the server extracts the data from the table, writes it in a file, and starts downloading the file at Step 616. Upon finishing downloading, the server prompts the user to open or save the file at Step 618. The user saves the file at Step 619. When the data backup is called, the server extracts data and writes the data in a delimited text file or simply gets a dump file. Those functions can be arranged in different ways.

"Advanced Setup" is used to set up advanced features such as Navigation Name, Table Name, Data Access Rule, Data Validation Route, and Validation Method. The user can change navigation name and table name, change the value for access rule, select data validation route from a tentative table or a combined table, and select data validation method in the drop down box. Data validation methods include manager validation and member validation ("member validation" or "validation by vote"), and both of the methods (FIG. 4E). If the voting validation method or both validation methods are selected, the setup page opens an input box right below the drop-down box to prompt the user to type in a numerical value. The number determines the number of votes required to validate tentative records. The creator of the data record is not counted as a vote by default although the creator can be counted as one by using a different convention. If an inputted number is a reasonable integer smaller than the number of members on the project, the system accepts it and uses it. If the number is not good, the server prompts the user to provide a new number. On the page shown in FIG. 4E, the user can also set up or change data access rule. The choices are private edit or public edit. Private edit allows the owner of a record to edit it before it is validated. Public edit allows anyone to edit tentative records. After a record is validated, it cannot be edited or deleted by any member. There may be a need to edit a large number of data records, and user edits are desirable. The manager can move the records back to the tentative or combined table by changing their status values by using simple server tools or the "Remand" button. After mass edits are performed, the manager then moves them back to the validated table by changing their status. To increase flexibility, back-end tools are developed for manipulating data records and their statuses. Those tools allow the manager to find records and change their statuses at once by marking them with desirable values in the validation data fields.

The user under manager account can also move data from active database table to a history table so that the system will not search obsolete data. To move data from an active table to a history table, the user can use the page in FIG. 4G. The user can move "selected records", "displayed records" "found records" and "whole database table" to the history table. "Selected records" are only the records that the user selected. "Displayed records are those records showed in the displayed page. "Found records" are all records that are found but may be displayed in next few pages due to the display limit to the number of records per page. Records may be retrieved by search tool 539 to search date range, ID number range, and key in any or all fields. When the whole table is moved, all records will disappear from the active table. When the user opens an archival table, the user can move data back to the corresponding active table by using similar four selection methods.

The Instructions page (FIG. 4H) allows the user under the manager account to post and update project information, including guidelines and policy, responsive standards, privilege standard, case background, and log samples. The user can type in data for each of the topics by using "Update" 542 next to the topic. The opened page has a title corresponding to the topic, a large input box 543 for providing data, a file path browse 545, and a "Add more file path" link 544, and a dynamically generated "Fewer file path" (not shown in the figure). The user provides text in the large box 543 with or without attachments. Upon successful submission of the page, the topic is set up. The file may be saved in a folder or a table with the structure: create table instruction(ins_id int auto_increment primary key, group_id int, ins_name enum ('project', 'reimbursement', 'responsiveness', 'privilege', 'case_background'), content MEDIUMTEXT, attachment int) and attachments are saved in the table: create table ins_attachments (ins_id int, attach_id int, file_name varcha(50), file_path varchar(100), content MEDIUMBLOB). If a user clicks any of the topics before it is set up, a pop-window shows up informing the member that it has not been set up. After the topic is set up, the member can open the topic by clicking its name. If a file is attached under a topic, any user can download the file by clicking the file name.

The manager can validate tentative records on the data validation page if a data table utilizes manger validation. When a tentative table is validation route, new data records are shown in the tentative table as tentative records. Validation tools are embedded on the tentative table. The manager can use a tentative page (similar to FIG. 5A except that it has a "Validate" and "Validate All" buttons) to validate data records. On the validation page, there is a search box at top, the table body in the middle, and several buttons such as "Enter", "Delete", "Edit," "Validate," and "Validate All." A check box is placed in front of each of the data records. The manager can find tentative records by using the search function at the top of the table and can use the page navigation controller to find the pages where tentative records are. The user selects data records by checking their boxes and clicks the "Validate" button. The browser responds with a pop-up window to confirm the intention. Upon confirmation, the browser sends a request to the server, updates the status of the data records, and refreshes with a validated page or the validation page. The validated records disappear from the tentative table and appear on the validated table. The user can validate all records by using "Validate All." After a data record is validated, it cannot be edited or deleted by the member who created it. When this method is used, it is easy to keep track of all validated records and tentative records. All data records are stored in the same database table with different values in their validation statuses so that they can be retrieved and shown in different views.

If the validation route is a "combined table," all tentative records and validated records are in the same table, but they are marked with a unique color so that the user can identify tentative records from validated records. Any other suitable methods may be used to mark the two kinds of records so that they can be easily identified. Also validated records have a value in the approval field "APP." Necessary validation tools are embedded on the combined table. The combined table has a search box at top, the table body in the middle, and several buttons such as "Enter", "Delete", "Edit" and "Validate" and "Validate All." A check box is placed in front of each of the data records. The user selects data records by checking their boxes and clicks the "Validate" button. The browser responds with a pop-up window to confirm the intention. Upon confirmation, the browser sends a request to the server, updates the validation status of the data records in the data table, and re-sends a validated page or a combined page. Upon refreshing, the record appears in the validated table, and remains in the combined table as a validated record. This validation route is useful in the case that the members are interested in seeing all data records. Two validation routes, tentative table and combined table, can be used simultaneously for a data table so that validated records appear on the validated table, tentative records appear on the tentative table, and both of them appear on the combined table.

If the validation method is voting validation, the manager can vote for data records just like any other users. The user can also know who has voted for a record by moving the mouse over the check box in front of the record, as shown in FIG. 4J. This table shows user ID, initials, and voting dates and time. If the validation route is a tentative table, all voting tools are embedded on the tentative table. If the validation route is a combined table, the voting tools are embedded on the combined table. The tentative page and the combined page are similar to correspondent pages for the manager validation case. The differences are voting tools in place of validating tools, the placement of "Vote" and "Revoke" buttons (FIG. 5F), the confirmation message (See Block 732 in FIG. 5F), and the tool for checking the vote count (Block 730 in FIG. 5E). On the manager page, the user can see the voting details for each of the voted data records.

The user can edit data records in any of the table views. If the user does not accept a data record, the user can delete it by checking the corresponding check boxes and pressing the "Delete" button. Deletion is performed by the server upon the confirmation of the intention on a pop-up window. The user can use the "Enter" button to call a data entry page for the table. This button works independently from the check boxes. The "Edit" button on the Managers tentative table or the combined table is for calling the page for editing tentative records by the user. Upon editing, the initials of records' creator are changed by attaching "-R". For example, "TST" will become "TST-R," indicating that the record, created by TST, has been edited by the manager. The Edit page may contain both validation and edit function, and thus the user has an option to edit a record only, validate a record, and edit and validate a record. When a record is both edited and validated, "-R" is attached to the creator's initials for editing the record, and managers initials are added in the APP field. If a data record in the Validated table has been edited, the value under the APP field is attached with "-R." The approver initials "MAN" or "VOTE" thus become "MAN-R" or "VOTE-R" respectively, depending upon the validation method. If validation table is configured with both manager validation method and voting validation method, the user can validate data records by using direct validation and by voting. Other features remain the same.

The system also has a feature for uploading a file containing delimited data or simply database dump file and loading the data into an associated table as shown in FIG. 4K. The system opens a page for uploading a file, and this upload page is associated with a particular data table. Upon submission, the server first uploads the file, reads the table structure from the file, reads table structure for the Head table, and displays a field-matching table shown in FIG. 4K. This page has two placement buttons 548, existing table structure 549, the table structure 551 in the uploaded file, and two columns of match buttons 550. By using the "Sequence Placement" button, the fields in the file will enter into the input boxes corresponding to the fields in the existing table. The result (except transaction_name field) shown in FIG. 4K has been achieved by using the sequence match method. The user can also click "Field Name Match" button, only the fields in the file, whose names are identical to the field names in the existing table, are entered into the correspondent input boxes. If the table in the file and the existing table have five common fields, the server matches those five fields but ignores the rest of the fields. Finally, the user can also match fields by using the manual match buttons 550. If the user wants to input acronym name into the transaction_name field, the user first clicks the "Clear" button to clear the value in the input box for the transaction_name, clicks the check box in front of the acronym on the right, and clicks the "Add" button. Thus, "acronym" is added to input box for transaction name. The server inputs data according to the pair relationship between displayed field names and field names in the input boxes.

The system is implemented with an interactive search and data-feeding function in various cases (Similar to FIG. 5G). This function can be set up for any database field using any data source. Each of the data tables has two types of fields: data entry destination fields and data source fields. A destination field (also "active field") is where data are entered (the Fields 1, 2, 3, 4 in FIG. 2), and data source fields (Fields A, B, C in FIG. 2) are the fields from which data pieces are retrieved as potential data candidates for data entry. Thus, on the data entry form (FIG. 5G), when the user types in the data input box, it causes the server to search source fields, retrieves data, sends retrieved data to the server, and displays the retrieved data in the selection box for user to select. The user selects and saves a data piece in the destination field. The interactive search function is normally embedded on an input box on a data entry page. The system uses a data source setup table or file that defines the relationships between active destination fields and data sources.

An active input field on a data entry page may take only a fixed number of words or phrases as potential data. For example, when a task is to produce a privilege log, the privilege base must be one of a few choices such as "attorney and client privilege," "work product," "joint defense privilege," and "supervisory privilege." Therefore, it is desirable to feed the selection box only with those choices on the log form. Those phrases can be put into a static file or saved in a database field. It may be embedded on the web page if the number is limited. If the number of data pieces is large, the data entry form may use interactive search and data feeding function. When the user moves the mouse to the active input box on the data entry page and types, the typing causes the server to retrieve data and display them as potential choices in the selection box (FIG. 5G and FIG. 5H).

Another use of the setup function is to associate one of the database fields with one or more fields of one or more database tables. For example, a privilege log normally has a column containing attorney names. The attorney names are maintained in another table known as a names table. Therefore, it is desirable to use the names table as the data source for the input box for the attorney name field in the privilege log. Whenever a member moves his mouse to the active input box and types, the server searches the attorney names, finds all names that match typed letters, and displays found names in the selection box for the active input box. When more letters are typed in the input box, the server conducts another search, and returns a reduced number of attorney names that match typed letters. The server can quickly narrow down potential choices, allowing the user to select a proper name.

For any field in any of the tables, the user can set up a data source by clicking "Setup" in FIG. 4C. Upon clicking "setup," the user is presented with a page titled "Set up Data Source for Table: Privilege-Log, Table Field: Attorney_Name." On this page, there are three radio buttons for three mutually exclusive choices (1) Set up simple data source, (2) Set up composite data source, and (3) Set up direct copy function. The first choice is to create data source for one field. The second choice is to set up data source for a field that comprises at least two component boxes, and the third choice is to set up a function for copy data from other fields in the same data table. In setting up this function, the server creates a setup record about the data input field, static data source, table ID, data field names, and method.

If the user clicks the radio button for first option, the web form creates a large input box. The user then types in plural data pieces separated by semicolon or carriage return, and submits the page for processing. It saves a setup record.

When the user selects the option for setting up composite data source, it generates a setup page containing an input box and all table names and all table fields. Each of the tables is preceded by a first-level check box while each of the fields is preceded by a nested-level check box so the user can select any of the tables and any or all of the fields. The user selects check boxes for one or more tables, and, for each selected table, checks one or more nested boxes for available fields. Plural tables and fields are allowed. Upon submission of the page, the server writes a record in the setup table or equivalent file. Static data pieces are written as one single string in the setup table.

The setup is saved in the setup table or equivalent file. One example data source setup table is: table suggest_source (board_id int, field_name varchar(50), static_source varchar (5000), tabl_source varchar(5000), field_source varchar (5000), type enum('0','1','2') DEFAULT '0',PRIMARY KEY (board_id, field_name). In this table, the board_id stores unique ID number of the table. Field_name is for storing active fields for which potential data are provided. The static source contains static data choices (also "data pieces") separated by proper delimit. Tabl_source contains table names separated by proper delimit such as semicolon, and field_source contains field names separated by a proper delimit such as semicolon. The number of choices in the tabl_source and field_source are identical so that after they are split up to form two arrays of strings (e.g., string table[i] and string field[i]), the same index number would define the same table. Thus, table[2] and field[2] could mean the table name and field names. One example is (5, 'Description', 'letter\r\narticle@#@#regarding \r\n about@#', ';0:3,;', ';Firstname|MI|Lastname|,;', '1'). Complex data source is available only for the destination fields which is sufficient large. This record contains instruction for the description field of the privilege log table ID=5. Type=1 denotes "a composite source" (also referred to as "combined source") while type=0 and type=2 denotes an interactive search feature for the field only and copy other fields. The description field uses three static data sources for three component boxes separated by "@#." The number of input components is consistent with the number of "@#" pairs. The first input component uses a static source consisting of "letter" and "article," the second one does not use any static data source, and the third one uses a static data source consisting of "regarding" and "about." Tabl_source contains table ID: the first input component does not use any table, the table ID for the second component is "0:3," (0: is not table ID) and the table ID for the third is null. The field_source contains field names: the field for the first input component is null, the field for the second component is "Firstname|MI|Lastname|," and the field for the third component is null. Type=1 means the active field does not use any component input box. An example is (5,'comment','A choice\r\nB choice','6;','Description,;', '0'). It does not use any of the component delimits. The comment of table 5 uses two words and the description field of Table ID=6 as a data source. The setup is similar to the setup page for composite data source except that it has only one input box. A setup record for copy fields function is (5, 'all_recipients', ' ', '5', 'sender,recipients, cc-recipients', '2'). Static source field is not used. This instruction means that the data in the recipient field is formed from combining sender, recipients and cc-recipients in the order of their appearance in the setup record. The setup page displays its own table with a check box and input for each field box. The user selects fields and put an order numeric number (1, 2, and 3) for each of the selected fields and saves the form. In saving the setup, the order number becomes the appearance order in the setup record. The value in the table name means only one table name, but the value in a field name may mean plural field names separated by "|". The tabl_source=";0:6,5,;" and field_source="; Sender|,Sender|Recipient|CC_recipient|,;" mean that for the second input component, the data source is the sender field of table 6 and the sender, recipient, cc_recipient fields of the table 5. The first ";" (delimit for input components) indicates that it has a data source that does not use any table. "," is the delimit for table source and "|" is the delimit for fields within a table. Delimits, word designations, and order arrangements can be changed to achieve the same intended purposes.

The interactive search and data-feeding function is implemented by using a data source setup table, script generator, and a servers search program. The script generator is able to generate script and embed it on a data entry page for any active input field. Script for conducting interactive search and data feeding is known and can be modified. Necessary changes are search target and the identity of the input box for return.

In conducting interactive search and data feeding function, the model code looks like: <input type="text" name="sValue_Description" style="width:45%" autocomplete="off" onkeyup="controlDiv(this, event, 'Description', '2', '0')" on Blur="checkDivStyle( ); appendSourceInPL('Description', 'sValue_Description')" where "2" is the component field order. Compared with prevalent code for common usage, the script needs to include more parameters, and one example function is controlDiv(textOj, event, fieldname, fieldorder, stype){ ... }. Inside the function, it makes a call to an ajax method for conducting interactive search: ajax.setRequestURL(cxtPath+"/SuggestServlet key="+curText.value+"&boardid="+boardId+"&fieldName="+fieldName+"&curPage="+curspage+"&FactoryName="+FactoryName+"&BeanName="+BeanName).

After the ajax request is sent, the script gets a response by using the statement: window.setTimeout ("handleResponse(ajax);", 300). The example shows how to use the script to conduct interactive search and data feeding function for one of the component boxes.

The script may be a shared program, which can be called by any active input fields with its table ID (e.g., names) or an individual program for a given field. For a simple data entry field, the interactive search and data-feeding function is same, thus all of known scripts can be used with little modifications. Script is embedded only for an active destination field that has been listed in the setup table. If a privilege log table has ten fields, only two fields have been set up with data source, only those two fields have the interactive search and data-feeding function. The destination field must be transformed into proper input box on the data entry form. The server also embeds event statements for each active input box. Second, the script must use proper destination table name and field names. When the browser contacts the server, the server uses the table name and field name to conduct a search. Existing interactive search programs can be modified to use the table name and fields to do searches. While existing interactive search programs are generally for searching one field or one file, such programs can be modified to search a plurality of data fields in one or more tables. Moreover, an Ajax based search program(s) are modified so that the system shows the last names followed by associated first names in the selection box. It is more useful to enter full attorney names in the description field.

When the server is called to generate a data-entry form for a table, the server first checks the setup table or the setup file to determine if any of the fields of the table is listed as an active input field. If none of the fields is listed, the data entry page is not embedded with script for conducting interactive search. If a field is listed in the file as an active input field, the server generates required script with proper parameters (such as static field name and database table names and field names). If settings for interactive search and data feeding function are saved on a file, the server checks the file to find active input fields and their data sources.

When the user types a key in the active input box, this typing action triggers the script to run and calls the server's search program with typed key and the data source (i.e., table names and field names) as parameters. Therefore, the server gets both the search key and the data sources, conducts a search using the data source, retrieves data that matched the key, and sends the retrieved data to the client in background. The retrieved data are shown in a dynamically generated selection box according to selected sorting order. The user then selects one of the entries by highlighting it and clicking mouse or typing a proper number associated with the selected data piece. The selected data piece will enter into the input box.

When a data component or a field uses both static data source and data table fields, it is preferable not to embed static data pieces on browser so the program allows the user to control data appearance order in selection box. The server gets static data from the setup table and retrieves data from designated table fields. A preferable data appearance order in the selection box is putting static data prices on top of the data pieces from data table fields. If the user types a letter such as "t" to narrow down the responsive scope, the server sends all static data starting with "t" and followed by the data piece starting with "t" from data table fields. All other orders can be used, however.

If the data entry form has a second active input box, and typing in a key in the second box would call a script to call the server's search program with its search key and different table names and field names as parameters. Thus, the server searches different tables and fields, retrieves responsive data, and sends them to the browser for display in the selection box. The user can select one of the displayed data pieces as shown in FIG. 5G. When an input box for a field on a data entry form for a data table is coupled with the field itself, the user has no need to check if a particular record has already existed in the table. This self-coupling function helps the user avoid checking records before entering a record, and can be set up by default for the key field of all data tables such as names, transaction, acronym, document log, hot log, and privilege log, as a global measure to avoid duplicate entries.

A phrase-constructing function allows users to construct simple phrase or sentence on data entry form. To setup a phrase construction method, the user opens "setup" under the "Setup Data Source" in FIG. 4C. The user chooses the second option "Composite data sources" in a brief dialog page, and the server then opens the page shown in FIG. 4R. This page is for a given destination field and initially has only one left box and four buttons, which is for one construction component. On the left, there is an input box 661. In the middle, there is a plurality of action buttons 662. On the right side, there is a large input box 660 for accepting static data pieces. Each of the action buttons 662 has "Source" and "Context" buttons. When the user clicks "Context", the page shows the fields of the same table on the right so that the user can select any of the fields as data source. If the user presses "Source", the page shows all available tables and fields of all available tables 663, plus an input box at the top. Each of the tables are preceded by a first-level check box while each of the fields is preceded by a nested-level check box so the user can select any of the tables and any or all of the fields for the selected tables. The user selects any tables and their fields as data sources, type static data pieces into the top input box with proper delimit such as line return or ";", and presses the "Paste to N" button to move static data pieces, the checked table name and checked field names into the associated left input box. The user can delete data from any of the left boxes by pressing a corresponding "Clean N" button. After setup is done for all input boxes, the page is submitted to the server for processing.

In creating a privilege log, the description uses five or more data components. A description contains [document type] [action done by attorney] [name of attorney] [preposition] [subject matter] (see the choices in FIG. 4R). Therefore, the user needs to click the "Add Box" four times to create four additional boxes. Each of the data components may accept static data or the data from the database table. In creating a static data source for first component, the user first types "Letter; Email; Article; and Press release" in input box 660, and then clicks "Paste to 1." The data in input boxes for components 2, 4 and 5 are created in the same way. The first input box for the first component has four word choices: letter, email, article, and press release. The input box for the second component has three phrases: "prepared by counsel," "sent to counsel" and "provided by counsel." The third input box uses the first name and last name in names table. The rest is obvious. After data sources are set for each of the components, the user submits the page to the server, the server writes a setup record in the setup table or equivalent file.

The process of setting up a phrase-constructing feature may be done in the following steps. First, the system allows the user to select a data entry form to embed the construction function. A construction function can be embedded on different data entry forms for the same destination field. Construction functions can be embedded for different input boxes for the same destination field. Second, the system allows the user to select a field as the destination of constructed phrase. The setup page shows all tables and all fields so that the user can select one of the fields as a destination field. Third, the system allows the user to provide a numerical number to define the number of construction components by creating number of input box or entering a number. Fourth, the system allows the user to select a construction method from one of the two choices: constructing phrase in plural component boxes or constructing phrase in a single construction box by sequential keystrokes. When the first method is selected, four component boxes are shown below a disabled input box on the data entry page (FIG. 5H). Each time when a key is typed in a component box, the browser shows a selection box and the server feeds retrieved data pieces to the selection box. This disabled input box is not always necessary, but allows the user to see a preview of the phrase under construction. When the second choice is selected, only one construction box is shown on the data entry form, but the browser shows dynamically generated component boxes in sequence. If phrase construction function uses four data components, the browser shows selection boxes four times in sequence, and the user selects the data pieces four times in dynamic selection boxes. The program should use suitable keystroke scheme for sequential advance between two data components. Fifth, the system allows the user to define data source for each of the component boxes. A component could accept static data only, database data only, or combination of both. Some components may accept manual input and other components may disallow the user to provide manual data to improve data consistency. When a component is not set up with data source, it always allows manual data entry. Sixth, the data may be fed in different order. For static data source, data may be fed in original order, reverse original order, alphabetic order, or reverse alphabetic order. The feeding orders for database field data include alphabetic order and reverse alphabetic order. If a component uses static data source and dynamic data source, the system by default shows the static data pieces on the top of data from database field data in the selection box. Finally, the browser contains code for appending the values of all components with a separator space.

Additional setup functions allows the manger to choose between preferred data feeding order or other data feeding orders. Any of the database fields may be a destination field using other data source and at the some time may also be a source for one or more other designation fields. If a component box uses a field that has already had an active data source, the user may use that data source. A data entry form may contain plural construction boxes corresponding to different destination fields. And plural construction boxes may be built for the same destination field by using a different data source. The single construction box method is useful on the data entry form with limited space such as Edit Table. An input box for one destination field is set up with a static source of "A, B, C, and D". One of the component boxes for a construction box for another destination field may need same data source (A, B, C, and D). In this case, the data input box for the destination field should be placed before the component box on the data entry form. A script is embedded on the page for copying the value from the input box to the component box. This can reduce the number of searches.

The user also has tools for setting up a background construction method. This method is used to combine the values of a plurality of fields and store the result in a destination field. The user is allowed to define a destination field and construction components, which normally use data from the same table so there is no multiple-value issue. If a component uses data from a different database table, data value must be unique for each record. In this case, phrase construction can be performed without human attention after all of required fields have been filled with unique values. The user can use this function to retrieve the values from all selected fields or columns and append them with a separator space to form a phrase, and save the constructed phrase in the destination field. The program should mark out all records that have missing component data. In addition, all resulted phrases should be verified in a quality control stage to ensure that errors from component data incompatibility are fixed.

Figure 4Q:
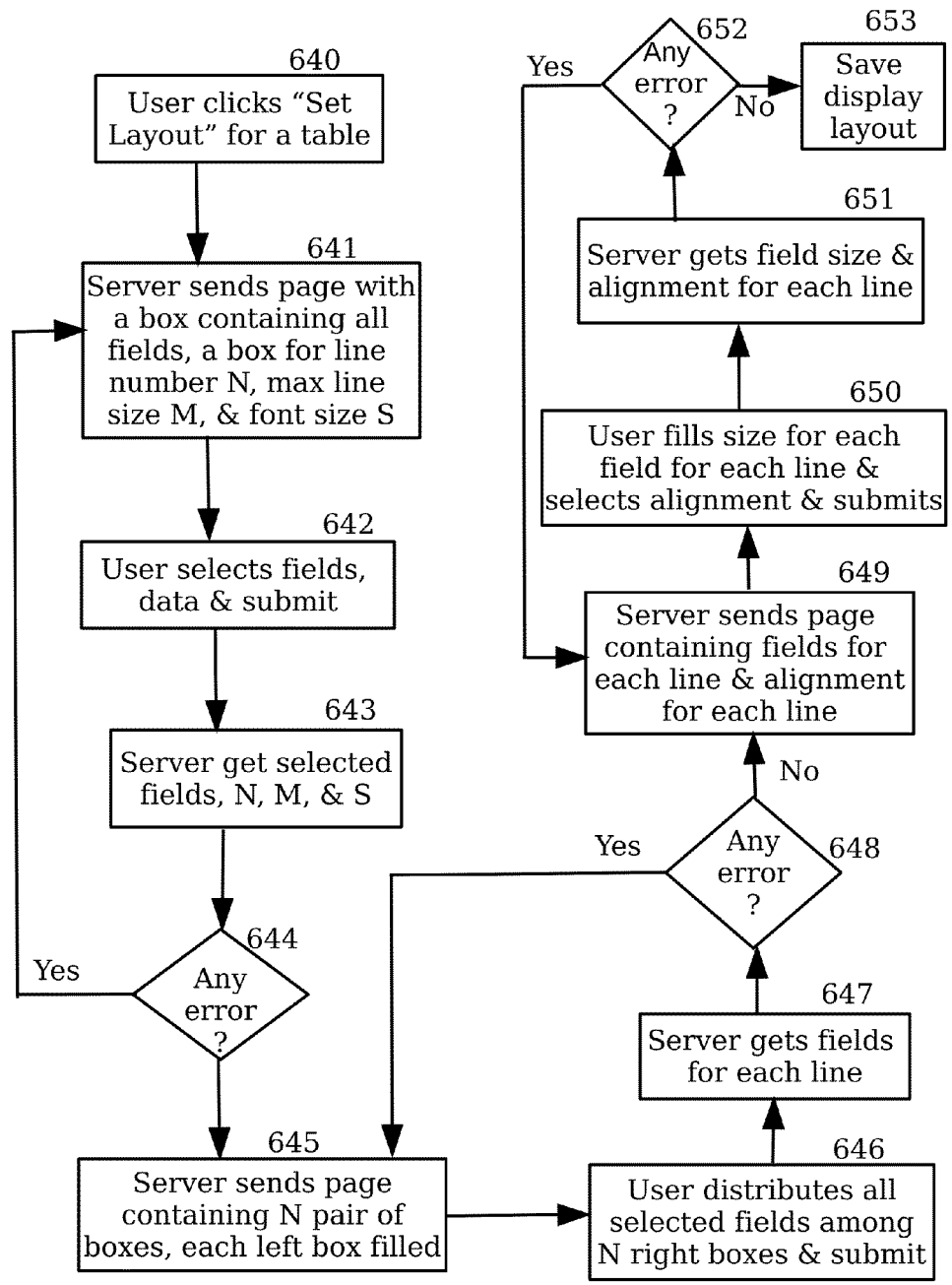
FIG. 4Q shows the process of setting up a display layout for a data table.
Figure 4R:
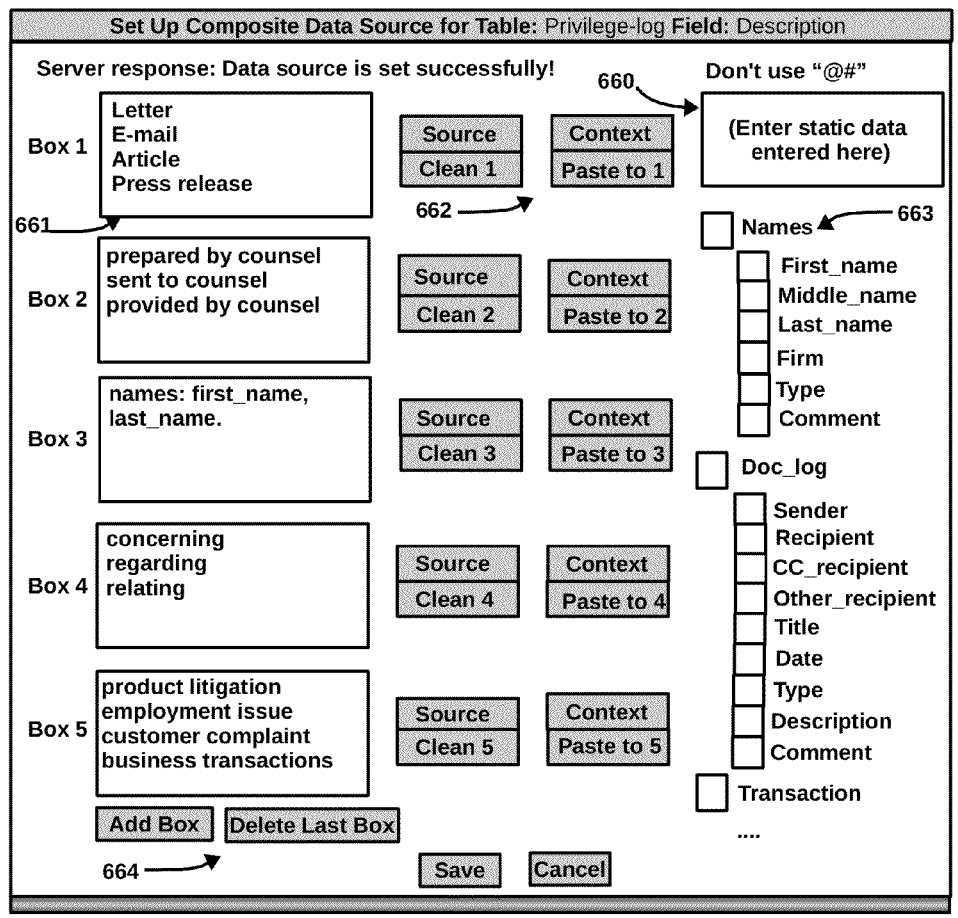
FIG. 4R shows the page for setting up a composite data source for an active long field of any data table for its data entry form.

FIGS. 4M-4P show a method and process for creating display layout from web page and FIG. 4Q shows the process of creating a display layout. The server sends a page (FIG. 4M) containing a box showing all fields available for display at Step 641. The user selects fields to display and provides display lines number N, font size S, and the maximum display line size M at Step 642. Upon submission, the server gets N, M and S, and generates a second page at Step 643. The second page contains N pairs boxes with all user-selected fields on the each left box (Block 625 in FIG. 4N) and nothing in the right box (Block 627 FIG. 4N). Each right box is to define the fields for one display line, and the user can move fields from a left box to a right box by using the "Add" or the "Add All" buttons (Block 626 FIG. 4N). When a field has been moved to a right box, it disappears from all left boxes. The user selects fields in the first left box and moves the selected fields to the corresponding right box, selects fields from the remaining fields in the second left box and moves them to the corresponding right box, and selects the remaining fields in the third left boxes and move them to the corresponding right box until all available fields are allocated to all right boxes at Step 646. The user submits the page to the server at Step 647. the server gets data and generates a third page (FIG. 4O) at Step 649. This third page contains the selected fields for each of the N display lines and an input box for the display size for each field. The user enters a value for each field size and selects a horizontal position from the options "Left," "Center" and "Right" for each line at Step 650. Upon submission, the server gets the field size value of each of the fields and the alignment value for each of N display lines at Step 651. If there is no error, the server creates a display layout and saves it, and sends a page showing display layout settings (FIG. 4P) at Step 653.

After the user submits the final page with specified fields in each of the blocks, the server gets the selected fields, their display sizes, and the display position for each line. The Java program processes the data and writes a display record for the table and for the user in the display table. An example display layout for the names table is: (3, 1, 3, 'Sys_record_id, 20; Confirm_date, 20; App, 20', 'Firstname, 10; MI,6;Lastname, 10', 'Email, 60; Company, 20', 'Comment, 98', 'Initials, 20', 'Type, 40', 'Entry_date, 90', Date, 10', ",", 'p', 'left', 'left', 'left', 'left', 'left', 'left', 'left', 'left', 'left', 'left', 14). This display layout setup record is for board_id=3 (the names table), group_id=1, and manager_id=1, it is for a personal layout, as indicated by "p," and the display font size is 14. This layout is substantially same as the one used in generating FIG. 5A. This record clearly reveals how the system generates display layout for a data table. The details on generating the layout have been disclosed in other applications.

E. Functions for Project Members

The access right of each of the project members is granted by the project manager. In order to sign into the server, the user needs to use project code, log in name and password to log in. Upon signing in the server for the first time, the user is prompted to change or update account information. In this version of the embodiment, the user is required to provide email address, initials, first name and last name. Upon submission, the server automatically generates a database table for storing data for the user's server pad.

The member home page contains a topper navigation bar: Name Search|Full Screen|Email|Manage Account|Logout. "Name Search" is for invoking a page for conducting name search. "Full Screen" is for conducting a global search using full screen view. The "Manage Account" page allows the user to manage the user's password, address, and contact information. The user may use the discussion board, email, and personal server pad. Email allows the user to communicate with other users, while the discussion board is for posting, reading and discussing information for the whole group. All information in the discussion board and personal pad can be searched by the global search function.

The user, a member, can view and use any of the data tables that have been configured by a manager. FIG. 5A shows the "names" table (e.g., attorneys name table) in its tentative view. This table is a web table. This page has a topper navigation bar, a main navigation bar, a global search tool, and user's status information (all of which are not shown in the figure, as in other drawings). This page has a view selection bar 701, layout change link 702, local search tool 704, and operation buttons 703. Below the search box is the body of the table containing data records.

The view selection bar allows the user to select a view from validated table, tentative table, combined table, edit table, and look-up table. FIG. 5A show a tentative table. This table is displayed by using a group's layout. The user can select a layout by using "Change Layout" 702. The pop-up window for changing layout is shown in FIG. 5B. Some example layouts are shown in FIGS. 5D, 5E, 5F for different tables. Each of the column headers is also a link for sorting data records. Each view table has a page navigation bar.

FIG. 5C shows the process of creating a view page by using many tables. The user logs in the server at Step 711, calls a view page or table at Step 712, and accesses the database at Step 713. It gets project setting such project name and code and preference settings such as layout choice and name search settings etc. It then gets all navigation names, all table Ids, the table name, the field names of the called table, and the settings for the called table from the Head table at Step 715, gets the relevant display layout data from the display setup table by using the preference data at Step 716, and uses the field names to read data from the data table at Step 717. The server uses navigation names to build a navigation bar at Step 719, uses the table name to build the web page or table, uses the field names to build cell header 720, uses retrieved layout setting and record data to build data records in proper format at Step 721, and uses other data to create other code at Step 723.

When a user encounters an attorney name in a document, the user enters the name into the names table by using the "Enter" button in Block 703. If data validation route for this table is a tentative table, a new record first enters into the tentative table and is viewable and retrievable in the tentative table. The record is also searchable by all users under the project using both local and global search tool, but its tentative status is clearly indicated in the result. All tentative records are shown with red record numbers. Unlike the manager's page, the initials of a record are not a link and thus other members cannot view the detailed information about the user who created the record.

The users can validate data records only on a data table, which is set up with validation by vote. The process of validating data by users' votes depends upon validation route for the table. If the table is set up with a tentative table, data validation is performed on a tentative table; and if the table is set up with a combined table, data validation is conducted on a combined table. A data record is admitted to the validated table as a validated record when a predetermined number of users have voted for the record. The project manager can set and change this predetermined number on the setup page.

The combined table in FIG. 5F contains operation buttons: "Enter," "Delete," "Vote," "Revoke," and "Edit." There is a check box in front of each of the records. There is a checking box on the far left column on the column header. The user can find tentative records by using search tool, column header sorting buttons, and page navigation bar. The user can easily tell from the display colors and notation tentative records from validated records. To cast a vote on a record, the user clicks the check box in front of the record, and clicks the "Vote" button (FIG. 5F). Upon users confirmation, the server takes and saves the vote in a vote table. The record number of the record on the web page is shown in a distinctive green or other color so that the user knows the user has voted on. The user can revoke his or her vote before this record is admitted as a validated record. Upon being revoked, the record number of the record becomes black again. If two more users, user B and user C, also cast their votes on this record under their own accounts, the record is validated. When the last user successfully casts the vote required to validate the record, the status value of the record is changed. It remains in the combined table, but also appears in the validated table. The server informs the user that the record has passed validation and has moved to the validated table. If the user opens the validated table, the user can see that the newly validated record, which is marked with "VOTE" in the App field and date and time in the confirm_date field. If the manager opens the table in the validated table view, the manager can see all users' votes by clicking its record number (FIG. 4J). If data validation takes place on a tentative table, the record disappears from the tentative page, and appears on the validated table page.

The user can use the interactive search function in entering data on data entry form or edit table form. Any of the data fields may have been set up with a static data source or dynamic data source such as database fields of data tables. The privilege basis field in the privilege log table accepts only limited choices: "attorney-client privilege", "attorney work product", "joint defense privilege", and "supervisor privilege." The privilege log form can be set up with those data pieces for this field. When data number is so few, they are embedded on the log page. When the number of choices is large, interactive search and feeding function is desirable. When a user moves the cursor to the privilege basis field and types, the browser displays all four choices in the selection box for the input box. If the user moves the cursor to the phrase "attorney work product" and releases it, the phrase is copied into the input box.

The selection box may contain a large number of data choices when the data source is one or more data fields, the server can be set up with the feature to progressively narrow down data choices for the input box (as in the server pad in FIG. 5G). If the user types the letter "e", the selection box shows only phrases starting with "e". If the user types in "ab," the server would display nothing if no data choices start with letters "ab."

On a privilege log production site, the manager creates both a subject matter table and a privilege log table, and sets up an interactive search and data-feeding function for the privilege log table. The subject name field of the subject matter table is the data source for a component of the description field in the privilege log table. When the user types in the input box for subject name in privilege log table, the keystroke causes a script to call a server's search program with the key, table names, and field names as parameters. The server searches the subject name field of the subject matter table, retrieves all subject names that match the typed letters, sends them to the client computer, and displays them in the selection box for the user to select. The user can select any of the suggested subject names as input data. If no proper subject name is found, the user can type in suitable subject name manually. This function not only increases data entry efficiency but improves data consistency. It therefore reduces the chance of disclosing privileged information by inadvertently using too detailed specific names. This feature allows the user to hunt for possible data piece by typing in various letters in an active input box. The manager can change data source for any active field any time by using the setup function. It is preferable that the selection box shows small page navigation buttons or scroll bars when the number of data pieces is large.

The phrase construction function is useful in building production logs and privilege logs. In building a privilege log, common entries in a typical description field look like:

[letter] [from counsel] {concerning} [corporate litigation]
[Memo] [to the counsel] {regarding} [patent application]
[An analysis] [from counsel] {concerning} [corporate business]
[Note] [prepared at the request of counsel] {relating} [marketing programs]

Each of the words or phrases in the same order position is referred to as a "component," "data component" or "field component." Each component may have a limited number of choices. After a short phrase is constructed for a document, it is saved in the description field of the log record for the document under review. In those examples, each of the description has four components: first component indicates document types, which has fewer than 20 choices. The second component is to define how the document is related to counsel. It has only a limited number of choices. Some of examples are "from counsel", "to counsel" "prepared by counsel" "from legal staff" "to legal staff" "prepared at the request of counsel." The third component is a preposition. Other choices include "regarding" "referring to", "mentioning", and "discussing". A description may be constructed by combining data values for all components. If the first component has M data choices, the second component has N data choices, the third component has 0 data choices and the fourth component has P data choices, the total number of choices could be M*N*O*P.

The present invention shows three phrase construction methods, and two of which can use interactive search and data-feeding functions. By using the first phrase construction method, component data are entered into a plurality of input boxes next to a nominal construction box and a phrase is constructed on construction box (FIG. 5H). A typical data-entry form contains several fields, but only one or two fields may require phrase construction function. The construction box may be an inactive and thus does not accept component data directly. Instead, its active component input boxes accept data and may be displayed with distinctive colors and looks on data entry page. When the user types in a key in the first component box, the server retrieves data pieces for the first component, sends them to the client, displays them in the selection box, and lets the user select. The user selects a data piece for the first component. The data piece is copied to the construction box. The user then types a key in the second component box, views data pieces, and selects a data piece for the second component. The user repeats this process until all input boxes are filled. All data pieces for all components are appended with a space upon the selection of each data piece or at the end of selecting the last data piece. This construction method allows the user to view the effect of the constructed phrase before submission. After the page is submitted to the server, the server processes the form, gets all submitted data, and saves the constructed phrase in the intended field of the log record for the document. In the alternative, the phrase may be constructed after the form is submitted.

If the data in an input box for a destination field are used in a phrase to be constructed for another field, the input box should be filled before the phrase can be constructed so the data can be copied directly. Considering data-entry order, the construction box and all component input boxes should be placed in the last rows so that they are able to use the data from the fields that have been filled first. For example, the sender name in FIG. 5H may be also used in component box C for the description field 736. Many times, the value can be copied. In this case, a script may be placed on the page to copy data from the input box to a component box. This script is generated when the data entry page is opened.

By using the second construction method, the server generates a data-entry form, which contains a long input box ("construction box"). The page contains a script for calling a server search program. When the user types in the first set of keystroke, the script calls the search program with parameters for defining the data source for the first component. The search program returns retrieved data pieces from data source, sends them to the client computer, and displays them in the selection box. The user selects one of the displayed data pieces. The first set of keystrokes cause the server to retrieve M choices for the first component and the user selects a data piece. The user advances to the second sets of keystrokes, which cause the server to retrieve data pieces for the second component, display in the dynamic selection box, and the user selects a data piece and causes the selected data piece appended to the growing phrase with a preceding space. By using the same process, the third set of keystrokes cause the server to retrieve data pieces for the third component, and the fourth set of keystrokes cause the server to retrieve data pieces for the fourth component. When the user finishes the process, a phrase is constructed in the construction box. To avoid potential confusion from losing track of keystroke sequence, the sequential interactive searches may be triggered by a unique keystroke with a number such as 1, 2, 3, and 4, while the space bar may be designated as a sequential keystroke to advance components.

When the number of data choices for a component is large, it is preferable to retrieve only the choices containing typed letters. The keystrokes for getting on right component must be different from the keystrokes for retrieving data. The keystrokes for defining component position may be the control key while all normal keystrokes can be used to narrow down data choices. The keystroke sequence for this phrase construction method is similar to many data entry methods for certain foreign languages such as Chinese: where the user types one to N keys for finding a character, selecting a character from a list of characters, and advance to next character by using special keys. Thus, key sequence and key advancement scheme used in such languages can be used.

If the log production system is installed on a review platform, the document ID should be used in the log production system so that each of log record is associated with the same document by document ID. (Of course, the document ID may be referred to as log record ID.) The document ID and other relevant data in the review platform may be exported into this log production system. If the review platform and the log production system cannot communicate with each other, the document ID must be typed in the log system manually. Since it is easy to retrieve document log ID by ranges and to find unfinished log records by document ID ranges, synchronization between the document ID of review system and the document ID in the log production system can be achieved.

The log production method may use a special search tool for conducting searches in the names table. The email may have one or more counsel names. The counsel name may be referred in the description of the privileged document: "[An analysis] [from counsel] {John Smith*} 'concerning' [business]." Where the components 1, 2, and 5 have limited choices, the component 4 has a fixed value, and component 3 uses the name fields of the names table. A description may be created by first manually identifying counsel names and then typing found counsel names into the construction box or right component box. The same task could be achieved by first searching all names (the senders, recipients, and CC recipients) in the names table to identify counsel. The name search can be done by using an Investigative Identity Data Search Algorithm. Now, the user knows which is the counsel. Next, the user needs to construct a description. The user can copy the names into the component box manually or by typing a right letter such as "s" in the third component box to get all last names and associated first names. The keystroke in the third box triggers the browser to call the search program to retrieve names in response to typed letters so that the user can quickly find the "Smith" and select it in the selection box. Attorney names are normally entered in the description with a unique mark such as a star or "Esq." This unique mark and other things such as title, can also be included in description.

A name search algorithm may be incorporated in the phrase construction feature. The name search page contains a large input box for accepting source data. The user can copy a list of names into the large input box to conduct a search. The result is returned and printed in the same output box. Only counsel names are marked with a unique mark such as "*" or "Esq." Now the user knows attorney names which may need to appear in the description field.

An Edit Table is provided for editing plural data records on a table view (FIG. 5D). The access to data is controlled by access rules: public edit and private edit. If the table is set up with public edit, a user can delete any of the tentative records by using the "Delete" button. If the table is set up with private edit, the user can delete only the user own tentative records. The table has a "Change Layout" link 724, copy and paste tool 726, search tools 725, a "Enter Record" link 728, and two buttons 729. The table body contains plural rows of data records displayed in selected layout. This page allows the user to delete any record, create a new record at the end of the table, enter data for a newly created input boxes for a record, copy data from an existing record and paste the record onto any existing record, and update the data in the database table. Each of the data records may have plural data fields and is displayed in an editable input box. The copy and paste tools 726 comprise three very small menu icons on the left of each of the records, and they are, respectively, referred to as "Copy," "Paste," and "Deletion" icons. Each of the icons shows info tip indicating its function whenever the mouse is moved over. The two buttons 729 are "Save Changes" and "Discard Changes." The page also has a page navigation controller. The column name in the column header is also a link for sorting data records using the column as a sorting key.

FIG. 5K shows the method for the system to track changes in Edit Table. When the user clicks on the Edit Table link at Step 770, the server sends the edit table page (FIG. 5D) at Step 771. The user can add new records at Step 772, delete records at Step 780, and Edit records at Step 783. To enter data into the table, the user creates a block of input boxes by clicking the "Enter Record" link at the end of the table at Step 773, types data into the boxes at Step 774, and then goes to Step 775. To delete a record, the user clicks the "Delete" icon on the left of the records at Step 780, the record is deleted from the table on the web page upon confirmation at Step 781, but has not been deleted from the data table. The browser marks the record as "deleted" at Step 782, and proceeds to Step 775. To edit a record, the user selects a data record at Step 783, changes data at Step 784, causes the record marked as "edited" at Step 785, and proceeds to Step 775. The user decides to the changes should be saved in Step 775. If the user chooses to save changes at Step 775, the user presses the "Save Change" button at Step 776, caused the page submitted to the server at Step 777. In processing the data, the server access the database at Step 778, and saves all changes in the target data table at Step 779, go back to the edit page at Step 771. The user may remain on the page at Step 789 or press the "Discard" button at Step 788 to discard the changes. The user can press the "Save" button any time to save the table at Step 787 and can press the "Discard" button any time to discard changes at Step 788. If the user has touched the data in the table but tries to move away from the page, the user is prompted to save the changes or discard the changes at Step 775.

The data display scope for the table is controlled by display scope. When its value is set to "member only," the user cannot see records of others. If display scope is set to public, the user can see data records of others and copy their values, but the users ability to edit others' records is determined by access rule. When access rule is set with private edit, a user can edit only the user own records. To delete a record, the user just clicks the deletion icon on the left of the record, and the record will be deleted from the web table, but has not been permanently deleted from the table. To enter data at the end of the table, the user first creates a block of input boxes for an empty record at the end of the table by clicking "Enter Record" 728. The user can type data into the boxes and save the record by pressing on the "Save Changes" in Block 729. If the user wants to copy data from an existing record to the empty record, the user clicks the Copy icon on the left side of a record to be copied, and pastes the data onto an existing or empty record by clicking the Paste icon for the record. Of course, data can be copied from any existing record and pasted onto any of the exiting records as long as the access rule permits. The user cannot paste a record over a non-editable record. The user can use search function, and sorting function, and page navigation bar to limit data records on the table. Selecting individual fields is not necessary for copying and pasting a whole record. However, the user can copy data from one data field to another data field by using the conventional copy and paste methods.

To make permanent changes to the database table, the user clicks the "Save Changes" button. All changes are saved. If the user does not want to save the changes, the user just clicks the "Discard Changes" button. The data in the web table are not written into the database table. Use of the search function would cause the server to retrieve the original data record, reconstruct the web page, and thus discard the changes. Preferably, conspicuous instructions are placed on the web page to remind the user that navigating pages, conducting a search, and sorting data records would cause the system to discard all changes, which have been saved. In the preferred embodiment, a script function is embedded to throw a warning message whenever the user tries to use the searching or sorting functions or to change the page number after the table has been edited.

In log production, the users can use personal server pad to keep track of a large amount of information for private use. One version of server pad has seen disclosed in various pending applications such as Ser. No. 12/420,817 and the relevant materials are incorporated by reference. Personal server pad can be implemented by using Edit Table component with one modification: each pad uses a dedicated table. If all users share a common database table, they do not share data. In addition, an interactive search feature may be added for a key field. The data structure of such server pad can be configured. Each user can periodically add, edit, delete information, and can seek information from the pad by interactive search and conventional search.

F. Investigative Identity Data Search Algorithm ("IIDS")

In many investigative cases, the information about personal name data is incomplete and inaccurate. When an investigation involves a large number of people and a large number of documents, it is often necessary to build database by using whatever information is available. The source names such as the recipient names in email header or other documents are often incomplete, inaccurate, or misleading. In a typical database concerning common documents, human and entity names may be given as email address, initials, first name, last name only, capital string, and even a notation. The algorithm disclosed herein allows a user to find all records which would be matched, or data records related to a name in some way, but generally would not retrieve records that can be excluded on its face. The algorithm and web component may be installed in any system. One version of the embodiment of the present invention is shown by FIGS. 6A-6F.

1. User Interface to Conduct Name Searches

When the algorithm is implemented as an Internet web module, the server first generates a user-interface page shown in FIG. 6A. This page contains an input box 800 for accepting name list, which is referred as name source data. Below the input box are two mutually exclusive search links 801: "Default Search" and "Current Search." The user can click "Default Search" to use the default setup to conduct a search or click the "Current Search" to conduct a search using the current setup. The two search methods are referred to as "search modes." The page for setting up "Default Search" is shown in FIG. 6B. The page for setting up "Current Search" is identical to this page except that it has no "Save" button and no "Revert to Default" button. The difference is that the user can set up or modify the default settings and save them in a database table. Thus, the settings are persistent until they are changed. In contrast, the current search settings are not saved, and are persistent only throughout a log in session. After the user logs out and logs in again, all current settings are gone. The current settings are system-provided current settings. It is convenient for the user to change any current settings, and submit a search with the settings.

If the user wants to use the same settings for many searches across login sessions, the user uses the default search method. By clicking the link "View" in Block 801 in FIG. 6A, the user can see the default search settings. If the user wants to change any of the settings, the user can use the link "Setup" to change them and save changes upon clicking "Save." If the format and substance of name data vary from search to search significantly, it is preferable to select the current search method. In this case, the user can change any of the settings on the setup page, provide name source data, and submit the page for a search. The program gets the setting values and conducts name searches according to the settings, and returns search results.

2. A Name Search Example

In conducting a name search, the user selects a search mode, selects match methods (also "search methods") and sorting methods, if necessary, copies name data into the large input box 800, and submits the page to the server. In this example, the server searches all those names against about 1200 name records in the names table, and returns the search result shown in FIG. 6C. The search results are ordered by name, firm and email address. The original name data from name source are shown in the first three columns 803: full name, address fields (not a DB field), and their appearance order. The values under "Fields" means address fields in the document under review and are the start marks of search ranges. The numeric number such as 1 and 15 in the third column is the appearance order of the related name within the address field. The name data in the first three columns are same as the name data interred in the input box. When there are plural identical fields, some name data could have same order number. The server displays found name entries 804 from column 4 to 8.

The server finds Fleming for John Smith because John Smith's initials is mentioned in the Fleming comment; it finds Dean Smith for Dean Smith because both names match precisely; it finds Jack Farrell for David Franklin because Jack Farrell's boss would be David Franklin; it finds Charlotte Anderson for ABC because ABC would be her initials; it finds Kristina Vinson for ABC because she is part the ABC firm; it finds Laura Bumpus for the X.Y.Z. because Laura Bumpus is married to X.Y.Z., and it finds Xerron Zedon because X.Y.Z could be Xerron Zedon's initials. This search gets useful information which otherwise could require tens to hundreds of searches. The program also allows the user to click the link "Show Name not Matched" (on top of the result) to see a list of names that are not found (FIG. 6D). It also has a function for selecting name data and adding them to the names table.

3. Set Up the Name Searches

By using the setup page shown in FIG. 6B, the user can select delimit for separating the name data from three choices: comma, semicolon and carriage return. Change may be made to allow the user to enter any reasonable characters. The program also allows the user to select mark words such as "from," "to," "sent," "beginning of message" as the start marks for defining search ranges ("segments"). The program allows the user to keep track of name data for different segments, and accept plural line breaks as separator between any two segments. The end mark for any of the defined segments may be a start mark for the next segment, a defined end mark, or plural line breaks. Ignored words are words that are in a search range or segment but will be ignored in search. An ignored range is a range of text that is within a defined search range but should be ignored as search keys. An ignored range is defined by a unique start mark and a unique end mark. The start and end marks for defining ignored ranges must be different from the marks for defining search ranges or segments. The user can create two input boxes for start mark and end mark by clicking the "Add a Range" link once and remove a pair of input boxes by clicking the "Remove a Range" link. The uniqueness of start marks and end marks is relative to name source data. They cannot be part of common names, person's initials, and email address. If a person's name is "from", this name must be handled specially. A page can be submitted for search with search ranges, ignored words, and ignored ranges undefined.

The user then sets up match or search methods, which are suitable for the name data and the structures and content of the database table. A successful algorithm must have the flexibility to select different match methods. In a typical investigative discovery, unknown name, notation, initials and relationships with other persons and firms are often put in a comment or note field. A short name and notation would be put in a name table as first name or last name by mistake or according to a default database construction rule. Match methods include basic match methods and optional match methods. Some match methods include the following: (1) full name match, email address match, and acronym match, (2) first initial-and-last name match, (3) obvious initials and first letters of names match ("J.S." with "Jack M. Smith"), (4) obvious initials and comment match, (5) multi-part names and comment match, (6) small initials (e.g., "job") and comments match, and small initials and first letter of names match, (7) single word and first name match ("John" with "John Stone"), (8) single word and last name match ("Stone" with "John M. Stone"), (9)

single word and firm name match, (10) last name match only ("John Black" with "John Stone"), and (11) first name match only.

The user selects the option for "Show Type" and "Ordered By." The choices include law firm, client, partner, and other parties. The names found by the program can be ordered in three sorting keys: personal name, firm name, and email, as shown in the setup page (FIG. 6B) and used in the result page (FIG. 6C).

4. Name Data Preliminary Treatments

Figure 6E:
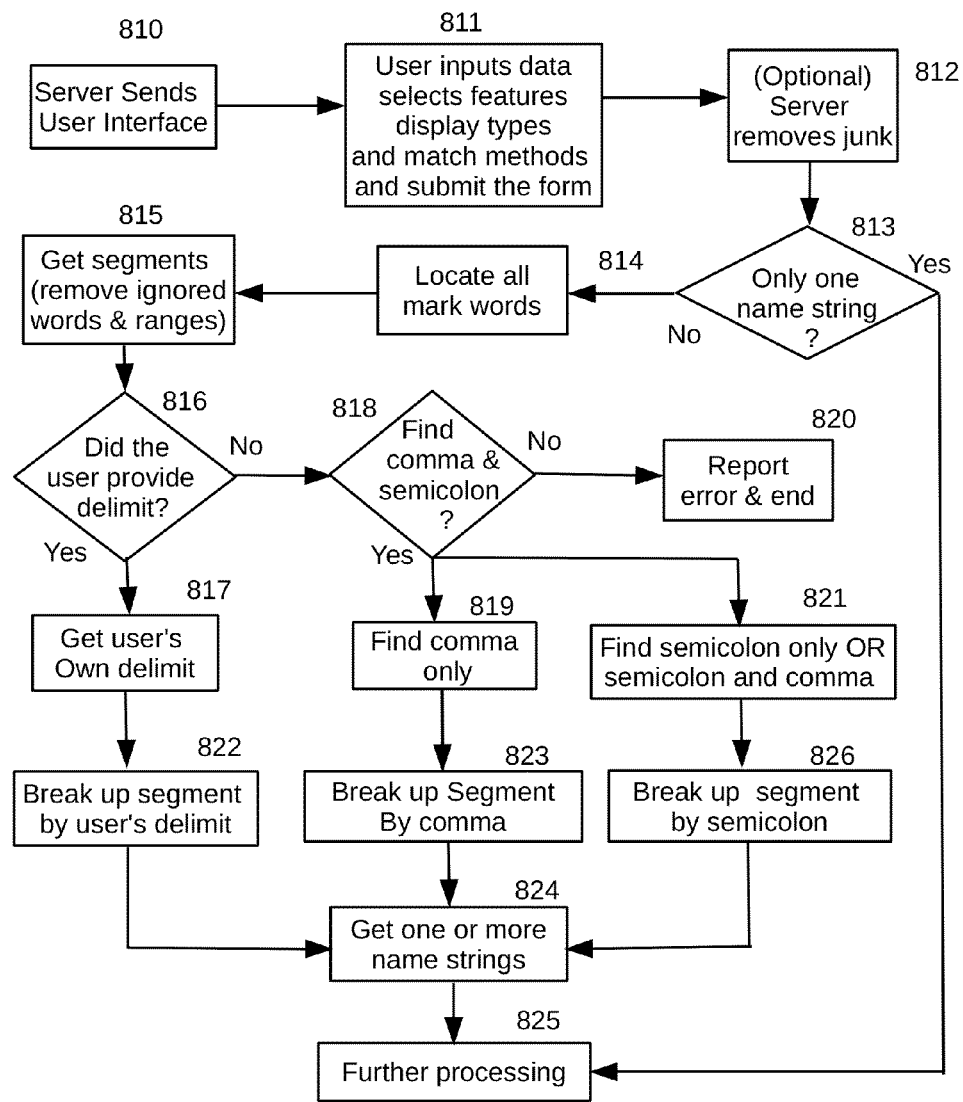
FIG. 6E is a flowchart showing the pre-processing of name data before conducting an investigative identity data search.
Figure 6F:
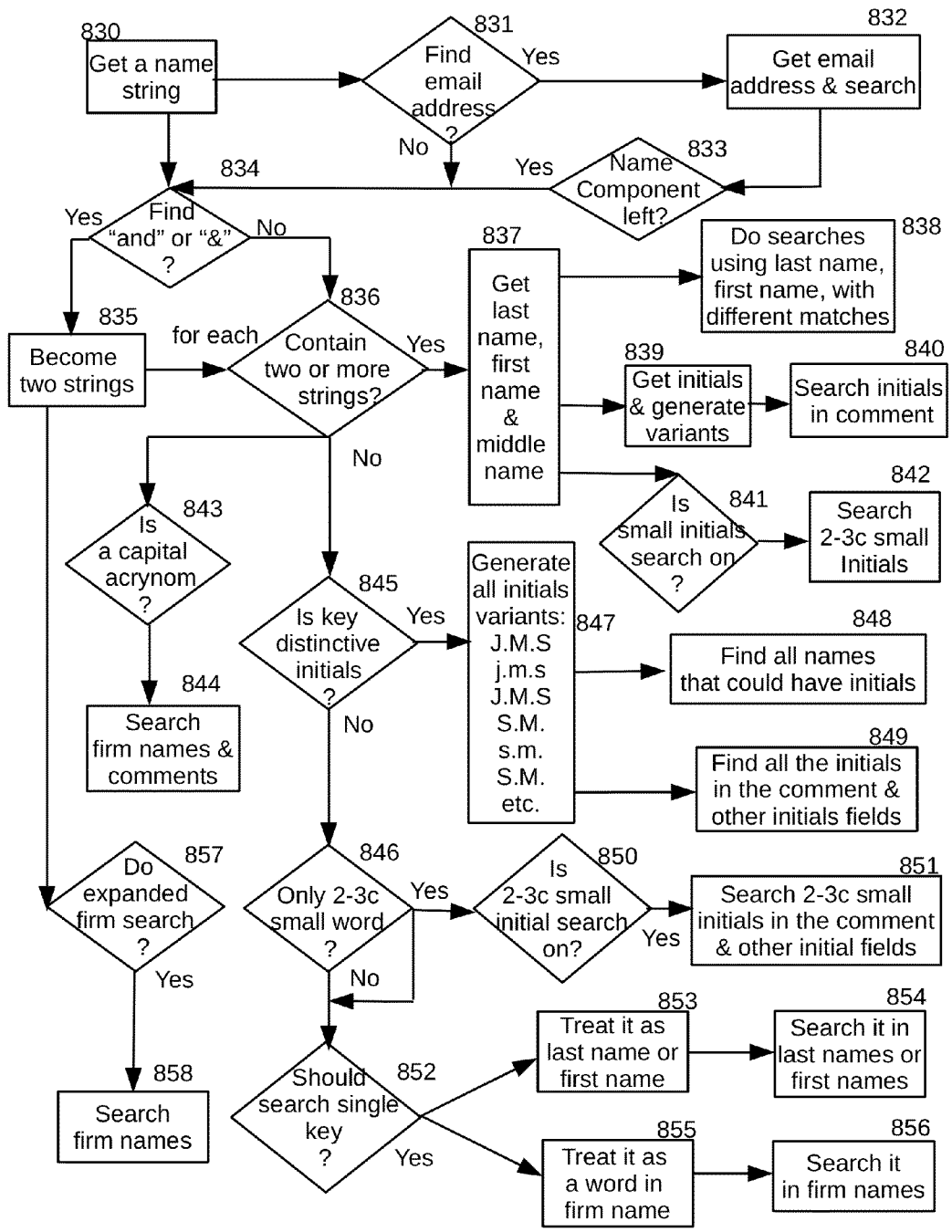
FIG. 6F is a flowchart showing the process of conducting an investigative identity data search.

The process for conducting name searches is described in FIGS. 6E and 6F. To access the page, the server sends a user interface page for name search at Step 810. The user then sets up search settings at Step 811 if it is necessary. The user can conduct a search by using the prior saved default settings or current settings to conduct one or more current searches.

Step 1, Remove Garbage in Name Data

Some of the data may contain garbage such as special characters, control characters, and other characters that are not used in ordinary documents. The garbage may interfere with the search function and, therefore, are removed at Step 812. Garbage characters may be replaced by nothing or spaces if the spaces are not used as segment separators in the name data. This would result in plural spaces in some places, which can be eliminated by repeating operations of replacing two spaces by one space. An alternative method, which is more efficient, is to go through the entire name data string, evaluate characters, and copies only those good characters to a new name-data string while skipping bad characters.

Step 2, Recognize Special and Single Name

Since many searches may be done for one person's names containing two or four words, the server determines if the source data contain only 2 to 4 words or a single name datum (Step 813). If it has only one name datum for one person, the server directly uses it for search without going through range analysis. If it finds more than one name data, the program must break up the source data into segments and further into individual names.

Common names can be represented in the following examples: John M. Smith <jms@test.com>; "John M. Smith"<jms@test.com>; "john.smith@test.com"; John M. Smith, Jr.; John Smith; Smith, John M.; Smith, Jr., John M.; Smith-Park, John M.; J.S.M; John; ABCD; John and Smith; Black & White. Many of those examples may have spelling variants. Initials may contain two letters, and acronym may various letters. The program removes comma, semicolon, and space at the beginning and end, and counts total words, "and," "&," ",", ";" space, and special words such as "Jr." "Sr." "I." "II." "III." The rule for finding single name data is stated as follows:

(1) A name datum that contains an unbroken email address, the name component has no more than 2 spaces.

(2). A name datum that contains two or three words (John J. Smith) without comma, semicolon, "and" and "&".

(3) A name datum that is not an email address and is of reasonable length without any space within ("ABCPLL").

(4) A name datum that contains "and" or "&" and have 3 substantive words may be treated specially or rejected as error.

(5) A name datum that contains "and" or "&" and have more than 4 words may be treated specially or rejected as error.

This algorithm for recognizing single name does not have to be perfect. If the program is unable to handle a name datum, the user can change its format before submission. Item (c) can be further divided into several sub-types. In recognizing short names, the program should ignore special strings such as Jr. Sr. I. II. and does not count them as words. When those symbols are present, they are treated as part of the last name. "Smith, Jr." is treated as last name. In addition, the comma before the name designation is not counted in subsequent analysis. The program has to treat them specially and should not break up name data at all comma positions. Since those designations appear infrequently in discovery projects, all treatments for this matter are merely a preference, but not a requirement. If functions for handling exceptions are not implemented, the program returns error messages or return incorrect results for those name data. It will not affect the rest of name data.

The program has code for handling the special case where a segment contains only two or three words with a comma without knowing the writing convention. "Smith, John M." could be treated as two persons delimited by comma. One option is to explore all possible cases. Since the program does not use name dictionary and is unable to know whether a word is a last name or family name. Also, many foreign names can be used as both first name and last name. The comma may be the separator between two persons. In this case, the program can conduct three searches (1) "Smith" as first or last name, (2) "John M." as first and middle name, or as first name and last name, or last name and middle name (3) "John M. Smith" as first name, middle name and last name. For case 1, the program uses "Smith" as a last name to conduct a search and uses it as first name to conduct a search. For case 2, the program uses "John" as first name and "J" as a last initial to conduct a search, uses "John" as last name and "J" as a first initial to conduct a search, uses "John" as first name and "J" as middle initial to conduct a search. For case 3, the program conducts another search by using "John" as first name and "Smith" as last name to conduct a search. While those permutations are not necessary for this particular example, they could help the user to resolve inadvertent name arrangements or a confusing name datum such as "Sunmt, Jqpt Zogt." Even an intelligent human cannot tell whether it means one person or two persons. All of those exploratory match methods may be implemented as one or more switchable functions. Those match methods may be adjusted if the user can see its writing convention from neighbor names. Each of the name data may be one of the following four forms: (1) two or three names, (2) one single word, which may be a last name, first name, notation, number, and acronym, (3) email address, and (4) obvious initials such as "A.B.C.", "a.b.c." and "X.Y." Name data may also mean company name, law firm name, and other business name.

Another exploratory match method arises from the treatment of phrases containing "&" and "and". These two words are often used as a conjunctive word between two persons, and such structure is often used in law firm and other entity names. For example, "Black and Stone" may mean two persons or one business entity. One method for treating this type structure is to pass it to the program for further processing. In this case, the program should add a step for recognizing the structure. "Black Green & Stone" means three persons or one business entity, but "Black Green and Blue Stone" most likely means two persons or even two business entities (but it cannot be one business entity). "Black Green Blue and Stone" may mean four people or one business entity. The switchable functions are implemented to recognize those common structures.

Step 3. Obtaining Plural Search Ranges or Segments

Name data may have plural segments, each being corresponding to a search range or "segment". The program finds all ranges by looking for unique marks in the name source data and gets each of the ranges or segments for further processing (Step 814, 310). This operation is used only if the name data has sufficient length. This operation is especially useful when source data are copied from email address header. Email address header normally contains certain words like "from:" "to:" and "sent:" in front of email addresses or sending date. One reason for breaking up name data into segments is that it is desirable to use them to track sender, recipients or cc-recipients in the search result. Those words can be conveniently used as marks for identifying segments and the marks for tracking names.

The start marks and the end marks may be paired or unpaired. When a start mark and an end mark are paired, a range is defined by the start mark and only the end mark that is associated with the start mark. Paired end marks may be useful only in certain cases where end marks are unique.

The program extracts segments that are defined by a start mark and the closest next start mark, a start mark and the closest end mark, or a start mark and plural closest lines breaks. In implementation, the program searches through the name data, which is a long string, for each start mark. When the program finds a start mark, it then searches for one of the end marks. If it finds an end, it finds a segment or range. If the start mark has a paired end mark, the program searches for the paired end mark at the second nearest position. After the range is copied, the program then moves the search position to the end mark, and repeats the process of searching for start marks and end marks, and finds the second range and copies it. The program then jumps the search position again and repeats the process until the program reaches the end of the name data.

The program may be implemented by one single trip: the program searches for all start marks until it finds one, saves the position as X, and starts searching from X until it finds a closet end mark or a paired end mark at position Y. The program copies the first range from X to Y for later use. The program assigns Y to X, starts searching from X until it finds a closest end mark or paired end mark at new Y, and copies the range as second range. In email, end marks are normally next start marks. Thus, the program just uses the first end mark as the start mark for the second range without conducting search. In this case, use of end marks is not necessary.

Step 4. Removal of Ignored Words and Ranges from Each Segment

The program has this optional feature to remove ignored words and ignored ranges from each of the segments (Step 815). If the user has provided ignored words, the program searches and find them, and remove them. This can be achieved by replacing an ignored word by nothing. Each of the ignored words can be eliminated by the same method. If the user has defined start marks and end marks for ignored ranges, the program identifies the ignored ranges by finding the start marks and end marks for ignored ranges. If the program finds an ignored range, it removes it, for example, by replacing the range with nothing or by copying the prior segment, skipping the ignored range, and copying the next range. One version of pseudo code may be as follows:

(1) Start search for start marks for ignored ranges at position S=0, where S is absolute index position in the segment;

(2) Find a first start mark at X (the start position) and the closest end mark or paired end mark for an ignored range at Y (the end position) where X and Y are relative to S position;

(3) Copy the first sub-segment (from S to S+X−1) and paste the value to product string P[ ];

(4) Move search position to Y or do assignment S=S+Y; and (5) Start a search at S for start marks for ignored ranges, find a start mark at (new) X and the closest end mark or paired end mark at (new) Y, copy the first sub-segment defined by (S to S+X−1) and append it to P[ ], skip the sub-segment by assigning the search point S=S+Y, and repeat the process at step 5.

By using this scheme, the program can remove all ignored ranges from each of the segments efficiently. This step may be placed after the step of cleaning up garbage and the step of identifying single name datum. If the program finds that the name source data contain name datum for one person, the program bypasses both the step of finding segments and the step of removing ignored words and ranges. If the program cannot find start marks and end marks for ignored ranges, and ignored words, the program skips these operations.

Step 5, Break Up Each Segment into Plural Names

If a segment contains more then three words (more than two spaces) without counting the special designation word, the program breaks up the segment into names. In addition, the program may handle certain short segments in a special way.

The program first determines if the user has provided a delimit at Step 816. If a user-provided delimit is found at Step 816, it uses it to break up the segment at Step 822 and gets one or more names at Step 825. If the user did not provide any delimit, it tries to find comma and semicolon at Step 818. If it finds comma only, the program breaks up the segment by comma at Step 823 and gets one or more names at Step 825. If it finds both comma and semicolon at Step 821, the program uses semicolon to break up the segment at Step 826 and gets one or more names at Step 825. There are other logic operation has been used successfully. At the end, the program obtains plural names, each of which is for one person or entity and fills each of the name data in designated variables. When both comma and semicolon exist, comma is treated as separator between a last-name and a first name. Any abnormal values in any of the name data may be reported as error in a later stage. The user may choose not to provide a delimit. A rule may be in place that name data containing two or three words should not broken up by comma. Their plurality nature should be handled in a later names-recognition stage. Possible plural identities can also be taken care of by selecting inclusive match methods that allow a single name (e.g., a single word) to match with first names and last names, respectively.

Step 6, Recognizing Name Datum Components

The program in the name recognition step breaks up each of the name data into four fields: email, last name, middle name and last name, and store them in designated variables in Step 830. When no value is available for any component, the designated variable is empty. Those identity components may be stored in string vector such as Java string first_name[ ], last_name[ ], middle[ ], and email[ ]. The component data defined by an identical index number are for the same person or entity. Two-dimensional string may be used for tracking segment origins such as "from" and "to." To track segment origins, data structure like union in C and C++ in C implementation may be used to store the data so the index numbers are related to segments and order number.

After the program gets a name datum at Step 830, it determines if it has email address at Step 831. If it has a good email address, the program gets the email address. The program can recognize email address like XYZ@STRING.ABC.NC, where XYZ is a continuing string without any space, ABC may be com, net, pro, edu, org, and NC is optional two letters. The program may just recognize a structure like "@anything.XXX" and get the complete email address by getting the entire string. If the program gets an email address, the program saves it in a designated string variable and uses it to search in the email address field. If an independent email address field is not declared, the search may be made against the comment field. If no email address is found, the name datum is directly passed to Step 834. The program then searches for "and" and "&" at Step 834. It is necessary even if a preliminary search for "and" and "&" has been performed for source data containing single name data. The reason is that some short name data would have a structure like "Green and Black."

The name components in the name datum are recognized by word count and the presence and relative location of the comma within the name datum. In counting words, the program ignores special abbreviations like Jr. Sr. I. and III. The general rules for recognizing multi-part names are:

(1). If a name datum has two words without a comma, the first word is taken as the first name and the last word is taken as the last name. An example is "John Smith".

(2). If a name datum has two words with a comma, the program checks the location of the comma. If a comma is at the far left or far right, the program ignores it, if the comma locates between the two words, the first word is taken as the last name and the second word is taken as the first name. Some examples are "Smith, John" and "Smith-Park, John" and ",Smith, John," where the first comma and the last comma are ignored.

(3). If a name datum has three words without comma, the program copies the first word as the first name, the second word or initial as the middle name, and the last word as the last name. An example is "John Mac Smith".

(4). If the name datum has three words with a comma and if the comma locates between the first word and the second word, the first word is taken as the last name, the second word as the first name, and the last word as the middle name. Examples are "Smith, John M." and "Smith-Park, John M." The program is able to recognize special letters such as Jr. Sr. I. II. and III., and does not count them in the total words. The program correctly recognizes "Smith, II, John M." and "Smith-Park, Jr., John M."

In breaking up name data, the program assumes that all of the name data are generally written in the same format by the same author. If a last name is written in front in a name datum, all last names are placed in front. Plural functions may be developed, each for recognizing one of the common patterns discussed above. The functions are respectively for recognizing common patterns. When a function recognizes a multi-part name pattern successfully, it gets all components and returns a success return code. The program tries to recognize and breaks up the first name datum from a segment until a success code is returned. Then, the program recognizes and breaks up the remaining name data from the same segment. The program may have various recognition functions and tries to use other function only if it has been unable to break up a name datum.

The recognition function may be implemented as a single function for recognizing all common patterns. The logic for implementing this unified function is as follows. The program first counts the words excluding special abbreviations and designations. The function has three conditional statements: count=2, count=3 and count=4. Each short name must fall within one of the conditions. For count=2, the program determines the existence and the location of comma (with the ending comma ignored). The program determines which name patterns the name datum belongs to by looking at comma location. The program does similar analysis for three-word name datum (count=3) and four-word name data (court=4). An error code should be returned if a name datum has more than 4 words. Name data containing more than four words is treated manually since they are rare. After the breakup of a segment, it is still possible to run into certain unique structure such as "John Smith, xyz." The presence of this structure may be due to an error in using delimit. The program regards the first two words as a complete name and the third word as a partial name for another person. This third word would be a first name, a last number or an abbreviation. As discussed above, this kind of structure may also be taken care of before the recognition step. After a segment is broken up, each of the resulting plural name data is stored in a designated string variable. In the alternative, the recognition step may be performed immediately after a name datum is returned from the breakup step. In this case, the program has to store components data in designated variables.

5. Name Match Methods

Most of the match methods are shown from Steps 836 to 856 and all downstream steps in FIG. 6F. The name match methods are shown in the following summary:

| Cases | Name Data | (B/S) | Matched Names in Name Table |
|---|---|---|---|
| 1 | Email address | B | (1) email address in the email field |
|   |   | B | (2) fall-back search in comments |
| 2 | Smith, John M | B | (1) full names in the name fields |
|   |   | B | (2) names in comments (V) |
|   |   | S | (3) initials in comments (V) |
|   |   | S | (4) first name only |
|   |   | S | (5) last name only |
| 3 | Smith, J. | B | (1) last name plus initial |
|   |   | B | (2) names in comments (V) |
|   |   | S | (3) initials in comments (V) |
|   |   | S | (4) last name only |
|   |   | S | (5) first name only (Excessive hits) |
| 4 | S.M.J.; SMJ (s.m.j.) | B | (1) first letters in names (V) |
|   |   | S | (2) initials in comments (V) |
|   |   | S | (3) initials in firm names (V) |
|   |   | A | (4) "Smith, Marc & Jones, LLP" (V entities) |
| 5 | S.J.; SJ; s.j. | B | (1) first letters in names (V) |
|   |   | S | (2) initials in comments (V) |
|   |   | S | (3) initials in firm names (V) |
|   |   | A | (4) "Smith & Jones LLP" (V entities) |
| 6 | jo or jon (Small case) | S | (1) "jo" or "jon" in first names |
|   |   | S | (2) "jo" or "jon" in comments |
|   |   | S | (3) "John O. North" (V) |
|   |   | A | (4) "Jones, Oblin & North, LLP" (V entities) |
| 7 | Smith | S | (1) "Smith" in first names |
|   |   | S | (2) "Smith" in last names |
|   |   | S | (3) "Smith" in firm names |
|   |   | S | (4) "Smith" in comments |
| 8 | Smith LLP | B | (1) "Smith PC" (V entities) |
|   |   | S | (2) "Smith and Stars, PC" (Extended) |
| 9 | ABCD; A.B.C.D. (Distinctive; >3) | B | (1)"ABCD", "A.B.C.D." in firm names |
|   |   | B | (2) "a.b.c.d."; "A.B.C.D." in comments |
|   |   | A | (3) "Allen, Brow, Calvert, & Doles" (V) |
| 10 | Smith and Stone (Smith & Stone) | S | (1) "Smith and Stone" (V entities) |
|   |   | S | (2) "Smith and Stone, PC" (V entities) |
|   |   | S | (3) "Smith & Black, LLP" (V entities) |
|   |   | S | (4) As two name data: Smith; Stone |
| 11 | Smith J and Car | N | As two name data: Smith J; Car |
| 12 | Smith and x.y.x | N | As two name data: Smith; x.y.z. |
| 13 | Smith, Bo & Tu | N | (1) as three name data |
|   |   |   | (2) "Smith, Bo & Tu LLP" (V entities) |

"B" means basic match methods that are used in the default search method,
"S" means switchable functions; and
"V" means the match include common variants that can be generated from the name datum. Some entity variants arise from entity designations such as LLP, LLC, INC, CORP, CO, and PC.
"A" means a switchable method for searching firm name initials.

The names table contains fields for first name, last name field, an optional middle name, type, and a comment. The email address field in the table is optional and it may be put in the comment field. Middle names in name data are shown in the search result so that the user can tell whether middle names match. Middle names could be treated as part of the first names as long as the middle names are entered as an attachment to the first names or treated as a separate field. If middle name is used as match criterion, it is preferable to have a middle name field in the names table. A difference in two middle names could be conclusive evidence for distinguishing two name data. A setting for turning on and off middle name match may be added to the setup page.

Case 1: If email address in the name data is same as the email address in any field in the name table, it is a match. Their cases will not affect their match.

Case 2: The basic match rule is that when a last name and a first name from a name datum match with the last name and the first name in the record of the name table, a perfect match is found. The name datum "John E. Smith" may be matched with "John E. Smith;" "John Ellen Smith;" "John Smith" in both name fields and the comment field.

The comment field plays an important role in defining the relationships between different people. For example, a comment may include a note like "X.Y.Z. is a contact person for this person (John Smith)." Personal names may be referenced in comments (e.g., "Jack Stone once represented him in his criminal case"). The name table may contain incomplete names, partial initials, and wrong names. "John M. Smith" matches "J.M.S." and its variants in the comment. The program can assume from the position that Smith is a last name, and thus the possible variants in the comment include J.M.S., j.m.s., S.M.J., s.m.j., J.M., j.m., M.J., and m.j. It also matches JMS, jms, SMJ, smj, JM, jm, MJ, and mj (switchable matches).

Middle name is ignored if either side does not have it. However, middle name may be used to exclude a match. Thus, the program would not retrieve "Smith, John Z." for "John Ed Smith." When a name record in the names table contains only a first initial rather than a full first name, a match is found if the first initial in the record is the same as the first letter of the first name in the name datum. When a name record has a missing first name or last name, the program has the option to not retrieve the record or treat the missing part as a match. This liberal matching method will not give rise too many false hits because a majority of name fields have values in the names table.

Case 3: Last name plus first initial ("Smith, J") matches "J. Smith," "J. Marc Smith," and "Jack Smith" in the name fields and comment fields. The program matches the last name with the last name field and the first initial with the first name field. The first name is considered as a match if the first initial J is same as the first letter of the first name. Middle name is ignored if either side does not have it. "Smith, J" matches J.S., j.s., S.J., s.j. And matches JS, js, SJ, and sj. Since people use initials without following strict rules, more variants may be considered. This method covers only what is known as obvious initials.

Cases 4 and 5: If a name datum is obvious initials, the program matches the initials with the first letter of the names. Since initials in documents may be written in different forms knowingly or by mistake, the program generates all possible variants to match with the first letters of both first name and last name. Thus, J.M.S or j.m.s or JMS matches "Jon M. Smith" "Jackson, Mark. S." "J. Smith" "Jackson, S." "J. M. Smith" and "Jackson, M. S" in both name fields or comment fields. It also matches all initial variants in the comments, and firm names whose abbreviations might be same or similar. Two letter initials, J.S., j.s. or JS, matches "J. Smith" "Jean Sun" and "Jackson, S." in name fields and comments. When dots are present, searches may be conducted without regarding letter case. All small initials without dots are treated as special case (discussed below).

Case 6: Two or three letter small initials. Those initials contain two to three small letters without period. They may be referred to as "small initials" or "2-3c small initials." Small initials such as "jo" and "jon" may also be a first name. It matches first name "Jo" or "Jon" in the first names and comments. It may also match "John 0. North" in the name fields or "Jones Oblin and North LLP." If a name datum is initials, the program searches for the initials and all possible variants in the comments. Two letter small initials such as "go" may match "go" in first names, and "go" and its variants in comments, "Gina Oliver" and "Goldman Oliver, PC." Two letters between the first initial and the last initial may be transposed. Therefore, match methods should include all possible initial variants. The program has the option to generate all initial variants and uses them as search keys to search the comment and first name fields.

It is difficult to tell whether small initials is a single name, a word, or name initials or firm name abbreviation. If the first letter of a name datum is of a capital case (e.g., Ed or Jon), the name datum is probably a first name. Some small initials such as "the" "sch" "ing" and "on" appear in comments at high frequency. A search using small initials and variants may get a large number of false hits, and therefore match method for searching comments is implemented as switchable search. When this feature is turned off, the program will not search the comments. Since this word is also a single word, it may still search a first name or as last name, depending upon whether these two search methods are on. An alternative measure may be taken to avoid wasteful searches and reduce the number of false hits. The program may check the name datum against a dictionary containing all common names such as "ed", "jon" or "clan" "tim" and "sam." If it is found to be a common name, it is treated as first name and may also be treated as initials. If it is not found in the dictionary, it is treated as initials only.

Case 7: If the name datum is a single word, its potential meaning cannot be determined by checking it in a dictionary because many words can be used as both last names and first names. Since the program is intended to find as many persons and firms as possible, it treats a single name as both a first name and a last name. Thus, "Smith" matches John Ed. Smith; Jackson, Smith, and "John" matches "John Mark Stone" and "John, Lisa" (obviously incomplete entry). One word may also match value in comment or firm name such as Smith, PC.

The single word discussed in this section could also include small initials because the program cannot distinguish one from the other, but can definitely exclude obvious initials such as "a.b.c." and all-capital acronyms ABC. The program first treats single word as a first name, searches first names, and retrieves all matched records. It then treats the word as a last name to find all last names. It is preferable to implement this match method as a switchable method.

A last-name-only match method may be applied to name data that have multi-part names. For example, "John Smith" matches "Smith." The reason for conducting this match is that the database may be incomplete or inaccurate. This search is particularly useful when there is a reason to believe that the first name in the name datum or in the name table is incorrect. The search results may give the user a clue for further investigation.

Case 8. In an investigation, it is often necessary to find law firm names and company names. "Smith LLP" matches "Smith LLP" "Smith and Stone LLP" "Smith & Stone PC."

Case 9. Obvious acronyms are a data string containing at least two capital letters or with dot as separators. Acronyms that have two to three capital letters may be obvious initials. Some examples are "AB," "ABC," "ab," and "abc." Those acronyms could be a person's initials and should be treated as personal initials as well. If an acronym has more than three letters and in capital case or separated by dot, it is a distinctive acronym. distinctive acronyms are matched with firm names or comments only. Their match reliability increases with the number of letters.

| Inputted Keys | Matches in the Name Table |
|---|---|
| ABCD, a.b.c.d. | "ABCD" or "a.b.c.d" in comments |
| | "Alon, Brown, Cart & Dole, LLP" in firm names |
| | "ABCD" and "a.b.c.d." in firm names |
| ABC; A.B.C.; a.b.c. | "ABC", "A.B.C.", "a.b.c" in firm names |
| | Alon, Brown and Cart, LLP in firm names |
| AB; A.B.; a.b. | "AB", "A.B."; "a.b." in firm names |
| | Alon Brown LLP in firm names |

Case 10: When two words are connected by "and" and "&", the name datum means two person or a firm name. "Smith & Stone" or "Smith and Stone" matches "Smith & Stone LLP," "Smith and Stone PC" and "Smith & Stone" (unincorporated entity). While the program uses entity designation such as LLP as a signal for invoking this match method, the program may ignore entity designation such as PC, LLC, INC, and CORP. A search for Smith LLP may also find Smith PC. This rule can be useful in the case where companies have changed their entity designations. The "&" sign may also be used as a signal for invoking firm name search because it is often used in company names. The name datum like "Smith and Stone" may mean two persons and uses each word of the word to do a search in both first name field and the last name field. "Smith and Stone" or "Smith & Stone" may match any company name such as "Smith and White LLP," "Black and Stone LLC," "Smith and White PC," and "Black and Stone LLP." To provide means for reducing false hits, those match methods are implemented as switchable searches. A single word such as "Smith" may match a firm name "Smith, Green & Stone LLP." A return result may provide a clue.

Among all match methods discussed above, the first three method and the acronym match methods are considered perfect matches. Some match methods are considered as reliable matches, while others are considered as inclusive matches. Searches using inputted initials ("J.M.S") are different from searches using initials ("J.M.S") derived a name such as "John M. Smith." The inputted initials and variants are matched with the first letters of names. The initials derived from a name such as "John M. Smith" should not be matched with the first letters of names such as "Jack M. Springs."

It is straightforward to identify different types of name data discussed above. Acronyms are capital letters with or without dots. Those with 2 to 3 letters can be used as human names and firm names. Email address is unique because it contains "@" and ".XYZ." If the word contains only 2-3 small letters, it may be a word or casual initials. It is preferable to conduct match analysis for classes 10 to 13 before the program conducts searches. Capital initials of more than 1 letters with or without separator period are often used as short names for law firms. Those matches are implemented as switchable functions. Not every match method is necessary in all cases.

6. Name Search Process

The search process after the segment has been broken up is shown in FIG. 6F. First, the program checks if the name data has email address at Step 831. If it finds a good email address, it gets the email address and uses it to conduct a search at the email field at Step 832. It checks whether a name component is left at Step 833. If yes, the name component is forwarded to Step 834 for name data analysis. If it finds no email address at Step 831, it directly forwards the name data to the optional Step 834. At Step 834, it looks for "and" and "&". If it finds "and" and "&" at Step 834, it splits it up into two words at Step 857 and conducts an extended firm search at Step 858. If it finds neither "and" nor "&" at Step 834, it then determines if the name data contain two or more words at Step 836. If it determines that the name datum contains only one word at Step 836, it determines if the name datum is obvious or distinctive initials at Step 845. Obvious initials are 2-3 letters with solid periods or capital initials. If the name datum is not obvious initials, it determines if the name datum is 2-3 small initials at Step 846. If the name datum is not 2-3 small initials, the program treats it as a single word. The program determines if the option for search single key is on at Step 852. If the option is on, the program treats the key as a last name to search last name, treats it as a first name to search first names at Step 854, and optionally search it in firm name at Step 856. If the program finds that the name datum contains two to three names at Step 836, it gets first name, middle name, and last names, copies them into designated variables at Step 837, and then conducts a search using first name and last name at Step 838. It extracts initials from the name datum and generates initials variants at Step 839, and searches all initials in the comments at Step 840. If the small initial search is on and the initials is a small initials at Step 841, it searches small initials in comments at Step 842. If the program finds that the name datum is distinctive initials at Step 845, it generates all possible initials variants at Step 847, searches for the names that could have all the initials at Step 848, and searches all initials in comments or other initials fields at Step 849. If the program finds that the name datum is 2-3 small initials at Step 846 and the small initials search is on at Step 850, it searches the small initials in comments and optional first name field at Step 851. This name datum is then passed to Step 852.

Optionally, it may include a step of recognizing a long acronym that contains more than 3 capital letters. If the program finds it, it searches the acronym in firm names and comments. The steps of recognizing name data at Steps 836, 845, and 846 and the optional step of identifying a long acronym may take place in any order. The objective of the program is to determine if the name datum is a multi-part name, obvious initials, a long acronym, 2-3 small initials, or an ordinary name.

By using user-selected features, the program constructs SQL statement. In order to keep track of the location of each of the name data in document address field, one SQL statement is constructed for each of the name data. However, when the same name datum is also used for firm name search, additional SQL statement is required. After the SQL statement is constructed and runs, the server returns a result page showing all records that actually match the name data according to selected match methods. All name searches are to retrieve identical columns, and thus all SQL statements can be combined by using "Union" in the preferred embodiment. Thus, instead of conducting each search, the program builds a SQL statement from individual search segment by union so that all searches can be done at once. To tracking the field number and position number of each name, each segment statement incorporates address fields by i-loop and name's position number by j-loop. An example of segment is "sqlbuf.append(i); sqlbuf.append("as fieldNo,"); sqlbuf.append (j); sqlbuf.append("as no, '1' as firm_order from table_name where type in("); sqlbuf.append(typeStr); . . . "

7. Name Search Results

The program displays only the records for the types of persons and entities the user wants to see. The names table contains attorney names, clients employee names, clients partner names, and other parties names, the search page allows the user to determine which of those classes of people and entities appear in the search result. If the user selects only law firm, the program shows only attorney names in the result. Preferably, all records are displayed in different background colors according to their types so that the user can instantly tell their roles. One color scheme might be that blue for law firm, pink for client, yellow for partners, and gray for third parties. A single name datum may be associated with several types, as shown in FIG. 6C. The found name data can be displayed in one of several orders, which are shown in the setup page (FIG. 6B). In a preferred embodiment, the name data from the name source are shown in the first three columns: full name, address fields, and their appearance order within an address field (FIG. 6C). In the first column on the result page, the name data are from the name source data in the input box. The number is the appearance order number of the name data in the search range or the address field. When there are plural identical fields, some name data could have same order number.

For each of the name data, the program shows a list of found name data according to the order that the user has chosen in the search settings (FIG. 6B). There are several sorting schemes available on the drop-down menu. The found name data may be first sorted by firm name, then by email address, and then by last name in an alphabetic order. The order will be changed upon selecting and releasing a selection. On the top of the search result shown in FIG. 6C, there are four links: "Show names not found," "Hide names," and "Show matched names" and "Hide names." Upon clicking "Show names not found," the browser shows those names that are not found in the names table (FIG. 6D). Those names may be embedded on the web page.

8. Adjustments to Search Settings

The program allow the user to adjust search settings from time to time, depending upon source data, the nature of project, the structure of the names table, and the characters of the data in the names table. Searches may be conducted with different mark words for search ranges, different mark words for ignored ranges, and different ignore words. Also, it is desirable to change the scope of searches from time to time. Therefore, it is desirable to have the ability to change search settings. There are three methods for setting search configurations.

Program Level Configuration. The settings for system's search configuration are written into the program, or saved as a program property file or database records that cannot be easily changed by users.

User Level Configuration. The user-level configuration can be set up by the user and permanently saved in the record controlled by the user. The settings are saved in a database table for each of the users. The user can retrieve, change and update the settings under the user account. The same settings will be available to the user whenever the user logs in. On the setup page, which can be opened from the search page, the user can revert this configuration to a system's default by clicking "Revert to System Default."

User's Current Search Settings. This is a search configuration, which can be set and used by the user any time by clicking the box preceding the option. The search settings are persistent throughout the log in session. The values of the settings are not written to a data record. The settings are sent to the server each time when the user submits a search page and the setting values are returned to the client on the result page. If the user logs out and restarts the server, the setting values will come from the system's default.

The search page has a mutually exclusive radio button, which may be used to select default search mode or current search mode. When Current Search is selected, the settings can be viewed by clicking the View button, the user can quickly make adjustments to the search settings and submit the page for a search. The page for setting up current settings is identical to the page for setting up default search. If the user needs to change search settings frequently, the user should use current search mode. The user can quickly adjust the current settings and submit the page with name source data to conduct a search.

On the page showing unmatched name data, the user may select any of them and add it in the names table. After selecting the check box for a name datum, the user clicks the "Add Name to Table" button, the server responds with an data entry form with names filled in related input boxes and with additional input boxes for accepting information. After the form is filled, the user submits the form to the server to have the name datum written into the names table. It is desirable to have the ability to pop up plural pages for adding plural names to the names table in a way similar to the Edit page in FIG. 5J. The user just fills in missing information for each of the pop-up forms and submits each of the forms to the server to have the name data added to the names table.

When the user uses default settings, the search data submitted from the browser contain a flag signaling that the search is conducted by default mode. The program gets setting values from the database record for the user. The values of default settings may be embedded on the web page. When the user opens the default setup page, the values of the default settings are retrieved from the record and are placed on the search page. The browser could pass the values back to the server for use without retrieving setting values again.

9. Organization of Program Files

The investigative name data search module in an preferred embodiment consists of a JSP search page for submitting search data and search settings, and a JSP result page for presenting search result, a java servlet class and a core search algorithm. In conducting search, the user opens the JSP search page. The user selects search mode, configures search settings, enters name data in the search box, and submits the page to a servlet program where the name data and setting values are retrieved and processed. The servlet program then conducts all necessary pre-processing including removing garbage, getting search ranges, and removing ignored words and ranges. For each of good name data segment, it determines the delimit and length, and properly breaks up the name data and stored them in variables. The servlet program then calls the core search algorithm for conducting all searches by a statement like List searchRes=searchclass.search(email, first_name, last_name, middle_name, type, mark_word, search_methods, order). String mark_word[ ] contains all mark words; String type contains a string flag in the form of "1, 2, 3, 4" as signals, respectively, for denoting party own attorneys, client employees, opposing attorneys, and other parties. The value of "1,2" of the flag signals the program to find only party attorneys and client employees. String search_methods contains plural delimited flags (e.g., "fg1, fg2, fg3, fg4, fg5. . . ") each of which signals the use of an associated match method. It should be understood that a positive flag value signals the program to use a particular search, but it may not actually conduct such a search if qualified data does not exist. For example, if searching small initials in comment is on, but a name datum is not a small initial, the program will not conduct this search. String order defines the display order. This flag has possible values enf, fne, nef, efn, fen, nfe, where "n" is for person name, "f" for firm name, and "e" for email address. Thus, "fne" signals that the result is first sorted by firm name, and within each firm name, the data records are further sorted by person name, and within a person name, the data records are sorted by email address. String email[ ][ ], first_name[ ][ ], last name[ ][ ], middle_name[ ][ ] are all two dimensional strings holding processed name data. Two dimensions arise because the name data have plural mark words and plural name data are associated with each of the marked ranges, corresponding to the document address fields. The appearance order of individual name datum within an address field is the index number +1 for the correspondent mark word. The returned result is a list of objects containing search results.

The core search program conducts all searches. This program first breaks up the order flag to get the respective sorting keys by using statement: if(order.equals("net")) {orderStr=", lastnamefirstname,email,company."} This sorting segment is used in a SQL statement for search. The program conducts all basic searches as long as required data such as email address, and first name and last name exist. Even those basic searches may be implemented as switchable in this core program. The default searches can be defined by def_methods="fl;fil;ci" (where ci denotes a search using capital Initials). The program goes through all document fields (i.e., mark words) by i loop, and for each of the fields, it goes though all individual name data (the j loop). Within the j loop, the program checks if a search method is on, and, if it is on, and checks if the required data exist or meets the pattern of initials (like "A.B.C."). If both conditions are met, the program constructs a SQL statement for this search. For the entire names within the two loops, the program constructs an SQL statement by union. After the program finishes the two loops, it runs the SQL statement to get result set. The search methods discussed in FIG. 6F means construction of SQL statement for each search. It searches the names table just once. This core program may use SearchBean, a Java bean, to store the search result. It has id, email, first name, middle name, last name, company, entry date, type, comments, field no, and appearance no.

The servlet program gets the result. It then separates the name data into two groups: one for found records and one for no matched records. It finally assigns name data with found records to a designated variable, assigns the name data without found records to another designated variable, and assigns the values of the search settings to designated variables by using a series of setAttribute statements. Finally, the servlet program makes a call to a JSP page for displaying search results. The field values (i.e., all mark words such as "from," "to," and "cc") and the appearance order of each name datum are passed onto the final result page because they appear on the result page (FIG. 6C). If a name is from an email, it may indicate email address where the name is from. The display "order" is also passed to the result page because it is used in the drop-down menu for changing the display order.

The core algorithm can be placed in the servlet program or can be written as two or more separated files. A preferred code structure is to separate core algorithm from the servlet program. After the servlet program retrieves the name data and processes the setting values, it passes the pre-processed name data and the values of search settings to the core program for conducting searches, and the core program returns search results to the servlet program. Upon getting the result, the servlet program assigns the result data and setting values to designated variables by using a series of setAttribute statements, and makes a call to the JSP result page for presenting the results.

The search page is embedded with tools for selecting search mode and setting up search settings. When this page is called, the server retrieves the default search settings and embedded default setting values on the hidden variables. It shows only a summary of default settings, but the user can expand it to see the details. The user can click the setup button to open the page for setting up default settings and save them. It also has a check box for selecting search mode, and the settings for current search mode. When the user selects current search mode, the server gets the current settings and conducts name searches according to current settings. All of the search settings may be implemented by a conventional method: using one integer or char as flag for each feature. Any optional feature can be turned on or off by changing the value of the associated flag.

The core program has many options for controlling search methods and the names table is configurable. Additional measures are necessary to ensure that the program will not hang due to a missing or wrong database fields in the names table. The table structure may be created by using a proper configuration file. To avoid possible mishap from operational mistake, it is also important to propose a convention for naming fields in the names table. In a typical names table, common fields include first name, last name, middle name, company, email address and comment. A simple rule is that all common fields are named by a single word in singular form or two single words connected by "_". The manager is required to know this rule before the manager can configure and modify the names table. Also, the type field is special because their values are associated with the display color in the search result. In addition, the program should check data structure of the names table. Finally, a test file containing a list of name data can be used to conduct name search test against a long list of names in the names table to ensure that the program functions properly.

The program contains code for determining if certain target fields exist in the names table by check the Head table. For example, the program can determine if an email address field ("email" or "email_address") exists. If it does, the program searches email addresses in the email address field. If it does not, the program uses the comment field ("comment" or "note") as an alternative search target. The program can also detect the middle name field by looking for "middle" or "middle_name" in the names table. If a middle name field exists, the program searches middle names in the middle name field. Otherwise, the program does not. If the program determines that the type field doses not exist in the names table, matches are determined without regarding type value. The field naming convention can be used to reduce risk of error.

G. Identity Data Search, Sorting, and Duplicate Elimination

An identity data processing algorithm ("IDPA") may be used to process name data lists. When a document containing privileged information has been circulated to staff, the identities of those who have access to the document must be identified in a privilege log so that the opposing party can ascertain whether a privilege claim is proper. It is very time-consuming to process email messages because they are often sent to many staff users. The identities of original senders, recipients, and cc-recipients must be entered in the privilege log. In addition, the identities of those who later read the document are required to appear in the privilege log.

Different law firms like to write name data in different ways. The common practice is that the names of the original sender, recipients and cc-recipients appear in individual address fields while all later recipients appear in another address field. In addition, those name data may be listed in an order of preference such as alphabetic order or the appearance order as in the original document. Finally, law firms may use different formats of writing the names in the privilege log. The above algorithm can be used to perform those functions. It has a data input page (FIG. 6G) which contains two large input boxes: the top box 860 ("Group A") is for accepting name data that are of subsequent recipients, including readers, recipients and cc recipients, and the bottom box 861 ("Group B") is for accepting name data from address fields of the email that give rise to privilege.

The name-processing page has similar setup features as for the name search page. It has two processing modes: current mode and default mode. Default mode uses the settings saved in a database table while current mode uses the current settings that are sent to the server each time of processing name lists. The page for setting current mode is similar to FIG. 6B except it has the following additional setting:

Duplication Elimination:

---
[ ] Delete from group A all the names that exists in group B
[ ] Allow duplicate names between the two groups.
---

Name Output Format:

---
[ ] First_name Last_name [ ] First_name MI Last_name
[ ] Last_name, First_name [ ] Last_name, First_name MI
---

Group a Name Output Order:
[ ] Original name order [ ] Reverse original order [ ] Alphabetic last name
Group B Name Output Order:
[ ] Keep original subgroup [ ] Reorder all names within Group B.

The default setup page is identical to the setup page for current mode except that default settings are saved on the server. The format for group B has two options: output name data grouped according to their address fields such as sender, recipients and cc-recipients as shown in FIG. 6H or in a bigger pooled group. The user can also decide how the name data are sorted within each of the groups or subgroups by using the sorting tool 863 in FIG. 6H. In FIG. 6H, the names are displayed in the option: first name in alphabetic order. However, if the user opens the drop-down menu, it has four options: first name in alphabetic order, first name in reverse alphabetic order, last name in alphabetic order and last name in reverse alphabetic order. The user can change the name display order.

There are four submission buttons 862 below the large input box for Group B. Those buttons allow the user to reuse the page. The user can clear up the source data from the Group A box or the Group B box by clicking one of the first two buttons, or clear all data by clicking the "Clear All" button. After the user fills name data in one or two input boxes, the user can submit the page by clicking the "Submit" button. Those buttons allow the user to conduct repeating operations. Name data and setting values are sent to the server, names and setting data are retrieved, and name data are processed according to the default setting or current settings. The server returns the results in one or two output boxes with necessary setting values embedded on re-generated page. The original name source data may be refilled in both original input boxes so that the user can edit name source data and repeat the operation to see a different result.

This program includes a call to a program that is substantially identical to the identity data search algorithm to find all name data that match at least one record in the names table. Among those found records, some of them are of party's attorney. Those name data associated with attorney records are marked with "Esq.*" next to the last name. Some examples are G. M. Homes, Esq* and M. Howa, Esq.* If the matches are found by using the perfect match methods, the user can trust those marks. If the names results were obtained by using inclusive match methods, the marks indicate they are possible matches. In this case, different marks such as "*d," "*l" "*p" may be attached by the program to indicate definite match, likely match and potential match. All the names without any of those marks thus can be excluded as party's attorneys. The user does not need to check all names against all attorney names list. If the coupled names table contains a complete set of attorney names, the user should remove the marks ("*l" "*p") for those names that are found to not attorneys.

Since the names table contains attorneys, clients employees, business partners, and other parties, different marks are designated for different entity types so that the program may be used to find records that belong to a specific type. If the purpose of using this algorithm is to find party's attorneys, the user can exclude all records for other types by checking only the law firm type for output. The underlying name search algorithm actually marks different parties in different colors. It is easy to indicate their types, for example, by notation such as Esq.*X, Clt.*, Ptn.*, and Trd.* where X=d, l or p, to indicate three confidence levels. By selecting types and by using different markings, the names of various types can be displayed in distinctive colors and looks.

The result page in FIG. 6H contains two links: "Show names in a table format" below each of the two result boxes (one link is outside the figure). When the user clicks the link below the output box for Group B, the page shows a list of names in a table view where the user can select any of them for deletion (FIG. 6I). After one or more entries have been deleted from the table, the user can cause the server to hide the table again, and display the output box that no longer shows the deleted names. The user can manually copy the processed names from the output box for Group B, respectively, to the author, recipients and cc fields on a privilege log form and copy the name data from the output box for Group A to a designated field on the privilege log form.

On the page for showing sorted name data (FIG. 6D), an additional button, "Add New Name" is placed for adding selected names to the names table (outside the figure). This function also exists on the name search result page. In each case, the user selects an entry and clicks this button, the browser opens a page like the data entry page for the names table except that relevant fields have been filled by first name, last name, middle name, and email address, if they exist. After the user fills in data in the remaining input boxes, the page is submitted to the server to have names saved in the names table.

Additional features may be added to the setup page so that the user can have an option to pool all name data in the output. A simple work around is to pool all name data together, copy them in one single box, and submitted to the server. The output will be in one corresponding box.

H. Integrated Log Production System

Various of tools discussed above are integrated to form a log production system with different operation modes: (1) static log form with name search and name processing functions, (2) dynamic log form with name search and name processing functions, (3) reflective log form which allows the user to view and edit last log record. The system uses different display layouts and different display states such as hiding or showing features. While the system accepts varying data fields, it uses the same back-end program for searching names, processing names, and processing log records. The user interface page has a switching tool for changing operation modes. At any stage of operation, the user can switch among available modes, and save the selected settings in a user table or clients cookies. After the mode selection is saved in the table, if the user logs in the server next time and opens the log form, the user will use the same operation mode. The name processing form is embedded, directly or by a link, with name search setup tool and name-sorting setup tool, and a name-sorting controller. The name processing setup tool is substantially similar to that discussed above, and is for setting up name-searching features and name-sorting features. The name search settings and name processing settings may also be placed on the log form for convenience.

1. Email Pattern and Logging Methods

Many complications in the privilege log are related to email. A common pattern is that a few employees discussed a matter, which might be initiated by outsiders such as customers, media, or government officials. During the discussion, a chain email is sent to in-house counsel or outsider law firms that give arise a privilege claim. This email again will be forwarded to the employees for further discussion. If this chain email is sent to other recipients, whether privilege is preserved depends upon the roles and functions of those additional recipients. If any of the additional recipients is a public member, a government agent or an adverse party, privilege is broken. If all of the additional recipients are authorized agents or partners, attorneys, essential employees, or third parties who have a joint defense agreement with the party, privilege is preserved. The whole process can result in a large number of email messages of various lengths due to differences in the numbers of sender, recipients, and additional recipients, distributing history, and discussion subjects. A typical email communication has three components: none-privilege communication ("N"), privileged communication ("P"), and further communication maintaining privilege ("M") or breaking the privilege ("B"). Law firms use two models to code privileged email.

Logging the First Privilege Message. This method has been used by many law firms and proved to be successful. An email may contain only responsive and none-privileged communication ("N"). If the non-privileged email is sent to attorneys, this communication is privileged ("P") and the last message is subject to withholding. In this logging method, the prior messages are regarded as part of the email, just like attachments. One issue is whether the prior responsive and non-privileged email should be produced by redacting the last privileged email. The solution to this issue depends on how the document pool is created. If the document pool has a complete set of email, and the party has preserved all chain emails, all non-privileged emails of various lengths are presumed to be in the document pool and would be produced in the due course. Therefore, there is no need to redact chain emails. If a privileged email is sent to key employees or other attorneys, the privilege claim may be maintained ("M"). If the chain email has been sent to outsiders, government officials, media, or many insignificant employees, this communication breaks privilege ("B"). The names of the subsequent readers are entered in an additional field. This logging method in theory is immune from attacks. It works for all communication patterns: N-[P]-P, N-N-[P]-M, [P]-M, [P]-M-P-P-M. The only thing needs to do is to add subsequent recipient names to the additional names field.

Logging the Last Message. Some law firms use this logging method. This logging method has many problems. After a long chain discussion is closed, the client has a large number of emails from one single message to tens of messages in length. Each of the messages may have one of the three segments: non-privileged communication, privileged communication, and subsequent none-privilege communication. This logging method is perfect for email containing a last privilege communication. It has trouble in dealing with email, which contains both privileged message and non-privileged message. The logging is based upon transmission information. If a log entry is strictly based upon the last email, it may reveal non-privilege nature. It would be a mistake unless the privileged message and subsequent discussions had been redacted. This would require mass amount of redaction.

When this logging method is used, reviewers have to struggle to get right results constantly. They might have to enter attorney names in the log, and the confusing data may reveal inherent conflicts. This method works for email following the communication patterns: P-[P], N-[P], N-N-N-N-P-P-[P]. The reasons for avoiding redaction can be justified by the production of a complete set of chain emails. It is hard to log for emails with patterns P-[M], P-M-[M], and N-N-P-[M]. The privilege nature is maintained but not reflected in the last message.

Law firms occasionally use a method of logging the first message. This message works for the email with the communication pattern: [P]-P, [P]-M, [P]-M-M. For the emails with the communication patterns [N]-P, [N]-P-M, [N]-N-N-N-P-P-P, this logging method is very difficult. The first message may be non-responsive and non-privileged but the whole is privileged. This method not only wastes resource but also raises unnecessary red flag for challenges. In addition, attempts have been made to log each of the messages for chain email. The method causes massive waste and the task is nearly impossible.

2. Static Privilege Log Form

Figure 6K:
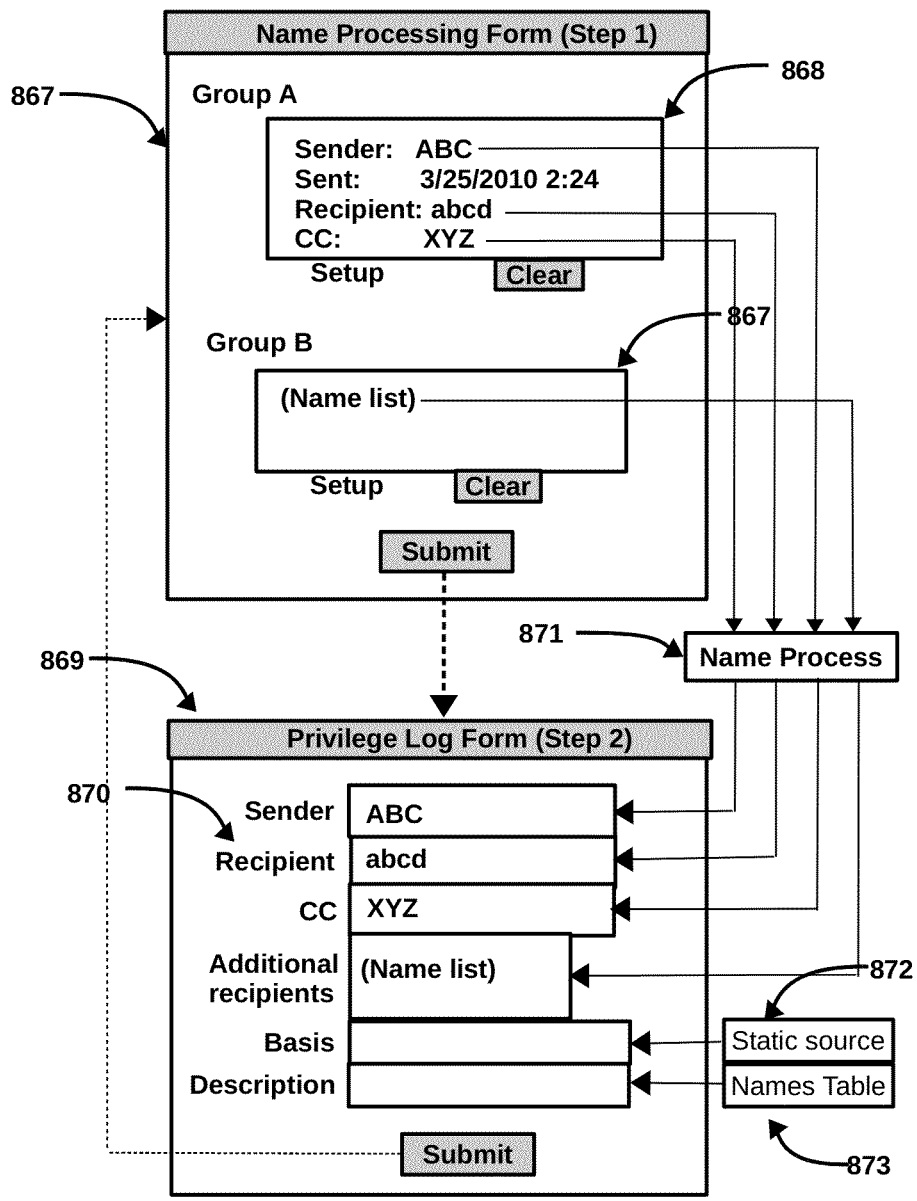
FIG. 6K shows the two-phase process of using a name processing form and a log entry form wherein the log form is coupled with a static database field and a names table.

A static log form uses both name processing form and a log form on a single web page (FIG. 6K). The name processing form is same or substantially similar to the discussed form, which includes a link for invoking the setup tool for configuring name search methods and all name-processing settings. It has tools for showing and hiding names in a table view, drop-down boxes for changing name format and display order, drop-down box for eliminating name duplicate between two groups, and an optional link for adding new names to the names table, and an optional link for deleting existing names from the web page. The last name field in the add name page is coupled to the last name field itself so that when the user types in the input box for last name, the user knows whether the name has existed. When a name is deleted from the table view, the same name is also deleted from the output box or the related name field on the log form.

Tame search program may include all of those match methods discussed in above, only those reliable match methods may be used in some applications. If only rigid match methods are used, the user may have to use additional methods to identify those names that might be attorneys. The name-processing program may contain all or part the discussed functions. The program may be written so that it would output only one or few preferred format such as "First name Last_name" or "Lastname, First name" or "First initial Last_name" or Lastname, First initial." Some of the sorting methods such as sorting names by first name are rarely used.

Both the name processing form and the log form contain independent buttons. The name processing form has a "Clear" button for the input box A, a "Clear" button for the input box B, a Clear button for both input boxes, and a "Submit" or "Process" button. The two large input boxes accept name source data from chain email or electronic documents. The additional recipient field is for storing all names that are from the address header of chain email above the email that gives rise to a privilege claim.

If the first email was a privileged email that gives rise to a privilege claim and if the message was later forwarded to additional recipients, the party needs to disclose the names of the additional recipients so that the adversary party can determine if the privilege claim is proper. When many subsequent communications give rise to privilege, it only needs to log first email creating privilege in the log. For the reason discussed above, the input box for Group B is designated for all names from a privileged email that creates privilege claim, while the other input box for Group A is for all recipients who have read the email in subsequent distribution. The designation of A and B or numbers are arbitrary.

After name source data are entered into one or two input boxes, the user then submits the name processing form to the server for processing. The server processes the form, extracts all data segments for all recognizable fields and keeps track of the names data for all recognizable fields, including sender field, recipient field, cc-recipient field. The additional recipients names in Group A are processed separately. For each address field, the server breaks up name data into individual names, searches each of the names in the names table according to all match methods selected in the setup, marks those names that have been found to be the attorneys in the names table with a mark such as "*" or "Esq", formats the names according to the format selected in the setup, sorts the names according to the sorting method selected in the setup, puts them as a text string with proper delimits. The server then fills the four name fields on the log form.

The browser returns an error message when if the user submits an empty form. Since the name source data may actually contain no name data for one or more of address fields, the program is coded to conduct search and sorting without name data. The name-processing program is also designed to recognize date and subject line that often appears in email address headers.

After the server prepares name data and stores them in temporary variables, the server then generates the same web page containing both the name processing form and the log form, and fills the processed names corresponding to the four fields (sender, recipients, cc-field, and additional recipients) on the log form. If the source data contain a sender name, the sender field in the log form is filled; if the source data contain valid recipient names, the recipient field on the log form is filed. If the source data contain valid cc-recipient names, the cc-field on the log form is filled. If the input box for additional names contains valid names, the additional-recipient field on the log form is filled. If the source data contain transmission date, the date field on the log form is filled. If the server finds no valid name for any of those fields, none of those fields on the privilege form is filled. Now, the user knows from the four name address fields who are counsel, copies all marked attorney names into the right component box for the description or retrieve counsel names interactively in the component box by typing right letters, or retrieve the names by typing correct letters in sequential order in a single construction box.

The user may edit any of the name fields on the name processing form before submission of name processing form, and can also edit the filled names in the input fields on the log form. The user can edit names in any way the user wants. The user may reject all names filled by the name-processing program. For example, the user may change any of those names in any of the name fields, the date, and the marks for attorneys names. If the user believes that any information is inaccurate, the user can correct it. Also, the user can add any additional information if necessary.

The user then fills the rest fields such as privilege basis, general subject, special subject, or any other fields on the log form. Additional tools such as interactive search feature, phrase construction feature, and a combination of interactive feature and phrase construction feature may be used for the rest of fields to improve efficiency and data consistency. After the user is satisfied with the data on the log form, the user submits the log form to the server. Upon receiving the data from the log form, the server processes the data, conducts formality check for the data, and writes the data into the log table.

By proper setting up, any of the input fields on the log form may be embedded with a script implementing phrase-constructing method. For example, the privilege description field may use plural component input boxes for accepting data. Upon the finishing of entering data in the component input boxes, the script appends all values from the components input boxes to form a single descriptive phrase with space as separator. For example, the description has component input boxes: [document type] [action word] {attorney name} [preposition] [specific subject matter]. [ ] denotes an input field whose value may be entered by the user or selected from a plural static values on the selection box. The user may select "Article" from a group of choices consisting of "Article, Letter, Email, Press release, Spreadsheet" as document type; select "sent by" from a group of choices consisting of "sent by, prepared by, received by" as an action word; select "concerning" from the choices "concerning, regarding, relevant to" as the preposition; and select "securities matter" from the choices "corporate litigation, securities matter, contract negotiation" as a specific subject matter. For the component box for attorney names, the user can copy clearly marked attorney names from the above names input boxes or by conducting interactive search. Upon finishing data entry, the construction box for the description will show "Article sent by Black Stone, Esq., concerning securities matter."

3. Dynamic Privilege Log Form

A dynamic log form can be used to perform substantially same task except that its user interface is generated in a two-step sequence. The server first generates a name processing form and then a log form. The processing form has all features including setup tools discussed above and all links for viewing names and adding names. In the first step, user interface does not show the log form and associated buttons. After the user fills name source data and submits the name processing form to the server, the server processes the form, extracts data for all recognizable name fields, split name data into valid names, searches all names in the names table according to selected match methods, marks those names that have been found to be attorneys with proper marks such as "*", "Esq" or any other suitable mark, sorts the names according to a sorting method selected in the setup, and puts each of the group of names in one single text string in a format selected by the user or in the setup.

The server then creates a web page containing only a log form. In creating the log form, the server fills all name input boxes and the date input box with suitable names and date. If the source data contain date, the date field on the log form is filled with the date. After the log form, which is filled with necessary data, is generated, the server sends the log form to the client computer for rendering. The log form contains data in some or all of the name input boxes, and the date input box. However, the input boxes for the rest of fields such as document type, description, privilege basis, general subject or special subject are empty.

The user now has the opportunity to fill the rest of the input fields on the log form and edit any of the name fields and date field on the log form. Upon finishing editing the log form, the user submits the log form to the server for processing by clicking its own submission button. The server retrieves data for each of the record fields from the log form, conducts formality check for all data, and writes the data in the log table. If no error is encountered, the server sends a new name processing form for use in next cycle. This name processing form may contain a return code like "Log No 1212 entered at Apr. 19, 2012 10:30:45" If the server encounters an error, an error message is returned so that the user can redo it. When an error is returned, the original name data are populated on the log form so that the user can correct the error.

The purpose of the dynamic two-stage web form is to save desktop space. The system must accept empty name processing form because name data are not always available for all address fields. The name processing form may contain a "Bypass" button for bypassing name search and name-sorting functions. The log form may be implemented with phrase construction function, interactive search and data-feeding functions, and combination of them, as in the case of static log.

4. Privilege Log Form with a Name Processing Form in an Expandable Area

In contrast to the dynamic two-stage web form, the name input boxes are implemented as two input boxes in an expandable area on a web page. This area shows up by clicking a button and collapses by clicking the button. It is desirable for the show-or-hide state of the expandable area to be persistent throughout a log in session. If the area is set in a show state, the area will always be visible after a new page is generated. If this area is set in a hide state, it will remain invisible after a new page is generated. This user interface can save client computer's desktop space. Beside this feature, all other functions, setup tools, and other support functions are same or substantially similar to the static privilege log form.

5. Reflective Privilege Log Form

Reflective privilege log form is implemented with a capacity of sending back the last record that the user just entered. The displayed record is ready for review, edit, copy and paste so that the user can fix any error. The user can also copy the last record as a template for next log record. The web form is embedded with all setup tools and other features, including interactive search functions, phrase construction function, a combination of phrase construction function and interactive search and data feeding function, and features in the static log form.

The user first enters name source data in one or more input boxes, and submits the name processing form to the server. The server processes the name data as in the static privilege log form case. The server then creates and sends an identical web page containing a name processing form and a log form. The web page contains all associated tools, setup tools, edit and add links, and submission buttons. In addition, this web page also contains a region showing the newly entered log record ("the record display region") between the name processing form and the log form. The record display region contains all fields and values like "Sender: [John Smith]" for the last entered log record. In the alternative, the record may contain all values with proper delimits without field name ("John Smith; Jack Stone; Dec. 12, 2009; Document from attorney Jack Stone . . . ") The web page does not show any record in the display region upon its initial loading. A log record shows up only upon submission of a log record. In addition, there is a button for copying the last record and pasting it. Upon submission of a filled log form, the server generates a blank name-processing form, a region showing the last record, and a log form with the name data in the four name input boxes.

The copy function is used to copy all fields except the document ID from the last record to the log form. By clicking this button, the entire record except the ID in the display region is copied into the input boxes of the log form. The sender name in the last record is copied to the sender input box on the log form; and the names in the cc-recipient are copied to the cc-recipient input box on the log form. The copying function is realized by embedded script on the web page. This function is useful when two neighbor records are same or similar and is particularly useful when similar documents are arranged together in the review sequence. After the user copies the last record to the log form, the user manually edits the data in input boxes and submits the log form for processing. The user can copy any of the fields by using the client computer's copy and paste tool.

The edit function is for editing the last record. By clicking on the edit button, the system sends an edit form, which contains the last record in editable input boxes. The user then edits this form and submits it back to the server to update the record. The server processes the form, checks the formality of the data, and updates the last record in the log table. If an error is encountered, the server sends the last record back with an error message. If the server detects no error, it reconstructs a new web page, which contains a name-processing form, a record display region, and a log form. This function allows the user to make changes to a prior record in light of the new information the user might see from the next documents. Since the system tracks the last record ID number, it can instantly get the last record even though log records are entered by many users.

The reflective log form may be implemented in two-step dynamic log form. The user interface will show a name processing form and a log form in sequence. An editable and copy-able log record is shown at the top of the name processing form so that user can check if the last log record is good. Upon submission of the name processing form, the last record is copied to the top of the log form so that the user can copy it as the template for the next record. Upon submitting of the log form, the server then creates a new name-processing form with the last entered record on the top.

I. Integration of the Log System with Document Review Platforms

There are many document review platforms commercially available. Regardless of their names, they are able to deliver documents to the user's terminal for review. Generally, all of them support HTML, which directly allows user to copy text from browser. Some systems support PDF file format, which also allows users to copy data. If a document is displayed in image such as TIFF or other format, direct copy is not possible. In this case, the user must type data into the log form of this system for submission.

The most efficient way of using this log production system is to integrate a review platform with this system into one so that data transfer between the review platform and this system is fast and reliable. In an alternative, a review platform may be modified to add a web page, which gets relevant document data from the review platform and submit the data to this log production system. The data include names, document ID, title, and date. The page will call a server form handler of the log system. By using the function, it can fill partial log data in the log table, and thus the reviewer can get partially filled log record for edit. In this arrangement, connection between the client and this system cannot be based upon session identity, and data security may be maintained by using a private network connection or password verification.

The second method is to use the review platform and the log system side-by-side. The document review page and the log form are opened at the same time. Names are collected by reviewers and entered in the names table of the log system. In reviewing email, the user copies all names data from email headers to the two input boxes on the name processing form. The user then submits the page to the log system, which generates a log form. The user input data for all input boxes on the log form. The user may also use interactive feature to fill the privilege basis box, use the phrase construction feature to fill the description input box, and have the log record saved in the log table. The user may subject name data in single data block. A plurality of data entry forms may be opened for accepting data such as names, log entry form, product log and hot log. Additional tools may be used to enter data into any field and any database table. For example, one single page may contain many input boxes and submission buttons for adding attorney names, document date, and hot issues to respective tables. The server program that accepts block data breaks up the data, and correctly writes them in various tables. The submission page indicates the nature of the source data so the receiving program knows the proper way of processing them.

Various additional tools may be used to move data form the review platform to the log system. On the browser that supports right-click menu, when a user selects and activates some text on the browser and clicks the right button of the mouse, the browser displays a few drop-down menu items, which may include Copy and Property. Some commercial web pages may include a menu for performing various functions. It is desirable to add a menu item "Add Attorney Name." Upon selection of a name and clicking this menu, the browser opens an name entry page for adding the name to the names table with the data pre-filled. After the user fills more data into the name form, the user submits the name form to the server to have the name saved. It may also have a form for sending four name address fields to the log form. The server program saves the name data in the intended log table for further edit.

The third method is to use a menu embedded on the review platform's browser for direct submission. A script function gets the selected data from review document, uses the data and site address including program name as parameters to construct a URL to call the log system. The server receiving the data processes the data without return message, or preferably with a returning status message, without affecting review page. To maintain data security, the server may be run in a secured private network, and password verification may be used.

In most document review systems, a serious problem is the limited space available for reviewers. The user may have only a small working space. Space utilization rate may be improved by properly designing the review platform and the log production system. The alternative solution is to use two-monitor display system. When a twin-view display system is used, the reviewer can pick up necessary data from one monitor and fill it in any of opened web forms on another monitor for submission.

The database tables in this disclosure serve as examples. Many different structures can be used to achieve the same objective. While the concept is implemented in Java and JSP in this disclosure, it can be implemented in other development environments such as Java EE, PHP, and service-oriented architecture ("SOA"). While the system is deployed in Fedora Core 5 to 8, they can run in Window XP, Windows Server, Solaris, Mac Operating System, and other Linux Operating Systems. Many programming languages may be used to implement the concept and related functions. For example, CGI C programs and apache HTTP can be used to implement the concept. The system may be built to host a limited number of log production projects. Virtually any of the leading database applications may be used to achieve the same objectives.

In those exemplary embodiments of the present invention, specific components, hardware parts, arrangements, and processes are used to describe the invention. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

What is claimed is:

1. A method for creating, validating and editing a log for documents or objects for a legal proceeding or a legal matter by using a system comprising a server and a plurality of client computers, the method comprising the steps of:

setting up and modifying user accounts on the server by a privileged user for authorized users, who can access, validate and edit log data concerning documents or objects from the client computers under their user accounts;

setting up by a privileged user a table structure of a log table on the server for storing the log concerning documents or objects, only the authorized users having the right to access the log table;

setting up by the privileged user a table structure of a coupled table containing coupling data relating to at least one field of the log table, with only the authorized users having the right to access the coupled table from the client computers, wherein at least one column of data in the coupled table that the authorized users collect from reviewing documents in real time assist the authorized users to decide if a log entry is entered for a particular document or object and how to enter data in the log table;

creating a web page and a navigation bar containing a button for opening the log table and a button for opening the coupled table so that each of the authorized users can open a log form for the log table and a table form for the coupled table from a client computer;

adding and editing data for the coupled table in real time by the authorized users while reviewing documents wherein the amount of coupling data and related data increase in the course of creating log entries for the log;

retrieving the coupling data and the related data from the coupled table and presenting the coupling data and the related data to each of the authorized users; and entering data into the log table, retrieving data from the log table, showing the retrieved data from the log table on the client computer, and editing data in the log table by the authorized users that are reviewing documents.

2. The method of claim 1, further comprising changing the table structure of the log table and the table structure of the coupled table by selecting from the group consisting of: (1) uploading a configuration file containing table names and table structure definitions from a client computer, (2) uploading a project file containing table names and table structure definitions from a client computer, and (3) interactively deleting existing tables, creating new tables, or modifying the tables using a web-based setup page, or any combination of deleting existing tables, creating new tables, or modifying the tables using a web-based setup page.

3. The method of claim 2, further comprising setting up a data source for an input box on a web form for at least one destination field of the log table by setting up the data source on a web page, or uploading a file containing delimited setup data, or both.

4. The method of claim 2 further comprising constructing a phrase by combining user-selected data pieces in a plurality of component input boxes on the log form for the log table or by combining the data pieces that the user has selected in a plurality of selection boxes for a single construction box for the log table.

5. The method of claim 2 further comprising exporting data from the log table and the coupled table in a project zip file and uploading a project zip file onto the server, decompressing the file to form individuals files, and writing the data from the files to corresponding tables.

6. The method of claim 2, further comprising setting up a data validation page and data validation methods for the log table and the coupled table, and validating data for the log table and the coupled table on a corresponding validation page.

7. The method of claim 6, wherein the data validation table is a tentative table containing tentative records or a combined table showing both validated records and distinctively marked tentative records, and data validation is accomplished by manager validation or member voting validation.

8. The method of claim 7, further comprising changing data access rule settings between a setting for private edit or a setting for public edit for the log table and the coupled table, whereby a public edit setting allows any authorized user to edit or delete any records of other authorized users on respective web forms while a private edit setting allows an authorized user to edit or delete only the authorized user's own records.

9. A method for creating a log for documents or objects for a legal proceeding or a legal matter on a server connected to a plurality of client computers used by a plurality of authorized users, the method comprising the steps of:
creating user accounts on the server for the authorized users, thereby enabling the authorized users to access, validate, and edit the log concerning documents or objects under their user accounts from their client computers;
creating on the server a log table, to which log entries concerning documents or objects are added, and from which log entries are retrieved for review by the authorized users on their client computers;
creating a coupled table on the server, the coupled table containing coupling data that the authorized users collect from reviewing documents in real time, the coupled table containing at least one field of data relating to at least one field of the log table wherein the coupling data aids the authorized users in creating and editing log entries;
creating a navigation bar, a web form for the log table, and a web form for the coupled table on the server, the navigation bar containing a button for opening the log table and a button for opening the coupled table, with the navigation bar accessible to all authorized users on their client computers under their user accounts;
adding and editing data on the web form for the coupled table in real time by the authorized users on their client computers while reviewing documents throughout a production cycle;
adding and editing log data on the input boxes of the log form for the log table by the authorized users on the client computers while reviewing documents throughout a production cycle;
reviewing each document or object, determining if the document or the object is to be logged in the log by searching and reading the data in the coupled table, filling log data in the input boxes on the log form, submitting the filled log form to the server, writing the log data in the log table, displaying the newly entered log record on the log form; and validating coupling data in the coupled table.

10. The method of claim 9, wherein the coupled table is a names table containing a type field, a comment field, and name fields, wherein the log table is a privilege log table, the method further comprising entering names in an input box on a name search page, submitting a filled name search page to the server, conducting name searches according to a default or current search mode, marking up the names that have been found in the names table, and filling names in respective input boxes for senders and recipients on the search result thereby enabling the authorized user to view and copy the names.

11. The method of claim 10 further comprising selecting a search mode between a current search mode and a default search mode, showing names that are not found in the names table, adding a name into the names table, and repeating search operations by using new name data.

12. The method of claim 11, further comprising setting up search settings, defining ignored ranges and ignored words, providing delimiting characters, changing the display order and format of found names, selecting the types of names data to appear, breaking the name data into segments, breaking up each of the segments to form plural names, and identifying email address, obvious initials, single words, and multi-part names for each of the names, thereby enabling the server to conduct name searches in the names table.

13. The method of claim 10, wherein the name search further comprises full name matches and an additional match method selected from the group consisting of matching inputted obvious acronyms with firm names and matching inputted email addresses with email addresses, matching two-letter and three-letter initials with initials in comments and with first and last initials of names, matching obvious initials and their variants with the first letters of names and with initials in comments, matching single words with first names and last names, and matching any part of multi-part names with first names, last names, and firm names.

14. The method of claim 9, further comprising processing two lists of names that have been placed in two input boxes, removing special characters, removing ignored ranges from each list of names by using user-provided marks, eliminating duplicates between the two lists of names, sorting names for each of the two lists of names by a selected sorting method, and displaying two lists of processed names in selected formats and selected orders in two output boxes.

15. A method for processing a log for documents or objects for a legal proceeding or a legal matter on a system comprising a server and client computers connected to the server, the method comprising the steps of:
creating a web user interface on the server, the web user interface comprising a name-processing form with a name input box and a submission button, plus a log form with a submission button, wherein the two forms are placed on a single web page or on two separate web pages on a client computer;

copying name data from a document under review on the client computer, the document delivered by a separate document review server or by an integrated review component of the client-server system, pasting the copied name data into the name input box and submitting the filled name-processing form to the server;

processing the name data by the server by removing special characters, dividing the name data into three groups, respectively, for sender, recipients, and cc-recipients, breaking up names data into individual names for each group, searching individual names in a names table, marking each of the found names with a unique mark, sorting all names in each of the three groups according to the sorting keys set in default settings or current settings;

reconstructing on the server the web user interface that contains the name-processing form and the log form, filling processed name data in input boxes for sender, recipients, and cc-recipients on the log form, and copying the processed name data to the log form on the client computer;

filling data in the remaining input boxes on the log form on the client computer by an authorized user and submitting the log form by the authorized user to the server; and processing the log form by the server by retrieving submitted log data from the log form, writing the retrieved log data in each of the data fields in a log table on the server, recreating the name processing form with a confirmation message on it, and sending the web user interface to the client computer for processing a next document.

16. The method of claim 15, wherein the name-processing form contains a second name input box for entering additional names and the log table contains an additional data field for additional names, the method further comprising eliminating from the second name input box names that are in the first name input box, and copying processed names from the second name input box into the name input box for additional names on the log form.

17. The method of claim 15 further comprising setting up search settings, defining ignored ranges and ignored words by providing mark words, providing delimiting characters, changing appearance order and format of found names, and selecting markings for different types of names.

18. The method of claim 15 further comprising creating a data source for an interactive search and data-feeding function for an input box for a destination field of the log table by selecting from the group consisting of: interactively setting up static data source or data fields of at least one table, uploading and executing a file containing data source setup instructions, and executing a command for setting a data source on a server terminal.

19. The method of claim 15, further comprising typing in an interactive component input box, calling a search program to conduct searches in a data source; retrieving data pieces from the data source, displaying the retrieved data pieces in a selection box, moving a data piece selected by the user to a component input box, combining all data pieces from all component input boxes, submitting the filled log form to the server for processing, and saving the submitted log data in the log table.

20. The method of claim 15 further comprising including and showing the last log record that the authorized user just submitted at the top of the name processing form, together with embedded tools for editing, copying the log data, and pasting the copied log data into the log form wherein the authorized user can edit it.

* * * * *